US 12,104,928 B2

(12) United States Patent
Saito et al.

(10) Patent No.: US 12,104,928 B2
(45) Date of Patent: Oct. 1, 2024

(54) ABSOLUTE ENCODER

(71) Applicant: MINEBEA MITSUMI Inc., Nagano (JP)

(72) Inventors: Katsunori Saito, Kanagawa (JP); Yasuo Osada, Saitama (JP); Hiroki Negishi, Tokyo (JP); Norikazu Sato, Saitama (JP)

(73) Assignee: MINEBEA MITSUMI Inc., Nagano (JP)

( * ) Notice: Subject to any disclaimer, the term of this patent is extended or adjusted under 35 U.S.C. 154(b) by 355 days.

(21) Appl. No.: 17/593,765

(22) PCT Filed: Mar. 24, 2020

(86) PCT No.: PCT/JP2020/013053
§ 371 (c)(1),
(2) Date: Sep. 24, 2021

(87) PCT Pub. No.: WO2020/196533
PCT Pub. Date: Oct. 1, 2020

(65) Prior Publication Data
US 2022/0170731 A1    Jun. 2, 2022

(30) Foreign Application Priority Data

Mar. 28, 2019    (JP) .................................. 2019-064970

(51) Int. Cl.
G01D 5/14    (2006.01)
G01D 5/04    (2006.01)
(52) U.S. Cl.
CPC .............. G01D 5/145 (2013.01); G01D 5/04 (2013.01); G01D 2205/26 (2021.05); G01D 2205/28 (2021.05)

(58) Field of Classification Search
CPC ...... G01D 5/04; G01D 5/145; G01D 2205/26; G01D 2205/28; G01B 7/30
See application file for complete search history.

(56) References Cited

U.S. PATENT DOCUMENTS 8,878,125 B2    11/2014    Miyajima et al.
11,365,984 B2 *   6/2022    Osada .................. G01D 5/14
(Continued)

FOREIGN PATENT DOCUMENTS

CN    102506698    6/2012
CN    102736664    10/2012
(Continued)

OTHER PUBLICATIONS

Machine translation of JP 2019-15536 A obtained on Oct. 27, 2023.*

(Continued)

Primary Examiner — Adam D Rogers
(74) Attorney, Agent, or Firm — IPUSA, PLLC

(57) ABSTRACT

An absolute encoder includes a spindle gear fixed to a motor shaft, a permanent magnet provided on the spindle gear, and a first driven gear having a center axis perpendicular to a center axis of a worm gear portion, and engaging the worm gear portion. The absolute encoder includes a second driving gear provided coaxially with the first driven gear and rotating according to a rotation of the first driven gear, and a second driven gear having a center axis perpendicular to the center axis of the first driven gear, and engaging the second driven gear. The spindle gear includes a magnet holder which is fit onto a tip end of the motor shaft, coaxially with the motor shaft, and a resin gear portion provided with the worm gear portion on an outer side in a radial direction.

4 Claims, 32 Drawing Sheets

(56) References Cited

U.S. PATENT DOCUMENTS

| | | | |
|---|---|---|---|
| 11,404,938 B2* | 8/2022 | Osada | G01D 5/145 |
| 11,561,117 B2* | 1/2023 | Osada | G01D 5/245 |
| 11,906,300 B2* | 2/2024 | Saito | G01D 5/145 |
| 11,913,784 B2* | 2/2024 | Osada | G01D 5/04 |
| 2019/0277668 A1 | 9/2019 | Osada | |
| 2020/0132507 A1 | 4/2020 | Osada | |
| 2022/0155051 A1* | 5/2022 | Sato | G01B 7/30 |
| 2022/0163317 A1* | 5/2022 | Saito | G01D 5/16 |
| 2022/0163318 A1* | 5/2022 | Osada | G01D 5/16 |
| 2022/0196380 A1* | 6/2022 | Saito | G01D 5/145 |
| 2022/0221310 A1* | 7/2022 | Ishi | G01D 5/24442 |
| 2023/0020212 A1* | 1/2023 | Osada | G01D 5/14 |
| 2023/0071255 A1* | 3/2023 | Sakieda | G01D 5/145 |
| 2023/0095065 A1* | 3/2023 | Saito | G01D 5/145 |
| | | | 324/207.25 |
| 2023/0332877 A1* | 10/2023 | Ishi | G01B 7/30 |
| 2024/0133670 A1* | 4/2024 | Osada | G01B 7/30 |
| 2024/0133671 A1* | 4/2024 | Osada | G01D 5/24433 |

FOREIGN PATENT DOCUMENTS

| | | |
|---|---|---|
| CN | 107302275 | 10/2017 |
| JP | H05-172506 | 7/1993 |
| JP | 2004-245614 | 9/2004 |
| JP | 2009-162742 | 7/2009 |
| JP | 2009-236515 | 10/2009 |
| JP | 2012-088276 | 5/2012 |
| JP | 2013-024572 | 2/2013 |
| JP | 2015-190842 | 11/2015 |
| JP | 2016-109431 | 6/2016 |
| JP | 2018-063209 | 4/2018 |
| JP | 2018-087774 | 6/2018 |
| JP | 2018-100859 | 6/2018 |
| JP | 2019-015536 | 1/2019 |
| WO | 2007/046182 | 4/2007 |
| WO | WO-2019231032 A1 * | 12/2019 |
| WO | WO-2022181701 A1 * | 9/2022 |
| WO | WO-2022209746 A1 * | 10/2022 |
| WO | WO-2022209747 A1 * | 10/2022 |
| WO | WO-2022244472 A1 * | 11/2022 |

OTHER PUBLICATIONS

International Search Report for PCT/JP2020/013053 mailed on Jun. 16, 2020.

Office Action mailed on May 28, 2024 with respect to the corresponding Chinese patent application No. 202080024881.4.

* cited by examiner

ABSOLUTE ENCODER

TECHNICAL FIELD

The present invention relates to absolute encoders.

BACKGROUND ART

Conventionally, when controlling various mechanical devices, it is known to use rotary encoders to detect positions and angles of movable elements. Such encoders include incremental encoders for detecting a relative position or angle, and absolute encoders for detecting an absolute position or angle. For example, Patent Document 1 describes an absolute rotary encoder having a plurality of magnetic encoder parts for detecting angular positions of a spindle and a layshaft using magnetism, and configured to measure an absolute position of the spindle from results of the detection.

PRIOR ART DOCUMENTS

Patent Documents

Patent Document 1: Japanese Laid-Open Patent Publication No. 2013-24572

DISCLOSURE OF THE INVENTION

Problem to be Solved by the Invention

In the absolute encoder described in Patent Document 1, a magnetic field generating element (magnet) is provided at one end of the layshaft, and a magnetic field generated from the magnetic field generating element is detected by a magnetic detecting element. In this state, the magnetic detecting element may not be able to detect an appropriate angular position of the spindle if a center of the magnetic field generating element, a center of the layshaft, and a center of the magnetic detecting element become misaligned, if rotations of the magnetic field generating element and the layshaft are not synchronized, or the like.

The present invention was conceived in view of the foregoing, and one object thereof is to provide an absolute encoder which can more positively hold the magnet.

Means of Solving the Problem

An absolute encoder according to one embodiment of the present invention includes a first driving gear, fixed to a spindle, coaxially with the spindle, and configured to rotate according to a rotation of the spindle; a magnet provided on the first driving gear; a first driven gear, having a center axis perpendicular to a center axis of the first driving gear, and configured to engage the first driving gear; a second driving gear, provided coaxially with the first driven gear, and configured to rotate according to a rotation of the first driven gear; and a second driven gear, having a center axis perpendicular to the center axis of the first driven gear, and configured to engage the second driven gear, wherein the first driving gear includes a cylindrical portion fit onto a tip end of the spindle, coaxially with the spindle, and an annular portion having a teeth portion, configured to engage the first driven gear, and provided on an outer side thereof in a radial direction, and wherein the annular portion is provided coaxially with the spindle and adjacent to the cylindrical portion.

Effects of the Invention

The absolute encoder according to the present invention can obtain an effect in that it is possible to more positively hold the magnet.

MODE OF CARRYING OUT THE INVENTION

Hereinafter, a configuration of an absolute encoder according to embodiments of the present invention will be described in detail, with reference to the drawings. Of course, the present invention is not limited the described embodiments.

Embodiment 1

Figure 1:
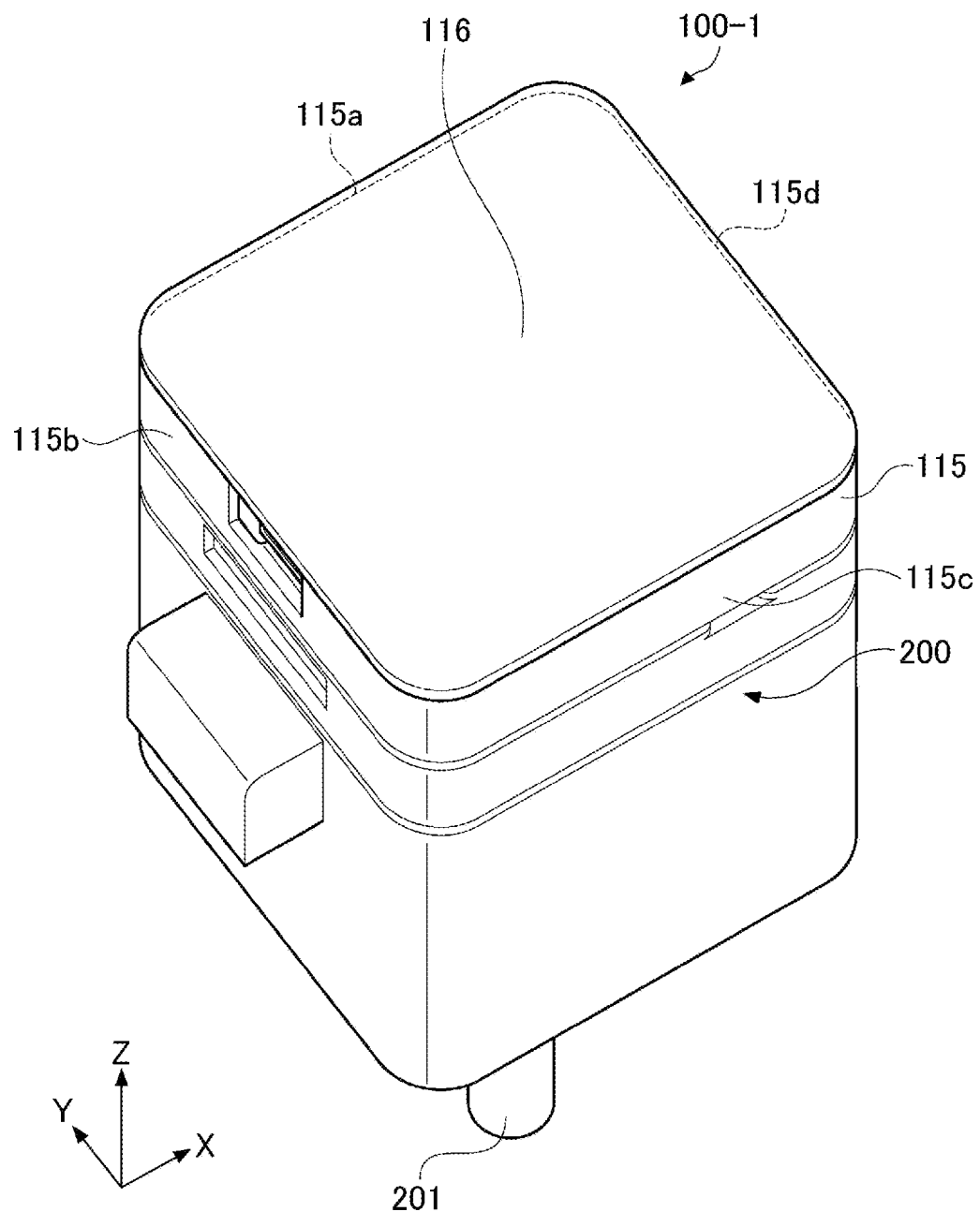
FIG. 1 is a perspective view illustrating a state in which an absolute encoder 100-1 according to an embodiment 1 of the present invention is attached to a motor 200.

FIG. 1 is a perspective view illustrating a state in which the absolute encoder 100-1 according to an embodiment 1 of the present invention is attached to the motor 200. The description hereinafter will be based on the XYZ orthogonal coordinate system. The X-axis direction corresponds to a horizontal left and right direction, the Y-axis direction corresponds to a horizontal front and rear direction, and the Z-axis direction corresponds to a vertical up and down direction. The Y-axis direction and the Z-axis direction are perpendicular to the X-axis direction, respectively. The X-axis direction may be referred to as the left direction or the right direction, the Y-axis direction may be referred to as the front direction or the rear direction, and the Z-axis direction may be referred to as the up direction or the down direction. In FIG. 1, a state viewed from above in the Z-axis direction is referred to as a plan view, a state viewed from the front in the Y-axis direction is referred to as a front view, and states viewed from the left and right in the X-axis direction are referred to as side views. Such designations of the directions do not limit an orientation in which the absolute encoder 100-1 is used, and the absolute encoder 100-1 may be used in an arbitrary orientation. In addition, the illustration of a gear profile is omitted in the drawings.

Figure 2:
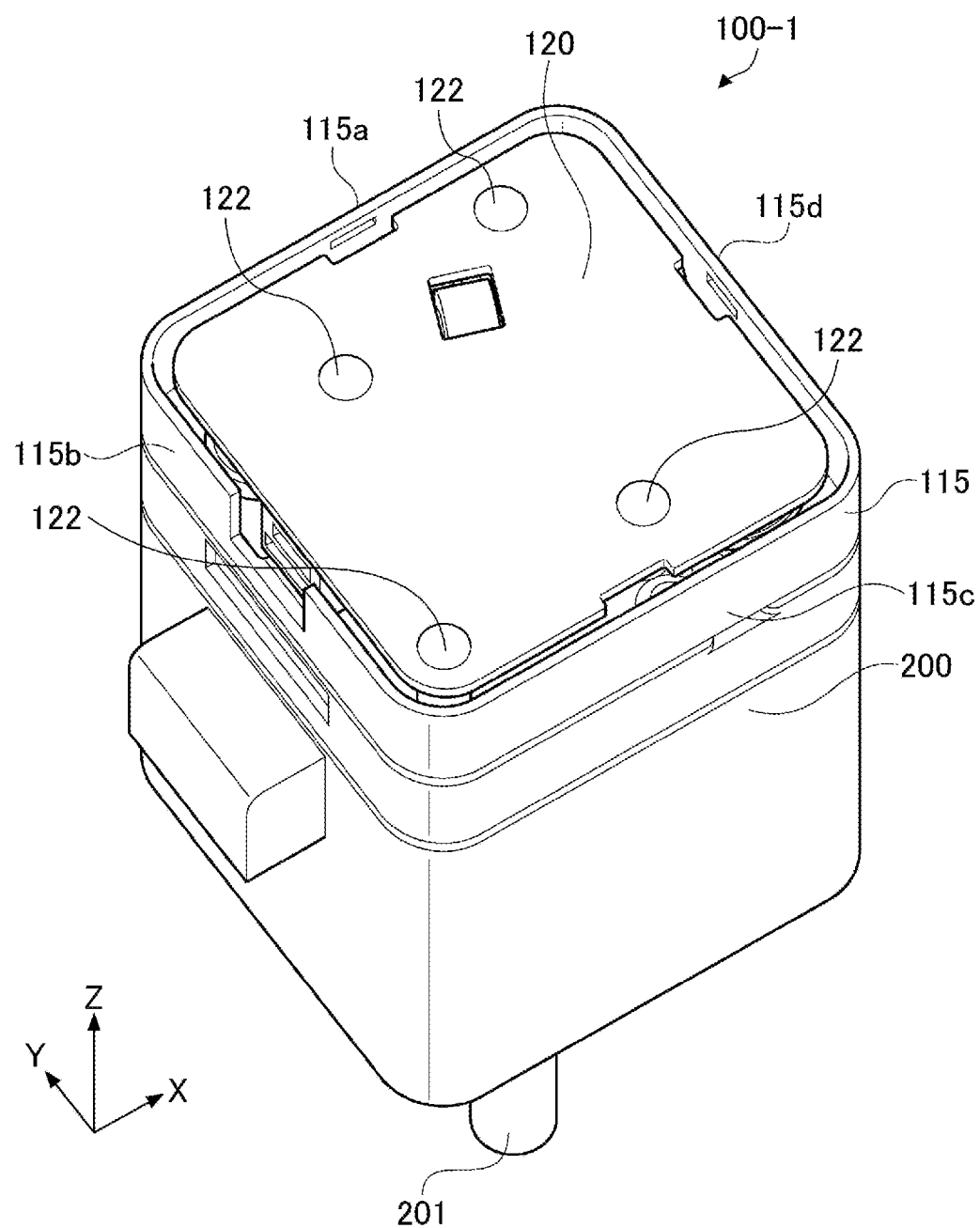
FIG. 2 is a perspective view illustrating a state in which a lid 116 is removed from a case 115 illustrated in FIG. 1.
Figure 3:
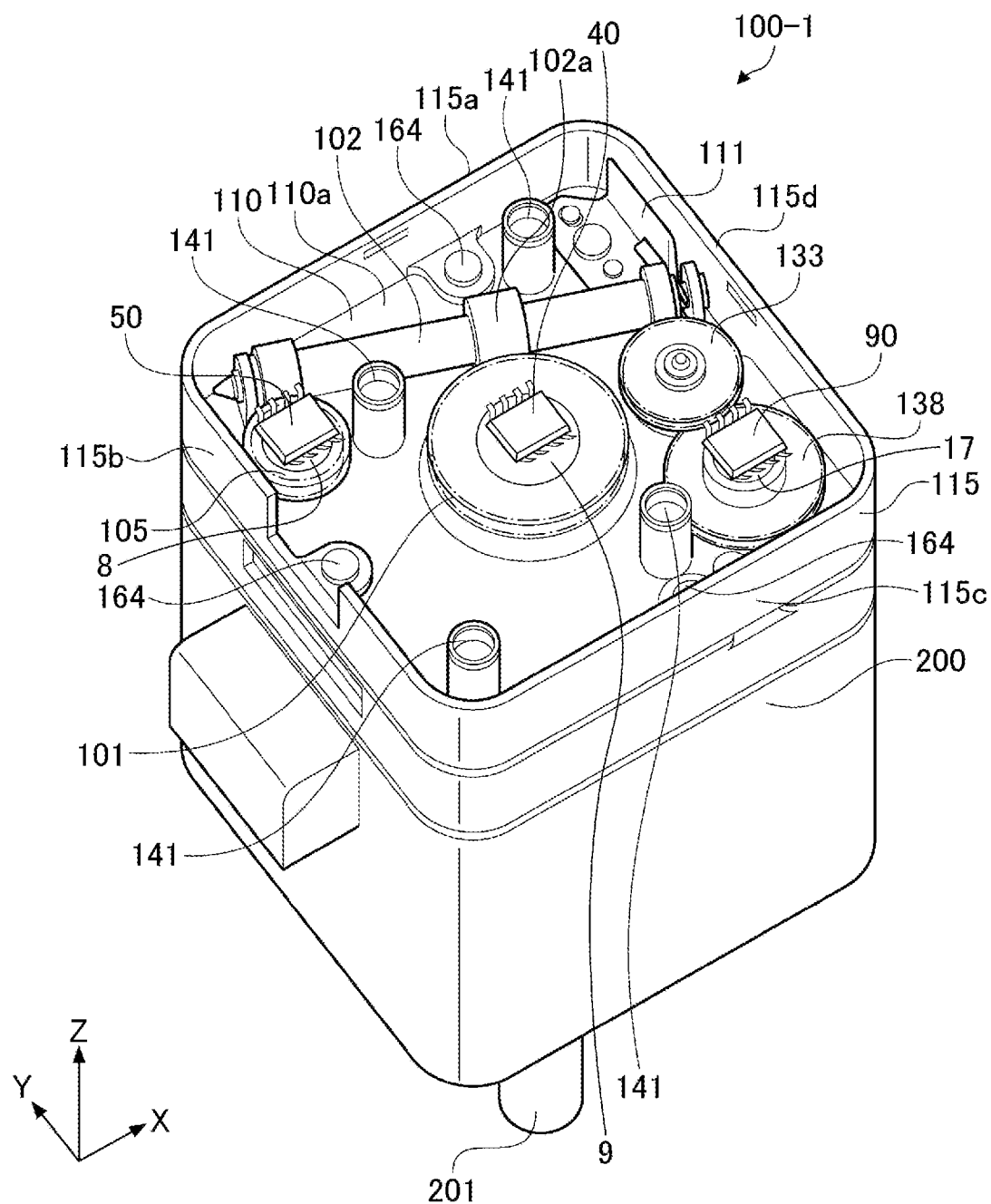
FIG. 3 is a perspective view illustrating a state in which a substrate 120 and a substrate attaching screws 122 are removed from the absolute encoder 100-1 illustrated in FIG. 2.
Figure 4:
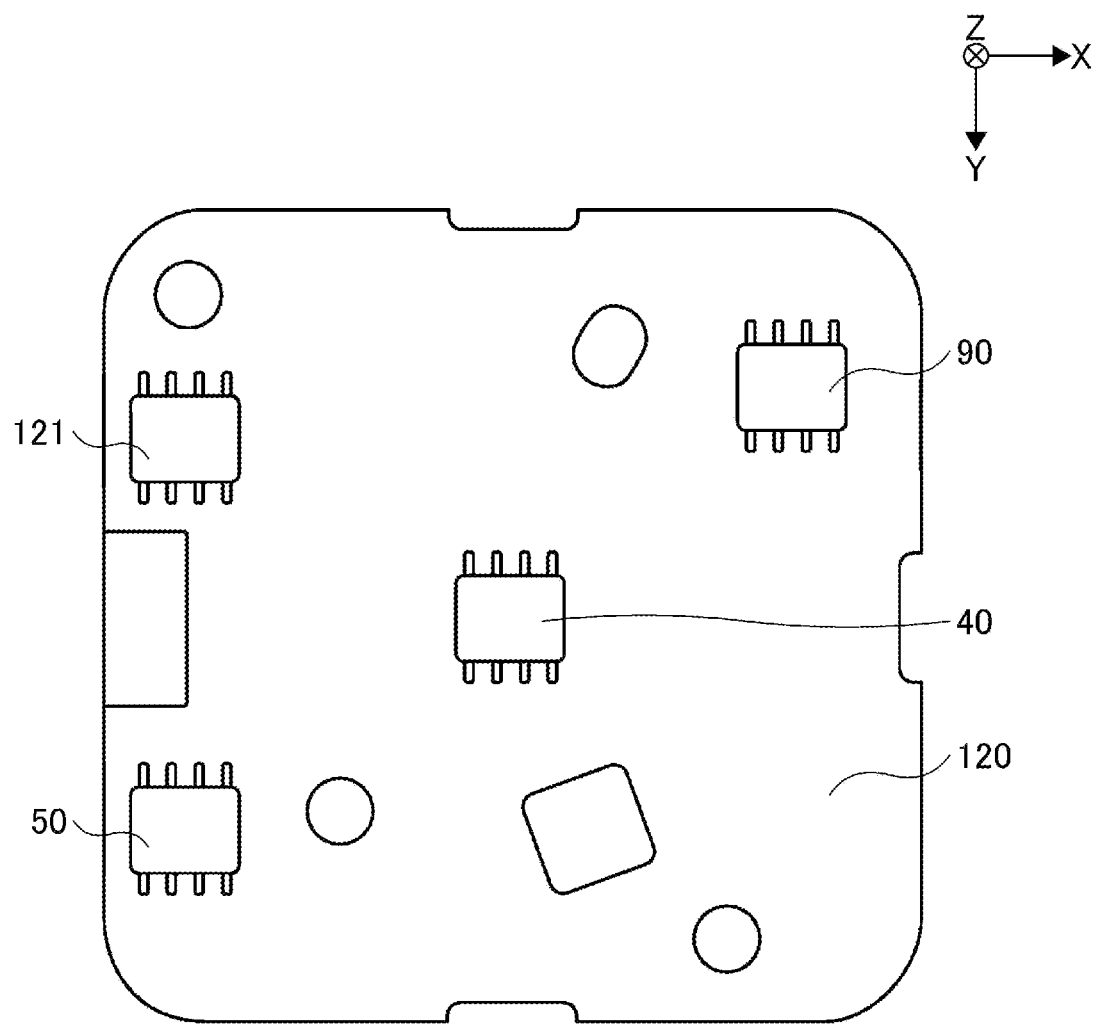
FIG. 4 is a bottom view of the substrate 120.
Figure 5:
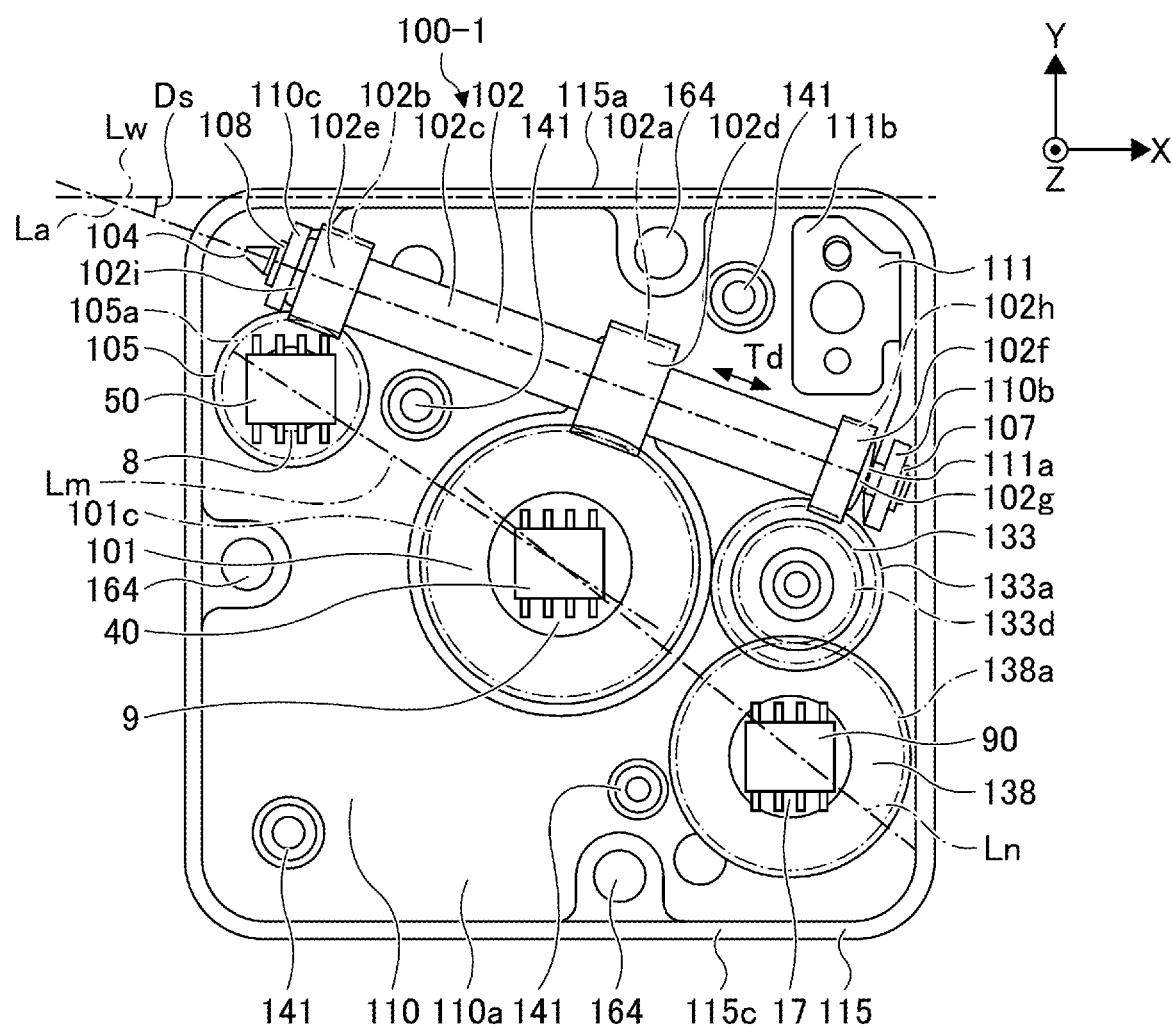
FIG. 5 is a plan view of the absolute encoder 100-1 illustrated in FIG. 3.
Figure 6:
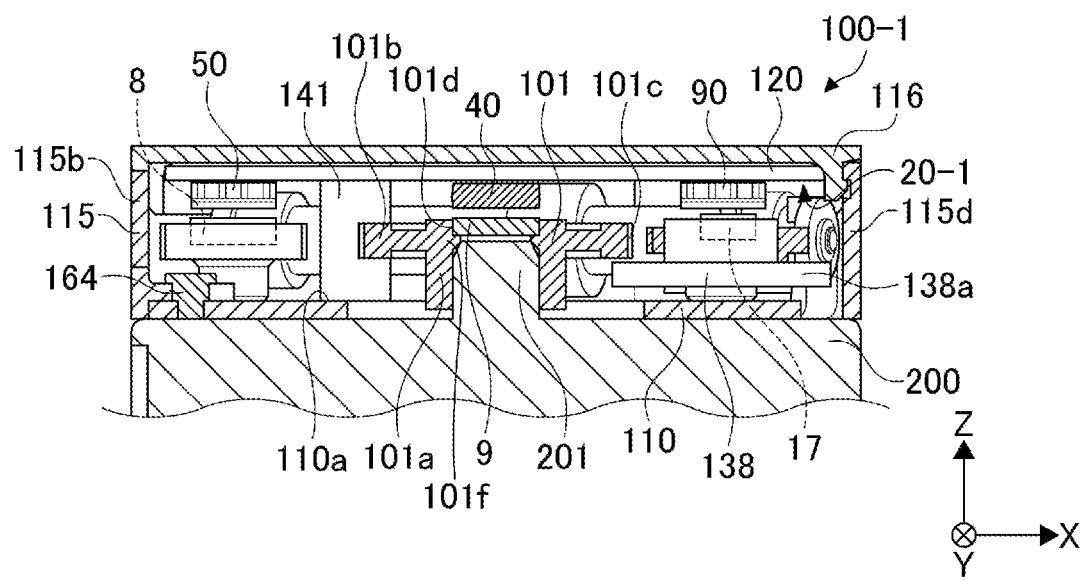
FIG. 6 is a cross sectional view of a state in which the absolute encoder 100-1 is cut along a plane passing through the center of a motor shaft 201 and parallel to an X-Z plane. However, a second layshaft gear 138 and a magnetic sensor 90 are illustrated.
Figure 7:
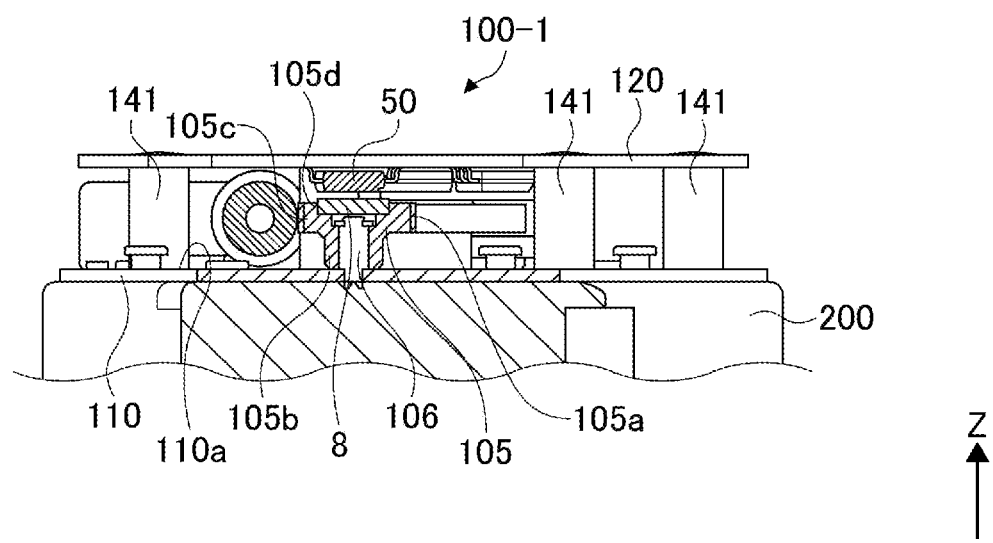
FIG. 7 is a cross sectional view of the absolute encoder 100-1 cut along a plane perpendicular to a center line of a first intermediate gear 102 and passing through a center of a first layshaft gear 105.
Figure 8:
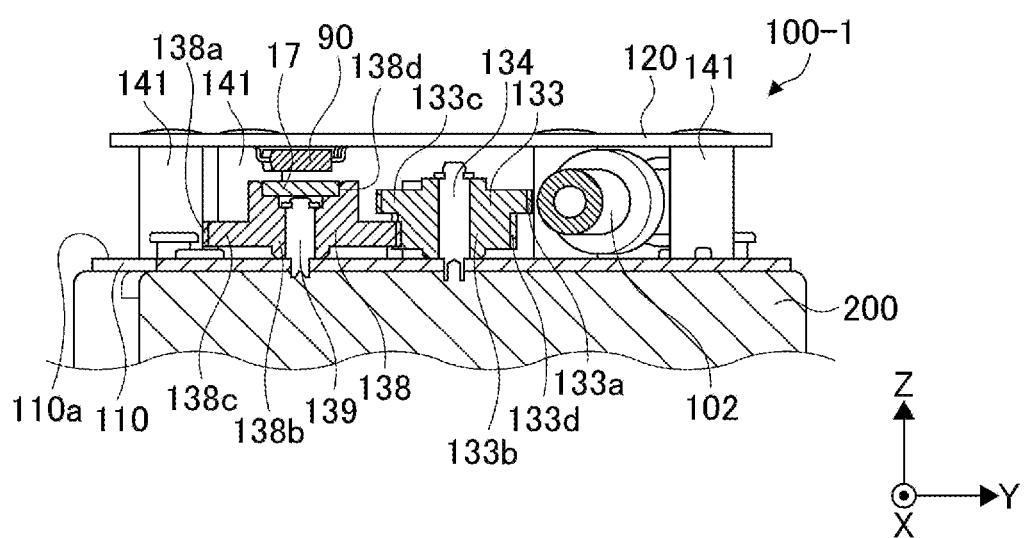
FIG. 8 is a cross sectional view of a state in which the absolute encoder 100-1 is cut along a plane passing through a center of the second layshaft gear 138 and a center of a second intermediate gear 133 and parallel to a Z-axis direction, viewed from approximately the right side.

FIG. 2 is a perspective view illustrating a state in which the lid 116 is removed from the case 115 illustrated in FIG. 1. FIG. 3 is a perspective view illustrating the substrate 120 and substrate attaching screws 122 removed from the absolute encoder 100-1 illustrated in FIG. 2. FIG. 4 is a bottom view of the substrate 120. FIG. 5 is a plan view of the absolute encoder 100-1 illustrated in FIG. 3. FIG. 6 is a cross sectional view of the absolute encoder 100-1 cut along a plane passing through the center of the motor shaft 201 and parallel to the X-Z plane. However, the second layshaft gear 138 and the magnetic sensor 90 are illustrated. FIG. 7 is a cross sectional view of the absolute encoder 100-1 cut along a plane perpendicular to a center line of the first intermediate gear 102 and passing through the center of the first layshaft gear 105. In FIG. 7, the illustration of the case 115 and the lid 116 is omitted. FIG. 8 is a cross sectional view of a state in which the absolute encoder 100-1 is cut along a plane passing through the center of the second layshaft gear 138 and the center of the second intermediate gear 133 and parallel to the Z-axis direction, viewed from approximately the right side. In FIG. 8, the illustration of the case 115 and the lid 116 is omitted.

Hereinafter, the configuration of the absolute encoder 100-1 will be described in detail, by referring to FIG. 1 through FIG. 8. The absolute encoder 100-1 is an absolute encoder which determines and outputs a rotation quantity over multiple revolutions of a spindle of the motor 200. The motor 200 may be a stepping motor or a brushless DC motor, for example. As an example, the motor 200 may be applied as a driving source which drives an industrial robot or the like via a deceleration mechanism, such as a harmonic gearing device or the like. The motor shaft 201 of the motor 200 protrudes from both sides of the motor 200 in the Z-axis direction. The absolute encoder 100-1 outputs the rotation quantity of the motor shaft 201 as a digital signal. The motor shaft 201 is an example of the spindle.

The absolute encoder 100-1 is provided at an end of the motor 200 in the Z-axis direction. Although the shape of the absolute encoder 100-1 is not particularly limited, the absolute encoder 100-1 according to the embodiment 1 has an approximately rectangular shape in the plan view, and has a thin rectangular shape elongated in an elongation direction of the spindle (hereinafter referred to as an axial direction. In the embodiment 1, the axial direction is a direction parallel to the Z-axis direction) in the front view and the side view. In other words, the absolute encoder 100-1 has a parallelepiped shape which is flat in the Z-axis direction.

The absolute encoder 100-1 includes a case 115 which has a hollow rectangular tube shape and accommodates internal structures. The case 115 includes a plurality (for example, four) outer wall sections including an outer wall section 115a, an outer wall section 115b, an outer wall section 115c, and an outer wall section 115d which surround at least the spindle and an intermediate rotating body. The lid 116 is fixed to ends of the outer wall section 115a, the outer wall section 115b, the outer wall section 115c, and the outer wall section 115d of the case 115. The lid 116 is a member having an approximately rectangular shape in the plan view, and a thin plate shape in the axial direction.

The outer wall section 115a, the outer wall section 115b, the outer wall section 115c, and the outer wall section 115d are connected in this order. The outer wall section 115a and the outer wall section 115c are provided parallel to each other. The outer wall section 115b and the outer wall section 115d bridge the sides of the outer wall section 115a and the outer wall section 115c, and are provided in parallel to each other. In this example, the outer wall section 115a and the outer wall section 115c extend in the X-axis direction in the plan view, and the outer wall section 115b and the outer wall section 115d extend in the Y-axis direction in the plan view.

The absolute encoder 100-1 includes a main base 110, the case 115, the lid 116, the substrate 120, the leaf spring 111, and a plurality of screws 164. The main base 110 is a base which rotatably supports each rotating body and each gear. The main base 110 includes a base portion 110a, a plurality of (for example, four) supports 141, and a shaft 106, a shaft 134, and a shaft 139.

The base portion 110a of the main base 110 is a plate shaped portion facing side of the motor 200 of the absolute encoder 100-1, and extending in the X-axis direction and the Y-axis direction. The hollow rectangular tube shaped case 115 is fixed to the base portion 110a of the main base 110 by the plurality of (for example, three) screws 164.

The supports 141 disposed on the main base 110 are approximately cylindrical portions protruding from the base portion 110a in the axial direction away from the motor 200, and support the substrate 120. The substrate 120 is fixed to the protruding ends of the supports 141 using the substrate attaching screws 122. FIG. 2 illustrates a state in which the substrate 120 is provided to cover the interior of the encoder. The substrate 120 is a printed wiring board having a thin plate shape in the axial direction, and having an approximately rectangular shape in the plan view. The substrate 120 is mounted mainly with the magnetic sensor 50, the magnetic sensor 40, the magnetic sensor 90, and the microcomputer 121.

In addition, the absolute encoder 100-1 includes the spindle gear 101, a worm gear portion 101c, a worm wheel portion 102a, a first intermediate gear 102, a first worm gear portion 102b, a worm wheel portion 105a, a first layshaft gear 105, a second worm gear portion 102h, and a worm wheel portion 133a. Further, the absolute encoder 100-1 includes the second intermediate gear 133, a fourth driving gear portion 133d, a fourth driven gear portion 138a, the second layshaft gear 138, the permanent magnet 8, the permanent magnet 9, the permanent magnet 17, the magnetic sensor 50, the magnetic sensor 40, the magnetic sensor 90, and the microcomputer 121.

The spindle gear 101 rotates according to the rotation of the motor shaft 201, and transmits the rotation of the motor shaft 201 to the worm gear portion 101c. As illustrated in FIG. 6, the spindle gear 101 includes a first cylindrical portion 101a fit around an outer periphery of the motor shaft 201, a disk portion 101b on which a worm gear portion 101c is formed, and a magnet holder 101d which holds the permanent magnet 9. The magnet holder 101d has a cylindrical recess shape that is provided in an upper surface of the first cylindrical portion 101a at a center of the disk portion 101b. The first cylindrical portion 101a, the disk portion 101b, and the magnet holder 101d are integrally formed so that center axes thereof approximately coincide with each other. The spindle gear 101 may be formed of any of various materials, such as resin materials, metallic materials, or the like. The spindle gear 101 may be formed of a polyacetal resin, for example.

The worm gear portion 101c is an example of a first driving gear which drives the worm wheel portion 102a. In particular, the worm gear portion 101c is a worm gear having a number of teeth=1 formed on the outer periphery of the disk portion 101b. A rotation axis of the worm gear portion 101c extends in the axial direction of the motor shaft 201.

As illustrated in FIG. 5, the first intermediate gear 102 is a gear portion that transmits the rotation of the spindle gear 101 to the worm wheel portion 105a and the second intermediate gear 133. The first intermediate gear 102 is rotatably supported around a rotation axis La extending approximately parallel to the base portion 110a, by a shaft 104. The first intermediate gear 102 is an approximately cylindrical member extending in the direction of the rotation axis La thereof. The first intermediate gear 102 includes a base portion 102c, a first cylindrical portion 102d on which the worm wheel portion 102a is formed, a second cylindrical portion 102e on which the first worm gear portion 102b is formed, and a third cylindrical portion 102f on which the second worm gear portion 102h is formed. A through hole is formed inside the first intermediate gear 102, and the shaft 104 penetrates the through hole. The shaft 104 is inserted into holes formed in a support portion 110b and a support portion 110c provided on the base portion 110a of the main base 110, to rotatably support the first intermediate gear 102. A groove is provided near both ends of the shaft 104 protruding outwardly from the support portion 110b and the support portion 110c, respectively, and a retaining ring 107 and a snap ring 108 are fit into the groove to prevent the shaft 104 from slipping out.

The outer wall section 115a is provided on the side of the first intermediate gear 102 opposite to the motor shaft 201. The outer wall section 115c is provided on the side where the motor shaft 201 of the first intermediate gear 102 is arranged parallel to the outer wall section 115a. The first intermediate gear 102 may be arranged so that the rotation axis La thereof faces an arbitrary direction. In the plan view, the rotation axis La of the first intermediate gear 102 may be provided in a range inclined by 5° to 30° with respect to the direction in which the outer wall section 115a is provided on the side of the first intermediate gear 102 opposite to the motor shaft 201. In the example of FIG. 5, the rotation axis La of the first intermediate gear 102 is inclined by 20° with respect to the direction in which the outer wall section 115a extends. In other words, in the plan view, the case 115 includes the outer wall section 115a extending in the direction inclined by 5° to 30° with respect to the rotation axis La of the first intermediate gear 102. In the example of FIG. 5, an inclination Ds of the rotation axis La of the first intermediate gear 102 with respect to the direction in which the outer wall section 115a extends is set to 20°.

In the embodiment 1, the base portion 102c of the first intermediate gear 102 has a cylindrical shape, and the first cylindrical portion 102d, the second cylindrical portion 102e, and the third cylindrical portion 102f have a cylindrical shape with a diameter larger than a diameter of the base portion 102c. In addition, a through hole is formed at a center of the first intermediate gear 102. The base portion 102c, the first cylindrical portion 102d, the second cylindrical portion 102e, the third cylindrical portion 102f, and the through hole are integrally formed so that center axes thereof approximately coincide with one another. The second cylindrical portion 102e, the first cylindrical portion 102d, and the third cylindrical portion 102f are arranged in this order at mutually separated positions. The first intermediate gear 102 can be formed of any of various materials, such as resin materials, metallic materials, or the like. In the embodiment 1, the first intermediate gear 102 is formed of a polyacetal resin.

Each of the support portion 110b and the support portion 110c is a protruding member which protrudes from the base portion 110a in the Z-axis positive direction, by cutting and raising a portion of the base portion 110a of the main base 110, and is formed with the hole penetrated by the shaft 104 of the first intermediate gear 102. In addition, the groove is provided near both ends of the shaft 104 protruding outwardly from the support portion 110b and the support portion 110c, respectively, and the retaining ring 107 and the snap ring 108 are fit into the groove to prevent the shaft 104 from slipping out. By employing such a configuration, the first intermediate gear 102 is rotatably supported at the rotation axis La.

The leaf spring 111 will be described. When the first worm gear portion 102b and the second worm gear portion 102h drive the respective worm wheels, a reaction force acts in an axial direction Td of the first intermediate gear 102, and the position of the first intermediate gear 102 may deviate in the axial direction Td. Accordingly, in the embodiment 1, the leaf spring 111 is provided to apply a biasing force to the first intermediate gear 102. The leaf spring 111 applies the biasing force in the rotation axis La of the first intermediate gear 102, with respect to the first intermediate gear 102, to reduce the positional deviation in the axial direction Td. The leaf spring 111 includes an attaching portion 111b which is attached to the base portion 110a of the main base 110, and a sliding portion 111a which extends from the attaching portion 111b and makes contact with a hemispherical projection 102g. The attaching portion 111b and the sliding portion 111a are formed of a thin plate shaped spring member, and an intermediate portion of a base of the sliding portion 111a is bent approximately at right angles to the attaching portion 111b. Because the leaf spring 111 makes direct contact with and presses against the hemispherical projection 102g of the first intermediate gear 102, the first intermediate gear 102 is biased in the axial direction Td. Further, a sliding portion 102i of the first intermediate gear 102 makes contact with and slides against the support portion 110c of the main base 110. Hence, it is possible to reduce the positional deviation of the first intermediate gear 102 in the axial direction Td.

In the embodiment 1, the direction of the reaction force received by the first intermediate gear 102 from the worm wheel portion 105a of the first layshaft gear 105 when the first want gear portion 102b which engages the worm wheel portion 105a of the first layshaft gear 105 rotates, is set to be in the opposite direction to the direction of the reaction force received by the first intermediate gear 102 from the worm wheel portion 133a of the second intermediate gear 133 when the second worm gear portion 102h which engages the worm wheel portion 133a of the second intermediate gear 133 rotates. In other words, the gear profile of each worm gear is set so that components of these two reaction forces in the axial direction Td of the first intermediate gear 102 act in mutually opposite directions. More particularly, an inclination direction of the teeth of each worm gear is set so that the components of these two reaction forces in the axial direction Td applied from the worm gears to the first intermediate gear 102 act in mutually opposite directions. In this case, because a combined reaction force in the axial direction Td becomes small compared to a case where the components of the reaction forces in the axial direction Td received by the first intermediate gear 102 from the worm gears act in the same direction, it is possible to reduce the biasing force of the leaf spring 111 according to the small combined reaction force. Hence, a rotational resistance of the first intermediate gear 102 can be reduced, thereby enabling smooth rotation of the first intermediate gear 102.

The method described above is effective when a sliding resistance caused by the engagement between the worm gear portion 101c of the spindle gear 101 and the worm wheel portion 102a of the first intermediate gear 102 is relatively small, and the force in the axial direction Td acting on the first intermediate gear 102 due to the rotation of the spindle gear 101 is relatively small compared to the reaction force received by the first intermediate gear 102 from the worm wheel portion 105a of the first layshaft gear 105 and the worm wheel portion 133a of the second intermediate gear 133. However, the following method is effective when the sliding resistance between the worm gear portion 101c of the spindle gear 101 and the worm wheel portion 102a of the first intermediate gear 102 is relatively large.

In FIG. 5, when the spindle gear 101 rotates clockwise, a force acts on the first intermediate gear 102 to the right with respect to the axial direction Td due to the sliding resistance caused by the engagement between the worm gear portion 101c of the spindle gear 101 and the worm wheel portion 102a of the first intermediate gear 102, and the first intermediate gear 102 is urged to move clockwise. In this state, when the forces generated in the axial direction Td by the worm gears at both ends of the first intermediate gear 102 are set to be mutually canceled by the method described above, the clockwise force acting on the first intermediate gear 102 becomes relatively large due to the sliding resistance caused by the engagement between the worm gear portion 101c of the spindle gear 101 and the worm wheel portion 102a of the first intermediate gear 102 as described above. In order to prevent the first intermediate gear 102 from moving clockwise against the clockwise force acting on the first intermediate gear 102, the pressing force of the leaf spring 111 needs to be large. Consequently, the sliding resistance between the sliding portion 111a of the leaf spring 111 and the hemispherical projection 102g of the first intermediate gear 102 pressed against the sliding portion 111a, and the sliding resistance between the sliding portion 102i and the support portion 110c positioned at the end of the first intermediate gear 102 on the opposite side from the hemispherical projection 102g, increase, thereby making the rotational resistance of the first intermediate gear 102 large.

When the spindle gear 101 rotates clockwise, the direction of the reaction force received by the first intermediate gear 102 from the worm wheel portion 105a of the first layshaft gear 105 due to the rotation of the first worm gear portion 102b which engages the worm wheel portion 105a of the first layshaft gear 105, and the direction of reaction force received by the first intermediate gear 102 from the warm wheel portion 133a of the second intermediate gear 133 due to the rotation of the second worm gear portion 102h which engages the worm wheel portion 133a of the second intermediate gear 133, can both set to the direction of a force which urges the first intermediate gear 102 to move to the left with respect to the axial direction Td. By this setting, the clockwise force acting on the first intermediate gear 102 due to the sliding resistance caused by the engagement between the worm gear portion 101c of the spindle gear 101 and the worm wheel portion 102a of the first intermediate gear 102 described above, can be made small. For this reason, the biasing force applied to the first intermediate gear 102 by the leaf spring 111 can be made small. Hence, it is possible to reduce the rotational resistance of the first intermediate gear 102, and smoothly rotate the first intermediate gear 102.

On the other hand, when the spindle gear 101 rotates counterclockwise, a force acts on the first intermediate gear 102 to the left with respect to the axial direction Td due to the sliding resistance caused by the engagement between the worm gear portion 101c of the spindle gear 101 and the worm wheel portion 102a of the first intermediate gear 102, and the first intermediate gear 102 is urged to move counterclockwise. In this state, the reaction forces receive by the first worm gear portion 102b and the second worm gear portion 102h at both ends of the first intermediate gear 102 both become forces which urge the first intermediate gear 102 to move clockwise. Accordingly, the counterclockwise force acting on the first intermediate gear 102 can also be made small in this case. Because the biasing force applied to the first intermediate gear 102 by the leaf spring 111 is always a counterclockwise force with respect to the axial direction Td, the counterclockwise forces applied to the first intermediate gear 102 due to the engagement of the gears at the three locations described above become small, thereby also making the overall counterclockwise force applied to the first intermediate gear 102 small. Accordingly, the rotational resistance caused by the sliding between the sliding portion 102i at the left end of the first intermediate gear 102, and the support portion 110c provided on the base portion 110a of the main base 110, can be made small.

In FIG. 5, the worm wheel portion 102a is an example of a first driven gear which engages the worm gear portion 101c of the spindle gear 101. The worm wheel portion 102a is a worm wheel having a number of teeth=20 formed on the outer periphery of the first cylindrical portion 102d. The worm gear portion 101c and the worm wheel portion 102a form a first worm transmission mechanism. A rotation axis of the worm wheel portion 102a extends in a direction perpendicular to the axial direction of the motor shaft 201.

When the number of teeth of the worm gear portion 101c of the spindle gear 101 is 1, and the number of teeth of the worm wheel portion 102a of the first intermediate gear 102 is 20, a reduction gear ratio is 20. In other words, when the spindle gear 101 makes 20 revolutions, the first intermediate gear 102 makes 20÷20=1 revolution.

The first worm gear portion 102b is an example of a second driving gear which drives the worm wheel portion 105a, and is a gear portion of the first intermediate gear 102. In particular, the first worm gear portion 102b is a worm gear having a number of teeth=5 formed on the outer periphery of the second cylindrical portion 102e. A rotation axis of the first worm gear portion 102b extends in a direction perpendicular to the axial direction of the motor shaft 201.

In FIG. 5 and FIG. 7, the first layshaft gear 105 is decelerated and rotates unitarily with the permanent magnet 8, according to the rotation of the motor shaft 201. The first layshaft gear 105 is a member having an approximately circular shape in the plan view, and includes a cylindrical bearing portion 105b rotatably supported on the shaft 106 projecting approximately perpendicularly from the base portion 110a of the main base 110, a disk portion 105c on which the worm wheel portion 105a is formed, and a holder 105d which holds the permanent magnet 8.

In FIG. 7, the disk portion 105c has a disk shape protruding radially from the outer periphery of the bearing portion 105b. In the embodiment 1, the disk portion 105c is provided at a position near the end of the bearing portion 105b farther away from the base portion 110a. The holder 105d has a cylindrical recess shape provided in the end surface of the disk portion 105c, farther away from the base portion 110a in the axial direction of the disk portion 105c. The bearing portion 105b, the disk portion 105c, and the holder 105d are integrally famed so that center axes thereof approximately coincide with one another. The first layshaft gear 105 may be faulted of any of various materials, such as resin materials, metallic materials, or the like. In the embodiment 1, the first layshaft gear 105 is formed of a polyacetal resin.

The worm wheel portion 105a is an example of a second driven gear to which the first worm gear portion 102b engages. In particular, the worm wheel portion 105a is a gear having a number of teeth=25 formed on the outer periphery of the disk portion 105c. The first worm gear portion 102b and the worm wheel portion 105a form a second worm transmission mechanism. A rotation axis of the worm wheel portion 105a extends in a direction parallel to the axial direction of the motor shaft 201.

When the number of teeth the first worm gear portion 102b of the first intermediate gear 102 is 5, and the number of teeth of the worm wheel portion 105a of the first layshaft gear 105 is 25, the reduction gear ratio is 5. In other words, when the first intermediate gear 102 makes 5 revolutions, the first layshaft gear 105 makes 1 revolution. Accordingly, when the spindle gear 101 makes 100 revolutions, the first intermediate gear 102 makes 100÷20=5 revolutions, and the first layshaft gear 105 makes 5÷5=1 revolution. Because the first layshaft gear 105 rotates unitarily with the permanent magnet 8, the permanent magnet 8 makes 1 revolution when the spindle gear 101 makes 100 revolutions. In other words, the magnetic sensor 50 can determine a rotation quantity corresponding to 100 revolutions of the spindle gear 101.

The absolute encoder 100-1 having the configuration described above can determine a rotation quantity of the spindle gear 101. As an example, when the spindle gear 101 makes 1 revolution, the first layshaft gear 105 and the permanent magnet 8 make 1/100 revolution, or rotate by 3.6°. For this reason, if the rotation angle of the first layshaft gear 105 is 3.6°, it is possible to determine that the rotation quantity of the spindle gear 101 is less than 1 revolution.

In FIG. 5, the second worm gear portion 102h is an example of a third driving gear which drive the worm wheel portion 133a, and is a gear portion of the first intermediate gear 102. More particularly, the second worm gear portion 102h is a worm gear having a number of teeth=1 formed in the outer periphery of the third cylindrical portion 102f. A rotation axis of the second worm gear portion 102h extends in a direction perpendicular to the axial direction of the motor shaft 201.

In FIG. 5, the second intermediate gear 133 is a disk shaped gear that rotates according to the rotation of the motor shaft 201, and decelerates the rotation of the motor shaft 201 to transmit the decelerated rotation to the second layshaft gear 138. The second intermediate gear 133 is provided between the second worm gear portion 102h, and the fourth driven gear portion 138a provided on the second layshaft gear 138. The fourth driven gear portion 138a engages the fourth driving gear portion 133d. The second intermediate gear 133 includes the worm wheel portion 133a which engages the second worm gear portion 102h of the third driving gear portion, and the fourth driving gear portion 133d which drives the fourth driven gear portion 138a. The second intermediate gear 133 is formed of a polyacetal resin, for example. The second intermediate gear 133 is a member having a circular shape in the plan view. The second intermediate gear 133 includes a bearing portion 133b rotatably supported on the base portion 110a of the main base 110, and a flange portion 133c on which the worm wheel portion 133a is formed.

In FIG. 5, by providing the second intermediate gear 133, the second layshaft gear 138, which will be described later, can be disposed at a position separated from the second worm gear portion 102h. For this reason, the distance between the permanent magnet 9 and the permanent magnet 17 can be made long to reduce leakage magnetic fluxes thereof affecting each other. In addition, by providing the second intermediate gear 133, a range in which the reduction gear ratio can be set is expanded, thereby improving the freedom of the design.

In FIG. 8, the flange portion 133c has a disk shape protruding radially from the outer periphery of the bearing portion 133b. In the embodiment 1, the flange portion 133c is provided at a position near the end of the bearing portion 133b farther away from the base portion 110a of the main base 110. The fourth driving gear portion 133d is formed in an outer periphery of a region on the side closer to the base portion 110a than the flange portion 133c of the bearing portion 133b. The bearing portion 133b and the flange portion 133c are integrally foisted so that center axes thereof approximately coincide with each other.

The worm wheel portion 133a is a gear portion of the second intermediate gear 133, which engages the second worm gear portion 102h. In particular, the worm wheel portion 133a is a worm wheel having a number of teeth=30 formed on the outer periphery of the flange portion 133c. The second worm gear portion 102h and the worm wheel portion 133a form a third worm transmission mechanism. A rotation axis of the worm wheel portion 133a extends in a direction parallel to the axial direction of the motor shaft 201.

When the number of teeth of the second worm gear portion 102h of the first intermediate gear 102 is 1, and the number of teeth of the worm wheel portion 133a of the second intermediate gear 133 is 30, the reduction gear ratio is 30. In other words, when the first intermediate gear 102 makes 30 revolutions, the second intermediate gear 133 makes 1 revolution. Accordingly, when the spindle gear 101 makes 600 revolutions, the first intermediate gear 102 makes 600÷20=30 revolutions, and the second intermediate gear 133 makes 30÷30=1 revolution.

The fourth driving gear portion 133d is a transmission element which drives the fourth driven gear portion 138a. The fourth driving gear portion 133d is provided on the side of the spindle gear 101 opposite to the side closer to the first layshaft gear 105, and rotates according to the rotation of the worm wheel portion 133a. The fourth driving gear portion 133d is a spur gear having a number of teeth=24 formed on the outer periphery of the bearing portion 133b.

In FIG. 8, the second layshaft gear 138 is a gear portion having a circular shape in the plan view, which rotates according to the rotation of the motor shaft 201, decelerates the rotation of the motor shaft 201, and transmits the decelerated rotation to the permanent magnet 17. The second layshaft gear 138 is rotatably supported around a rotation axis extending approximately perpendicularly from the base portion 110a of the main base 110. The second layshaft gear 138 includes a bearing portion 138b rotatably supported on the base portion 110a of the main base 110, a flange portion 138c on which the fourth driven gear portion 138a is formed, and a magnet holder 138d which holds the permanent magnet 17. The bearing portion 138b has a cylindrical ring shape which surrounds the shaft 139 projecting from the base portion 110a of the main base 110 via a gap.

The flange portion 138c has a disk shape protruding radially from the outer periphery of the bearing portion 138b. In the embodiment 1, the flange portion 138c is provided on the bearing portion 138b at a position near the base portion 110a of the main base 110. The magnet holder 138d has a cylindrical recess shape provided in the end surface of the bearing portion 138b, farther away from the base portion 110a in the axial direction of the bearing portion 138b. The bearing portion 138b, the flange portion 138c, and the magnet holder 138d are integrally formed so that center axes thereof approximately coincide with one another. The second layshaft gear 138 may be formed of any of various materials, such as resin materials, metallic materials, or the like. In the embodiment 1, the second layshaft gear 138 is formed of a polyacetal resin.

The fourth driven gear portion 138a is a transmission element which is driven by the fourth driving gear portion 133d. The fourth driven gear portion 138a and the fourth driving gear portion 133d form a deceleration mechanism. In particular, the fourth driven gear portion 138a is a spur gear having a number of teeth=40 formed on the outer periphery of the flange portion 138c.

When the number of teeth of the fourth driving gear portion 133d is 24, and the number of teeth of the fourth driven gear portion 138a is 40, the reduction gear ratio is 40/24=5/3. When the spindle gear 101 makes 1000 revolutions, the first intermediate gear 102 makes 1000÷20=50 revolutions, and the second intermediate gear 133 makes 50 30=5/3 revolutions. Accordingly, the second layshaft gear 138 makes 5/3÷5/3=1 revolution. Because the second layshaft gear 138 rotates unitarily with the permanent magnet 17, the permanent magnet makes 1 revolution when the spindle gear 101 makes 1000 revolutions. In other words, the magnetic sensor 90 can determine a rotation quantity corresponding to 1000 revolutions of the spindle gear 101.

Figure 35:
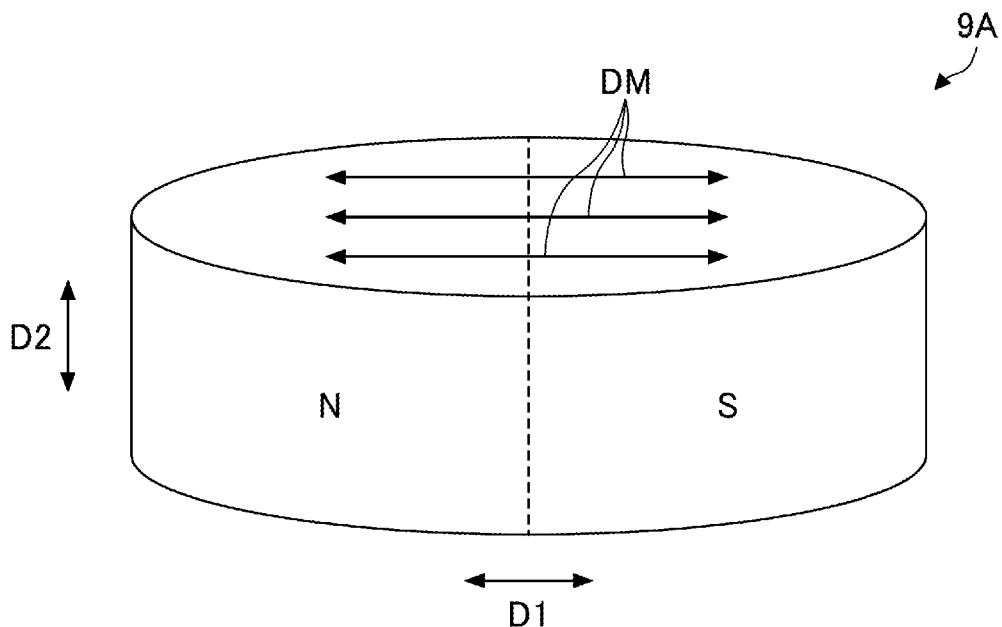
FIG. 35 is a diagram illustrating a permanent magnet 9A applicable to the absolute encoders 100-1 and 100-2 according to the embodiments 1 and 2.
Figure 36:
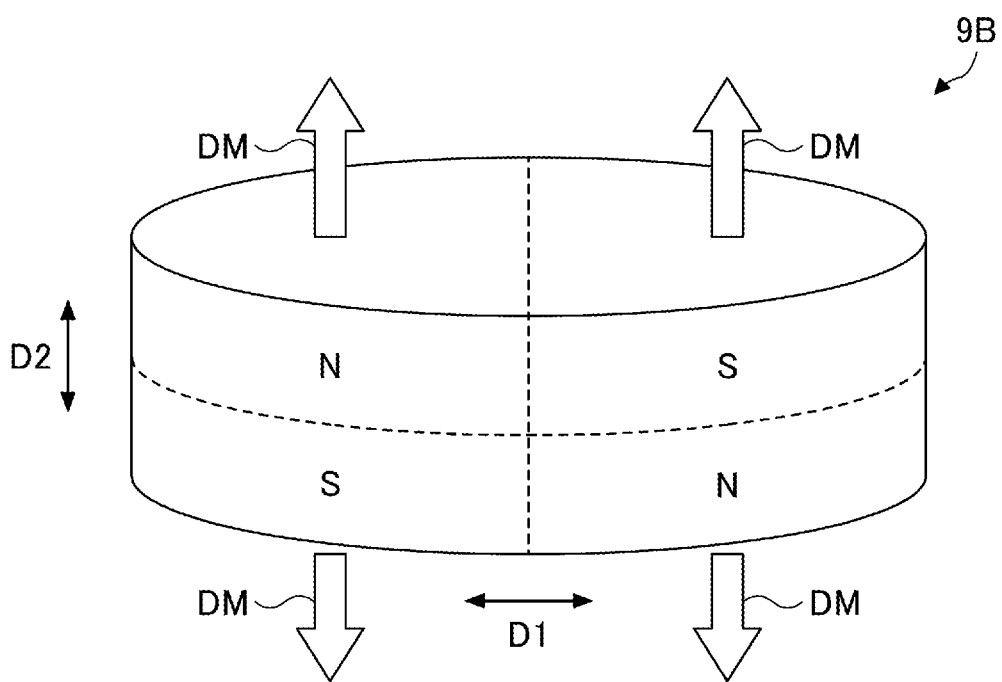
FIG. 36 is a diagram illustrating a permanent magnet 9B applicable to the absolute encoders 100-1 and 100-2 according to the embodiments 1 and 2.

In FIG. 5 through FIG. 8, the permanent magnet 9 is a first permanent magnet, the permanent magnet 8 is a second permanent magnet, and the permanent magnet 17 is a third permanent magnet. Each of the permanent magnet 8, the permanent magnet 9, and the permanent magnet 17 (hereinafter referred to as each permanent magnet) has an approximately cylindrical shape which is flat in the axial direction. Each permanent magnet is formed of a magnetic material, such as a ferrite-based material, a Nd(neodymium)-Fe(iron)-B(boron)-based material, or the like, for example. Each permanent magnet may be a bonded magnet or a rubber magnet including a resin binder, for example. Each permanent magnet is provided with magnetic poles. A magnetization direction of each permanent magnet is not particularly limited, but in the embodiment 1, the two magnetic poles are provided on the end surface of the permanent magnet opposing a magnetic sensor, as illustrated in FIG. 35 and FIG. 36. A magnetic flux density distribution in a rotating direction of each permanent magnet may have a trapezoidal wave shape, a sinusoidal shape, or a square wave shape.

Each permanent magnet is partially or entirely accommodated in a recess formed in the end of each rotating body, and is secured by adhesion, caulking, press-fitting, or the like, for example. The permanent magnet 8 is bonded and fixed to the holder 105*d* of the first layshaft gear 105. The permanent magnet 9 is bonded and fixed to the magnet holder 101*d* of the spindle gear 101. The permanent magnet 17 is bonded and fixed to the magnet holder 138*d* of the second layshaft gear 138.

If the distance between two permanent magnets is short, a detection error of the magnetic sensor becomes large due to the effects of the leakage magnetic flux of the adjacent magnets. Hence, in the example of FIG. 5, the permanent magnet 9 and the permanent magnet 8 in the plan view are arranged on a line of sight, Lm, which is inclined with respect to the outer wall section 115*a* of the case 115, at positions separated from each other. The line of sight, Lm, is the same as an imaginary line connecting the permanent magnet 8 and the permanent magnet 9. The permanent magnet 9 and the permanent magnet 17 are arranged on a line of sight, Ln, which is inclined with respect to the outer wall section 115*a* of the case 115, at positions separated from each other. The line of sight, Ln, is the same as an imaginary line connecting the permanent magnet 17 and the permanent magnet 9. In the embodiment 1, because the lines of sight, Lm and Ln, are inclined with respect to the outer wall section 115*a*, the distance between two permanent magnets can be made long compared to the case where the lines of sight, Lm and Ln, are parallel to the outer wall section 115*a*.

Each of the magnetic sensor 50, the magnetic sensor 40, and the magnetic sensor 90 (hereinafter referred to as each magnetic sensor) is a sensor which detects an absolute rotation angle in the range of 0° to 360° corresponding to one revolution of each rotating body. Each magnetic sensor outputs a signal (for example, a digital signal) corresponding to the detected rotation angle to the microcomputer 121. Each magnetic sensor outputs the same rotation angle as before stopping the supply of a current, even if the supply of the current is once stopped and the supply of the current is resumed thereafter. For this reason, it is possible to employ a configuration which is not provided with a backup power supply.

As illustrated in FIG. 4, each magnetic sensor is fixed on the same plane by a method, such as soldering, bonding, or the like, to the surface of the substrate 120 on the side of the base portion 110*a* of the main base 110. The magnetic sensor 40 is fixed to the substrate 120 at a position opposing the end surface of the permanent magnet 9 provided on the spindle gear 101, via a predetermined gap. The magnetic sensor 40 is a first angle sensor which detects the rotation angle of the spindle gear 101 corresponding to a change in the magnetic flux generated from the permanent magnet 9. The magnetic sensor 50 is fixed to the substrate 120 at a position opposing the end surface of the permanent magnet 8 provided on the first layshaft gear 105, via a predetermined gap. The magnetic sensor 50 is a second angle sensor which detects the rotation angle of the first layshaft gear 105 corresponding to a change in the magnetic flux generated from the permanent magnet 8. The magnetic sensor 90 is fixed to the substrate 120 at a position opposing the end surface of the permanent magnet 17 provided on the second layshaft gear 138, via a predetermined gap. The magnetic sensor 90 is a third angle sensor which detects the rotation angle of the second layshaft gear 138 corresponding to a change in the magnetic flux generated from the permanent magnet 17.

A magnetic angle sensor having relatively high resolution may be used for each magnetic sensor. The magnetic angle sensor is arranged to oppose the end surface, including the magnetic pole, of each permanent magnet along the axial direction of each rotating body, via the predetermined gap, and outputs the digital signal determining the rotation angle of the opposing rotating body, based on the rotation of the magnetic pole. As an example, the magnetic angle sensor includes a sensing element which senses the magnetic pole, and a computing circuit which outputs a digital signal based on the output of the sensing element. The sensing element may include a plurality of (for example, 4) magnetic field sensing elements, such as Hall elements, Giant Magneto Resistive (GMR) elements, or the like, for example.

The computing circuit may determine the rotation angle by a table processing which uses a look-up table, using a difference or a ratio of the outputs of the plurality of sensing elements as a key, for example. The sensing element and the computing circuit may be integrated in a single IC chip. This IC chip may be embedded in a resin having a thin parallelepiped shape. Each magnetic sensor outputs, to the microcomputer 121, an angle signal which is the digital signal corresponding to the rotation angle of each rotating body sensed via an interconnect member which is not illustrated. For example, each magnetic sensor outputs the rotation angle of each rotating body as the digital signal having a plurality of bits (for example, 7 bits).

Figure 9:
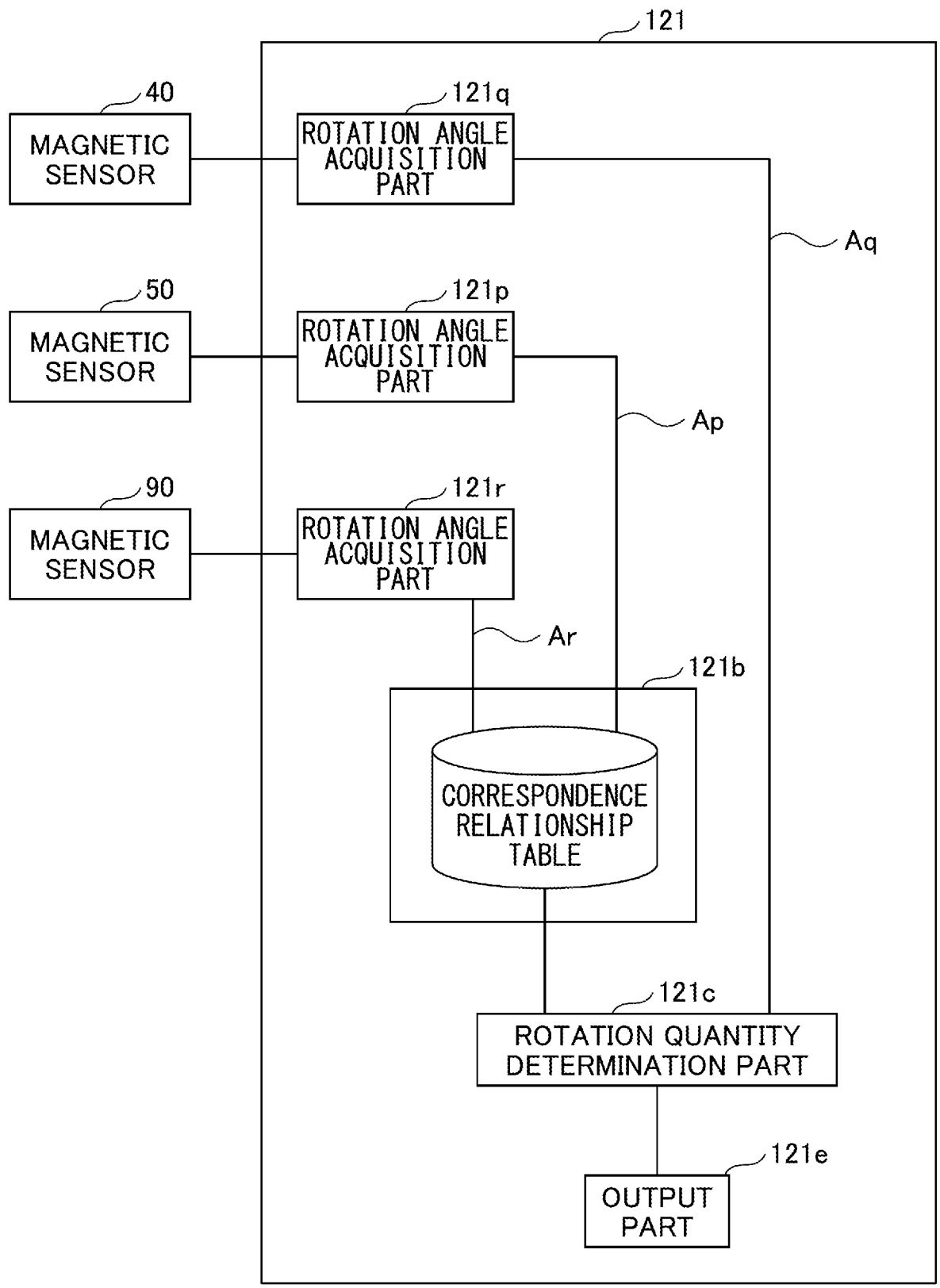
FIG. 9 is a diagram illustrating the functional configuration of a microcomputer 121 provided in the absolute encoder 100-1 according to the embodiment 1 of the present invention.

FIG. 9 is a diagram illustrating the functional configuration of the microcomputer 121 provided in the absolute encoder 100-1 according to the embodiment 1 of the present invention. The microcomputer 121 is fixed to the surface of the substrate 120 on the side of the base portion 110*a* of the main base 110, by the method, such as soldering, bonding, or the like. The microcomputer 121 is formed by a CPU, acquires the digital signal indicating the rotation angle and output from each of the magnetic sensor 40, the magnetic sensor 50, and the magnetic sensor 90, and computes the rotation quantity of the spindle gear 101. Each block of the microcomputer 121 illustrated in FIG. 9 represents a function (facility) which is achieved when the CPU forming the microcomputer 121 executes a program. Each block of the microcomputer 121 may be implemented in hardware by elements and mechanical devices including the central processing unit (CPU) of the computer, or implemented in software by a computer program or the like. Hereinafter, the illustrated functional block is achieved by a coordination of the hardware and the software. Accordingly, it may be understood by those skilled in the art that these functional blocks may be implemented in various forms according to combinations of the hardware and the software.

The microcomputer 121 includes a rotation angle acquisition part 121p, a rotation angle acquisition part 121q, a rotation angle acquisition part 121r, a table processing part 121b, a rotation quantity determination part 121c, and an output part 121e. The rotation angle acquisition part 121q acquires a rotation angle Aq, which is the angle information indicating the rotation angle of the spindle gear 101 based on the signal output from the magnetic sensor 40. The rotation angle acquisition part 121p acquires the rotation angle Ap, which is the angle information indicating the rotation angle of the first layshaft gear 105 based on the signal output from the magnetic sensor 50. The rotation angle acquisition part 121r acquires the rotation angle Ar, which is the angle information indicating the rotation angle of the second layshaft gear 138 based on the signal output from the magnetic sensor 90.

The table processing part 121b determines a rotation speed of the spindle gear 101 corresponding to the acquired rotation angle Ap, by referring to a first correspondence relationship table which stores the rotation angle Ap, and the rotation speed of the spindle gear 101 corresponding to the rotation angle Ap. In addition, the table processing part 121b determines the rotation speed of the spindle gear 101 corresponding to the acquired rotation angle Ar, by referring to a second correspondence relationship table which stores the rotation angle Ar, and the rotation speed of the spindle gear 101 corresponding to the rotation angle Ar.

The rotation quantity determination part 121c determines a first rotation quantity over multiple revolutions of the spindle gear 101, according to the rotation speed of the spindle gear 101 determined by the table processing part 121b, and the acquired rotation angle Aq. The output part 121e converts the rotation quantity over the multiple revolutions of the spindle gear 101 determined by the rotation quantity determination part 121c into information indicating the rotation quantity, and outputs the converted information.

The actions and effects of the absolute encoder 100-1 according to the embodiment 1 configured as described above, will be described.

The absolute encoder 100-1 according to the embodiment 1 is an absolute encoder which determines the rotation quantity over multiple revolutions of the motor shaft 201, and includes the worm gear portion 101c which rotates according to the rotation of the motor shaft 201, the worm wheel portion 102a which engages the worm gear portion 101c, the first worm gear portion 102b which rotates according to the rotation of the worm wheel portion 102a, the worm wheel portion 105a which engages the first worm gear portion 102b, the first layshaft gear 105 which rotates according to the rotation of the worm wheel portion 105a, the permanent magnet 8 which rotates unitarily with the first layshaft gear 105, and the magnetic sensor 50 which detects the rotation angle of the permanent magnet 8. According to this configuration, the rotation quantity over the multiple revolutions of the motor shaft 201 can be determined according to a detection result of the magnetic sensor 50.

The absolute encoder 100-1 can form a bent transmission path and have a thin configuration, by providing a first worm transmission mechanism including the worm gear portion 101c, and the worm wheel portion 102a which engages the worm gear portion 101c, and a second worm transmission mechanism including the first worm gear portion 102b, and the worm wheel portion 105a which engages the first worm gear portion 102b.

The absolute encoder 100-1 according to the embodiment 1 is an absolute encoder which determines the rotation quantity over multiple revolutions of the motor shaft 201, and includes the first intermediate gear 102 which rotates at the first reduction gear ratio according to the rotation of the motor shaft 201, the first layshaft gear 105 which rotates at the second reduction gear ratio according to the rotation of the first intermediate gear 102, the permanent magnet 8 which rotates unitarily with the first layshaft gear 105, and the magnetic sensor 50 which detects the rotation angle of the permanent magnet 8. A rotation axis of the motor shaft 201 is located at a position which is twisted with respect to a rotation axis of the first intermediate gear 102, and is set parallel to a rotation axis of the first layshaft gear 105. According to this configuration, the rotation quantity over the multiple revolutions of the motor shaft 201 can be determined according to the detection result of the magnetic sensor 50. The absolute encoder 100-1 can form the bent transmission path and have the thin configuration, because the rotation axis of the first intermediate gear 102 is located at the position twisted with respect to the rotation axes of the motor shaft 201 and the first layshaft gear 105.

The absolute encoder 100-1 according to the embodiment 1 is an absolute encoder which determines the rotation quantity over multiple revolutions of the motor shaft 201, and includes the deceleration mechanism which includes the first worm transmission mechanism and rotates the permanent magnet 8 according to the rotation of the motor shaft 201, and the magnetic sensor 50 which detects the rotation angle of the permanent magnet 8 according to the magnetic pole of the permanent magnet 8, and the rotation axis of the motor shaft 201 is set parallel to the rotation axis of the permanent magnet 8. According to this configuration, the rotation quantity over the multiple revolutions of the motor shaft 201 can be determined according to the detection result of the magnetic sensor 50. The absolute encoder 100-1 can form the bent transmission path and have the thin configuration, because the first worm transmission mechanism is provided, and the rotation axis of the motor shaft 201 and the rotation axis of the permanent magnet 8 are set to be parallel to each other.

The absolute encoder 100-1 according to the embodiment 1 includes the magnetic sensor 40 which detects the rotation angle of the motor shaft 201. According to this configuration, the rotation angle of the motor shaft 201 can be determined according to a detection result of the magnetic sensor 40. Compared to a case where the magnetic sensor 40 is not provided, the absolute encoder 100-1 can improve the resolution of the rotation angle of the motor shaft 201 which can be determined.

The absolute encoder 100-1 according to the embodiment 1 includes the second worm gear portion 102h which rotates according to the rotation of the worm wheel portion 102a, the worm wheel portion 133a which engages the second worm gear portion 102h, the second layshaft gear 138 which rotates according to the rotation of the worm wheel portion 133a, the permanent magnet 17 which rotates unitarily with the second layshaft gear 138, and the magnetic sensor 90 which detects the rotation angle of the permanent magnet 17.

According to this configuration, the rotation quantity over the multiple revolutions of the motor shaft 201 can be determined according to a detection result of the magnetic sensor 90. Compared to the case where the magnetic sensor 90 is not provided, the absolute encoder 100-1 can increase a range in which the rotation quantity of the motor shaft 201 can be determined.

The absolute encoder 100-1 according to the embodiment 1 includes the first intermediate gear 102 provided with the first worm gear portion 102b and the second worm gear portion 102h, and the direction of the reaction force received by the first intermediate gear 102 when the first worm gear portion 102b rotates is opposite to the direction of the reaction force received by the first intermediate gear 102 when the second worm gear portion 102h rotates. According to this configuration, the combined reaction force of both the reaction forces can be made small compared to a case where the directions of both the reaction forces are the same.

In the absolute encoder 100-1 according to the embodiment 1, an outer diameter of the worm wheel portion 102a is set smaller than an outer diameter of the worm gear portion 101c. According to this configuration, it is easier to make the absolute encoder thin when compared to a case where the outer diameter of the worm wheel portion 102a is larger than the outer diameter of the worm wheel portion 102a.

For example, in the case where the spindle gear 101 and the first layshaft gear 105 are arranged at positions adjacent to each other, a so-called magnetic interference is generated in which a portion of the magnetic flux generated from each of the permanent magnet 8 and the permanent magnet 9 affects the magnetic sensor not corresponding to each of the permanent magnet 8 and the permanent magnet 9, and this magnetic interference will be described.

Figure 28:
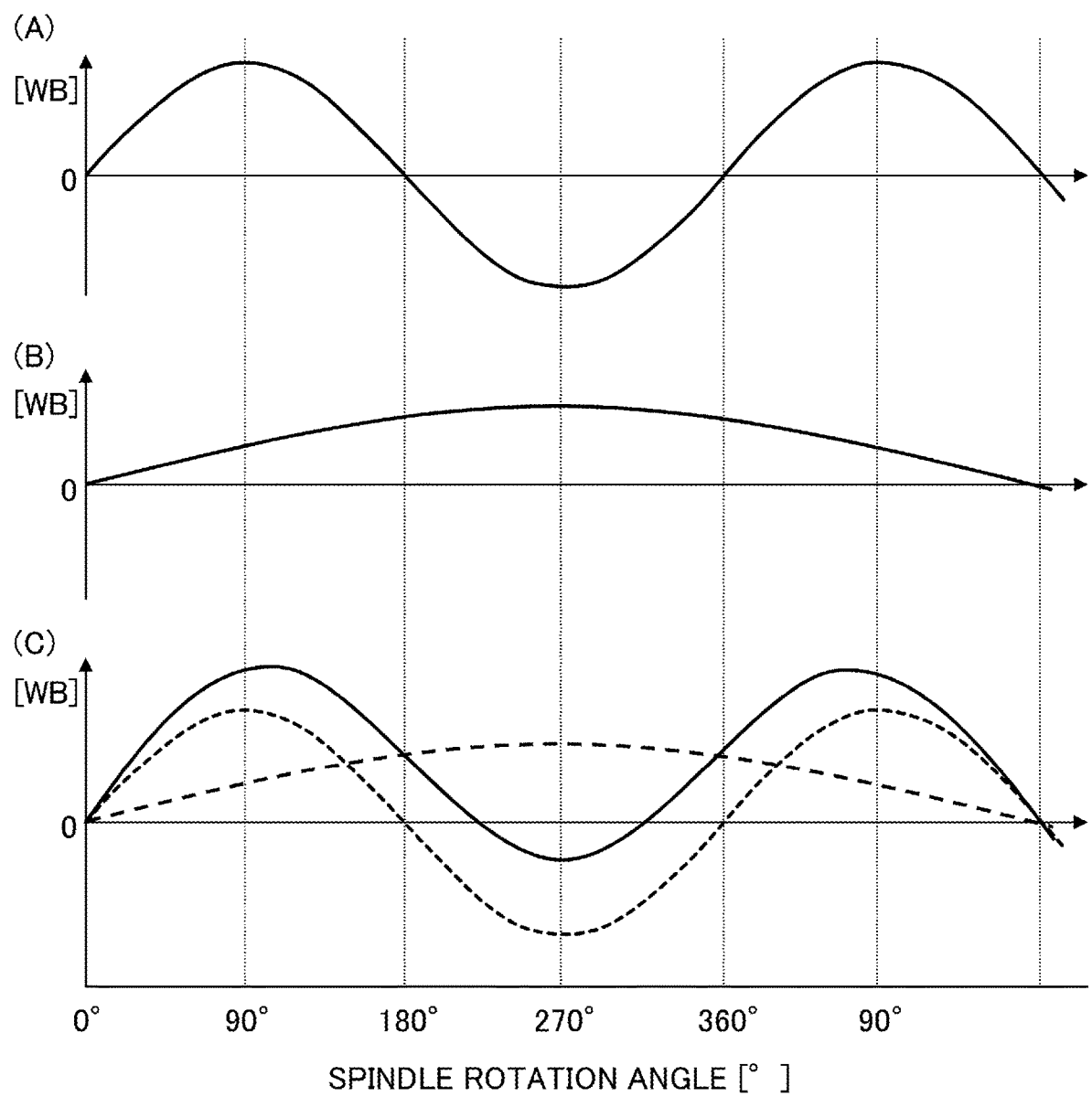
FIG. 28 is a diagram conceptually illustrating a waveform (A) detected by the magnetic sensor 40 which detects a magnetic flux of the permanent magnet 9 provided on a spindle gear 101 (spindle gear 1), a waveform (B) detected by the magnetic sensor 50 which detects a magnetic flux of the permanent magnet 8 provided on the first layshaft gear 105 (layshaft gear 5), and a magnetic interference waveform (C) detected by the magnetic sensor 40 which detects a state in which a portion of the magnetic flux of the permanent magnet 8 is superimposed on the magnetic flux of the permanent magnet 9 as a leakage magnetic flux.

FIG. 28 is a diagram conceptually illustrating a waveform (A) detected by the magnetic sensor 40 which detects the magnetic flux of the permanent magnet 9 provided on the spindle gear 101 (spindle gear 1), a waveform (B) detected by the magnetic sensor 50 which detects the magnetic flux of the permanent magnet 8 provided on the first layshaft gear 105 (layshaft gear 5), and a magnetic interference waveform (C) detected by the magnetic sensor 40 which detects a state in which a portion of the magnetic flux of the permanent magnet 8 is superimposed on the magnetic flux of the permanent magnet 9 as the leakage magnetic flux. An ordinate indicates the magnetic flux, and the abscissa indicates the rotation angle of the spindle gear 101. As described above, the magnetic sensor 40 desirably detects the waveform (A), but detects the waveform (C) when the magnetic interference is generated, thereby making it is impossible to detect an accurate waveform.

Figure 29:
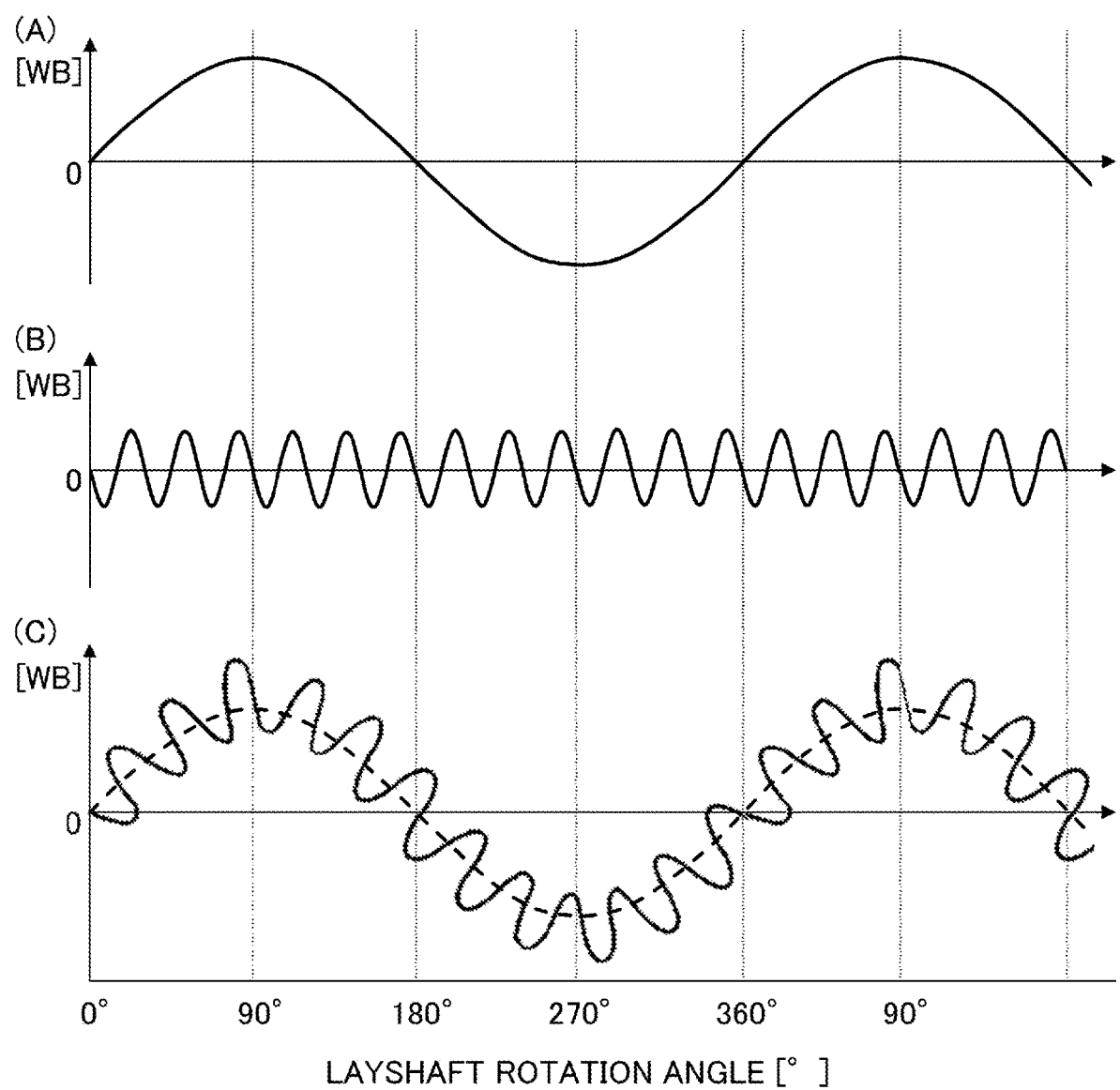
FIG. 29 is a diagram conceptually illustrating a waveform (A) detected by the magnetic sensor 50 which detects the magnetic flux of the permanent magnet 8 provided on the first layshaft gear 105 (layshaft gear 5), a waveform (B) detected by the magnetic sensor 40 which detects the magnetic flux of the permanent magnet 9 provided on the spindle gear 101 (spindle gear 1), and a magnetic interference waveform (C) detected by the magnetic sensor 50 which detects a state in which a portion of the magnetic flux of the permanent magnet 9 is superimposed on the magnetic flux of the permanent magnet 8 as a leakage magnetic flux.

Similarly, FIG. 29 is a diagram conceptually illustrating a waveform (A) detected by the magnetic sensor 50 which detects the magnetic flux of the permanent magnet 8 provided on the first layshaft gear 105 (layshaft gear 5), a waveform (B) detected by the magnetic sensor 40 which detects the magnetic flux of the permanent magnet 9 provided on the spindle gear 101 (spindle gear 1), and a magnetic interference waveform (C) detected by the magnetic sensor 50 which detects a state in which a portion of the magnetic flux of the permanent magnet 9 is superimposed on the magnetic flux of the permanent magnet 8 as the leakage magnetic flux. The ordinate indicates the magnetic flux, and the abscissa indicates the rotation angle of the first layshaft gear 105. As described above, the magnetic sensor 50 desirably detects the waveform (A), but detects the waveform (C) when the magnetic interference is generated, thereby making it is impossible to detect the accurate waveform. In addition, the magnetic interference may be generated in the spindle gear 101 and the second layshaft gear 138, similar to (C) in FIG. 29.

The absolute encoder 100-1 according to the embodiment 1 includes the case 115 including the outer wall section 115a arranged on the side of the first intermediate gear 102 opposite to the motor shaft 201, and in the plan view, the rotation axis La of the first intermediate gear 102 is inclined by 20° with respect to the extending direction of the outer wall section 115a. According to this configuration, the inclination of a straight line on which each of the permanent magnets is arranged, with respect to the outer wall section 115a, can be made large, compared to a case where the rotation axis La of the first intermediate gear 102 is not inclined. For this reason, the distance between the respective permanent magnets can be made large. Hence, by setting the distance between the respective permanent magnets large, the generation of the magnetic interference in which a portion of the magnetic flux generated from each of the permanent magnet 8, the permanent magnet 9, and the permanent magnet 17 affects the magnetic sensors not corresponding to each of the permanent magnet 8, the permanent magnet 9, and the permanent magnet 17, can be reduced. For example, a portion of the magnetic flux generated from the permanent magnet 9 provided on the spindle gear 101, interfering with the magnetic sensor 50 which is originally provided on the first layshaft gear 105 for the purposes of detecting a change in the magnetic flux generated from the permanent magnet 8, as a leakage magnetic flux, can be reduced. In addition, a portion of the magnetic flux generated from the permanent magnet 9, interfering with the magnetic sensor 40 which is originally provided for the purposes of detecting a change in the magnetic flux generated from the permanent magnet 8, as a leakage magnetic flux, can be reduced. Therefore, it is possible to reduce the effects of the leakage flux from the adjacent magnets.

Further, in the absolute encoder 100-1 according to the embodiment 1, the base portion 110a of the main base 110, which is a plate shaped member made of a magnetic material such as iron or the like, is provided between the second angle sensor and the motor 200, or between the third angle sensor and the motor 200. In other words, the base portion 110a functions as a magnetic shield with respect to the magnetic flux which leaks from the motor 200. Accordingly, the magnetic flux which leaks from the motor 200 is unlikely to reach the magnetic sensor 40 or the like. As a result, compared to a case where the base portion 110a is made of a non-magnetic material such as aluminum or the like having a low magnetic permeability, for example, it is possible to reduce a deterioration in the detection accuracy of the magnetic sensor which detects the rotation angle or the rotation quantity of the gear.

Embodiment 2

Figure 10:
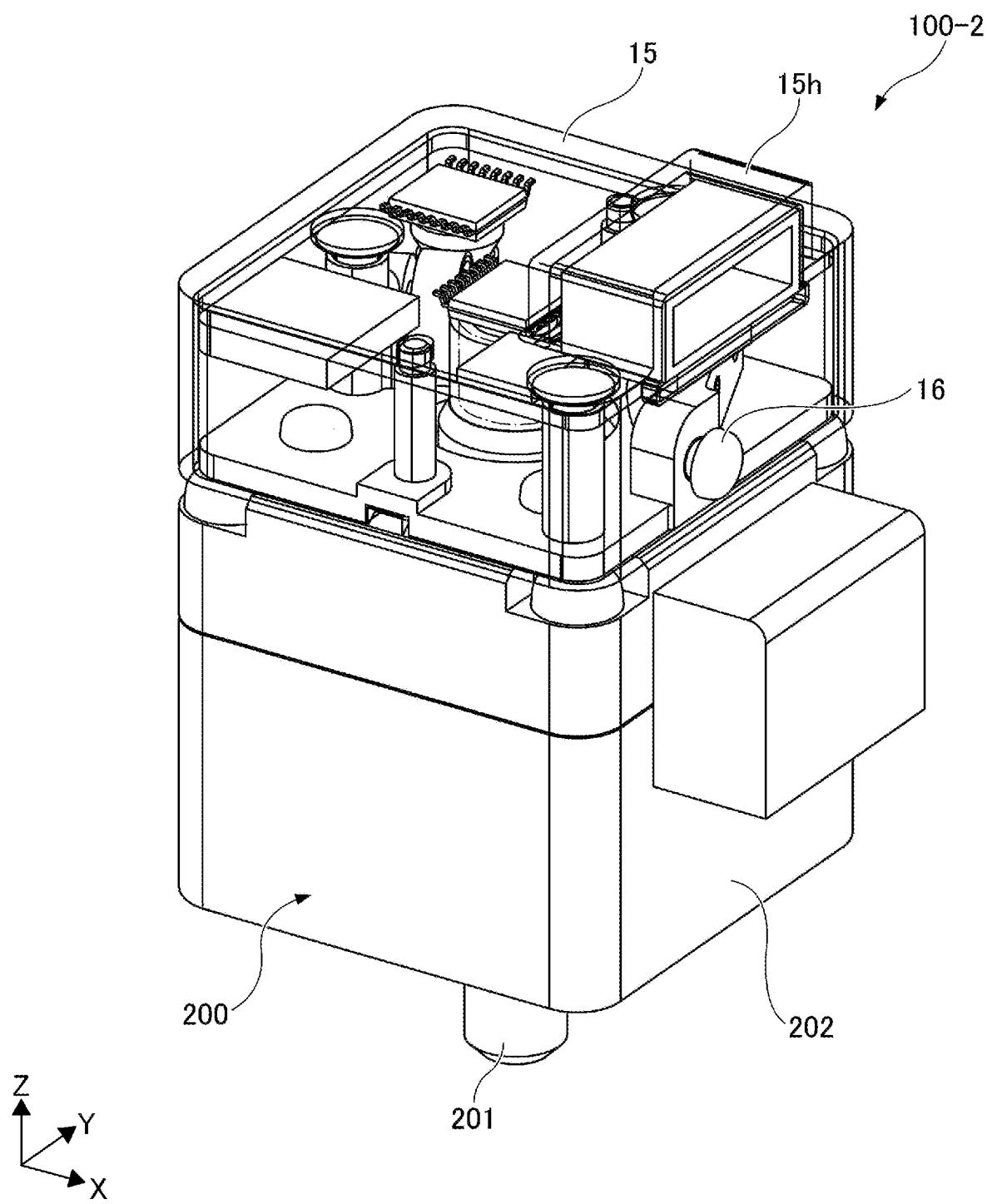
FIG. 10 is a perspective view illustrating a state in which an absolute encoder 100-2 according to an embodiment 2 of the present invention is attached to the motor 200.

FIG. 10 is a perspective view illustrating a state in which the absolute encoder 100-2 according to an embodiment 2 of the present invention is attached to the motor 200. Similar to the embodiment 1, the description hereinafter will be based on the XYZ orthogonal coordinate system. The X-axis direction corresponds to the horizontal left and right direction, the Y-axis direction corresponds to the horizontal front and rear direction, and the Z-axis direction corresponds to the vertical up and down direction. The Y-axis direction and the Z-axis direction are perpendicular to the X-axis direction, respectively. The X-axis direction may be referred to as the left direction or the right direction, the Y-axis direction may be referred to as the front direction or the rear direction, and the Z-axis direction may be referred to as the up direction or the down direction. In FIG. 10, a state viewed from above in the Z-axis direction is referred to as the plan view, a state viewed from the front in the Y-axis direction is referred to as the front view, and states viewed from the left and right in the X-axis direction are referred to as the side views. Such designations of the directions do not limit the orientation in which the absolute encoder 100-2 is used, and the absolute encoder 100-2 may be used in an arbitrary orientation. In FIG. 10, components provided inside the case 15 of the absolute encoder 100-2 are illustrated in a perspective. In addition, the illustration of a gear profile is omitted in the drawings.

Figure 11:
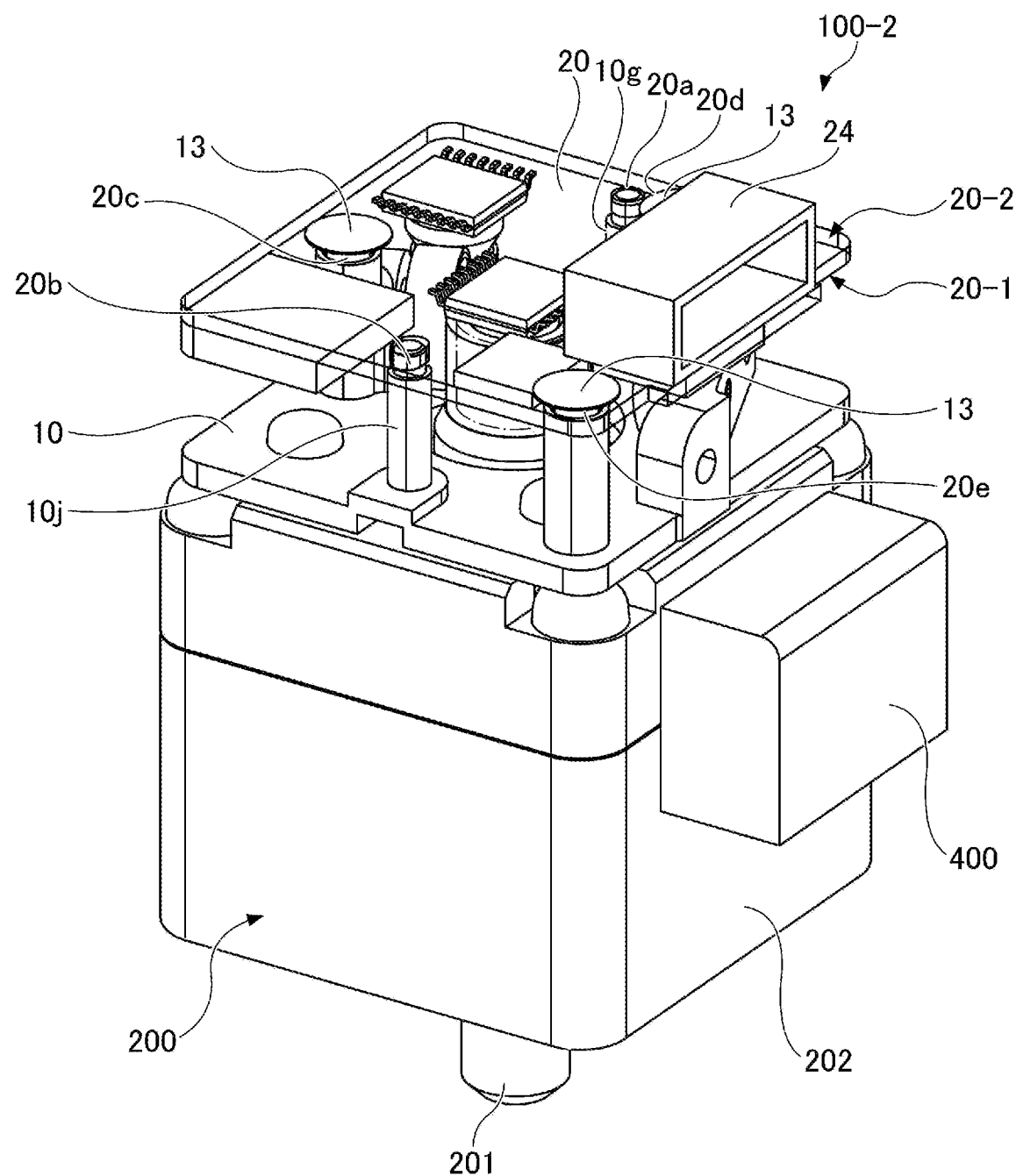
FIG. 11 is a perspective view illustrating a state in which a case 15 and attaching screws 16 are removed from the absolute encoder 100-2 illustrated in FIG. 10.
Figure 12:
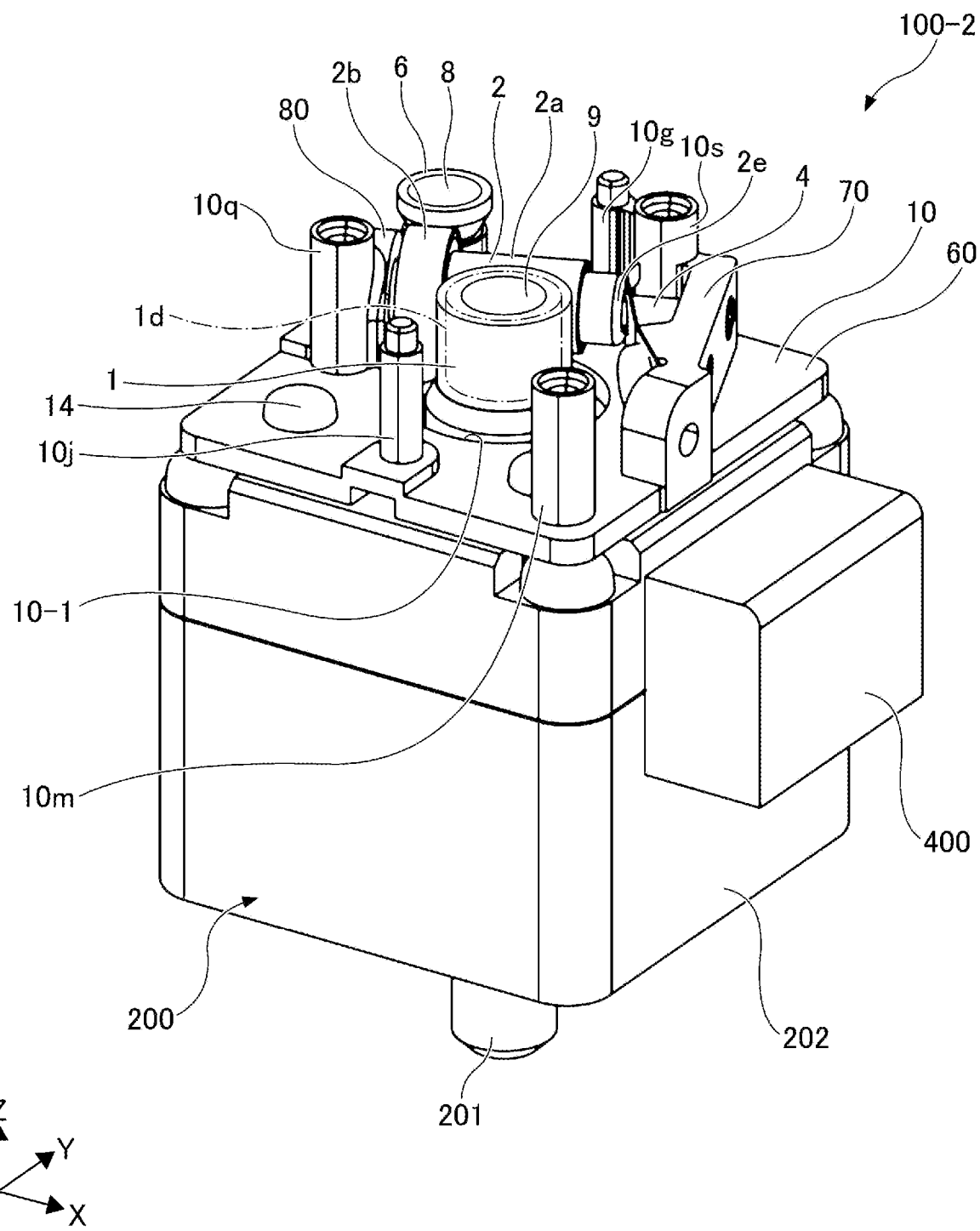
FIG. 12 is a perspective view illustrating a state in which a substrate 20 and substrate attaching screws 13 are removed from the absolute encoder 100-2 illustrated in FIG. 11.
Figure 13:
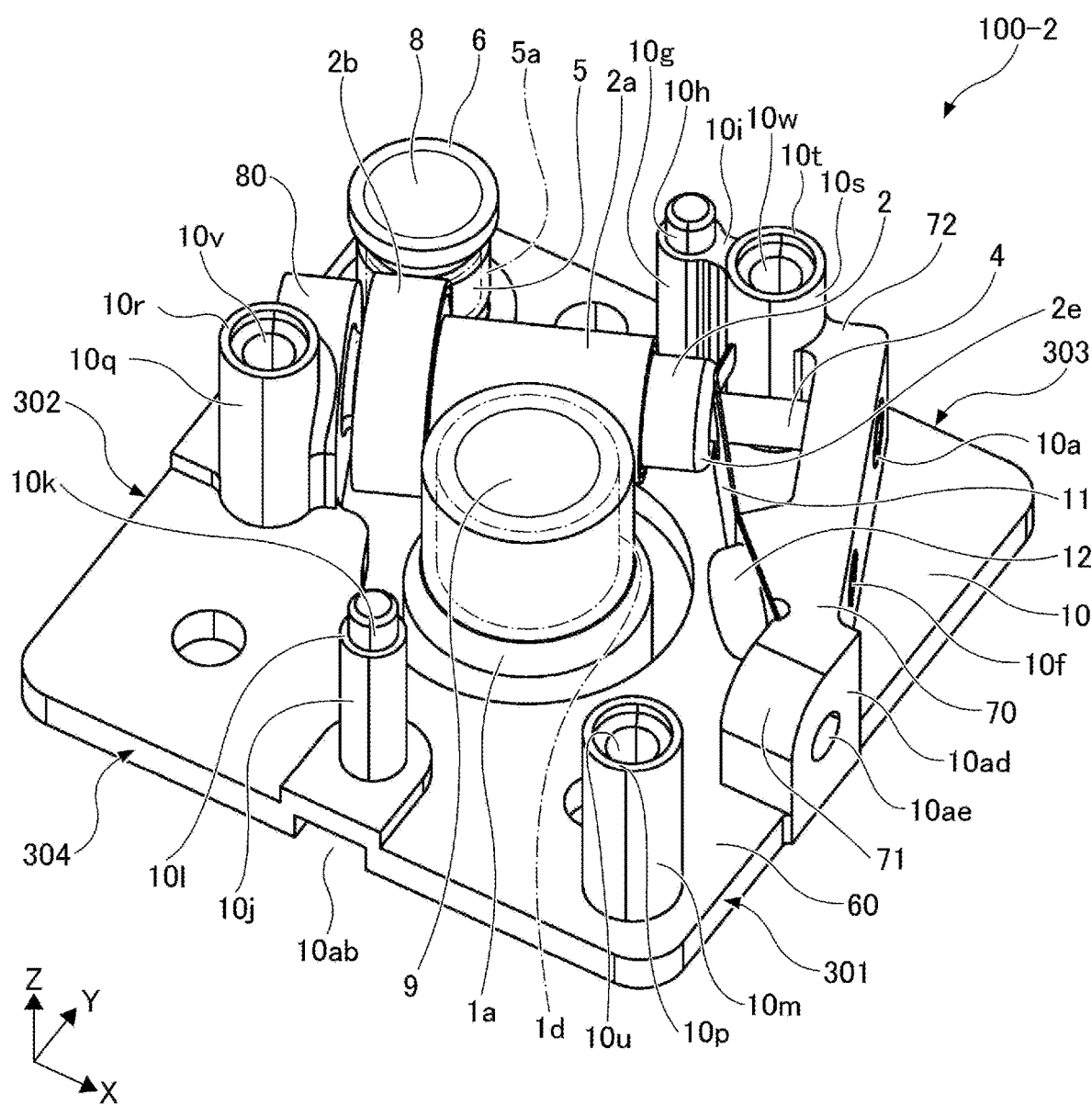
FIG. 13 is a perspective view illustrating a state in which the motor 200 and screws 14 are removed from the perspective view of the state in which the motor 200 is attached to the absolute encoder 100-2 illustrated in FIG. 12.
Figure 14:
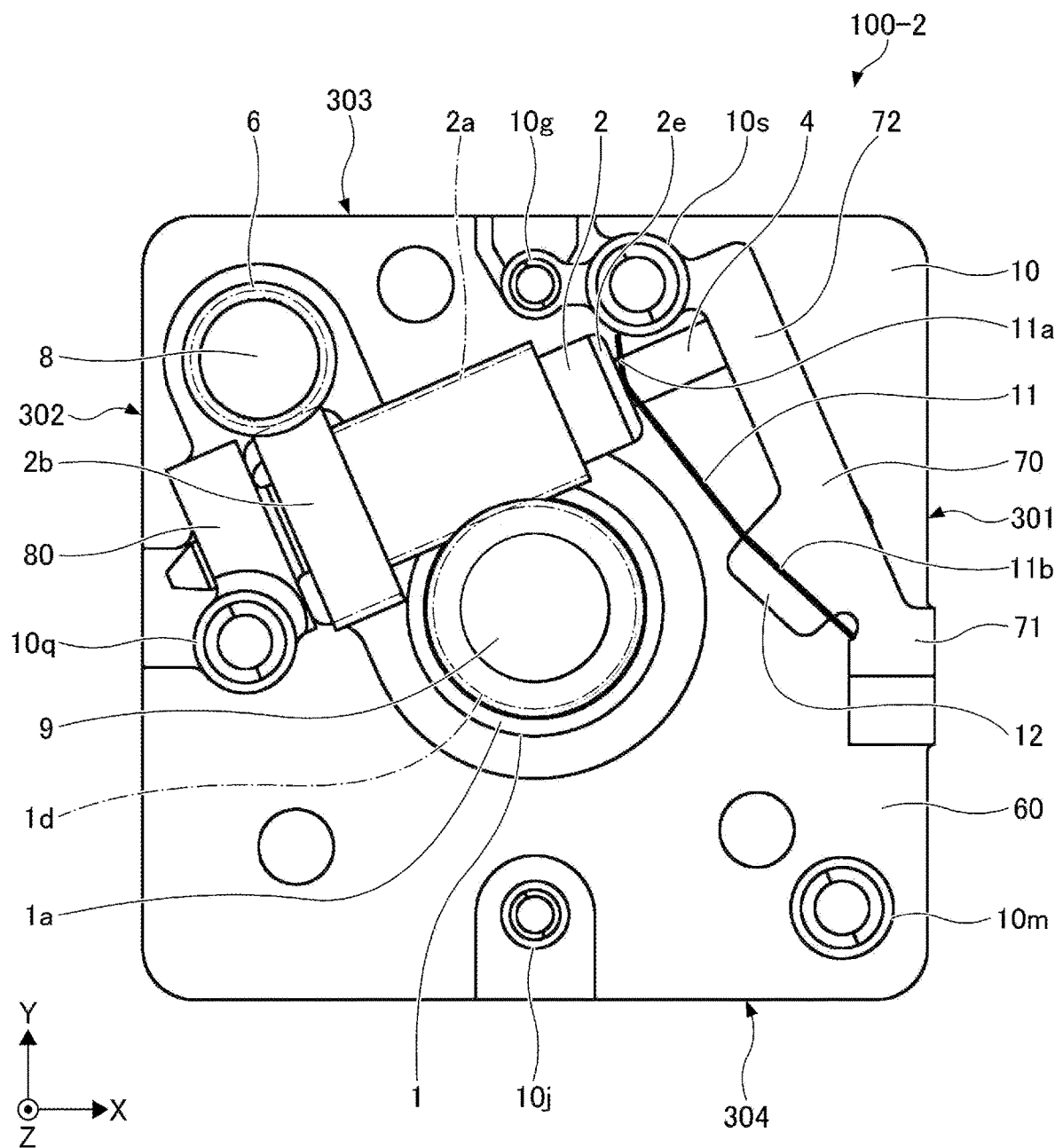
FIG. 14 is a diagram illustrating a state in which a main base 10, an intermediate gear 2, or the like illustrated in FIG. 13 are viewed in a plan view.
Figure 15:
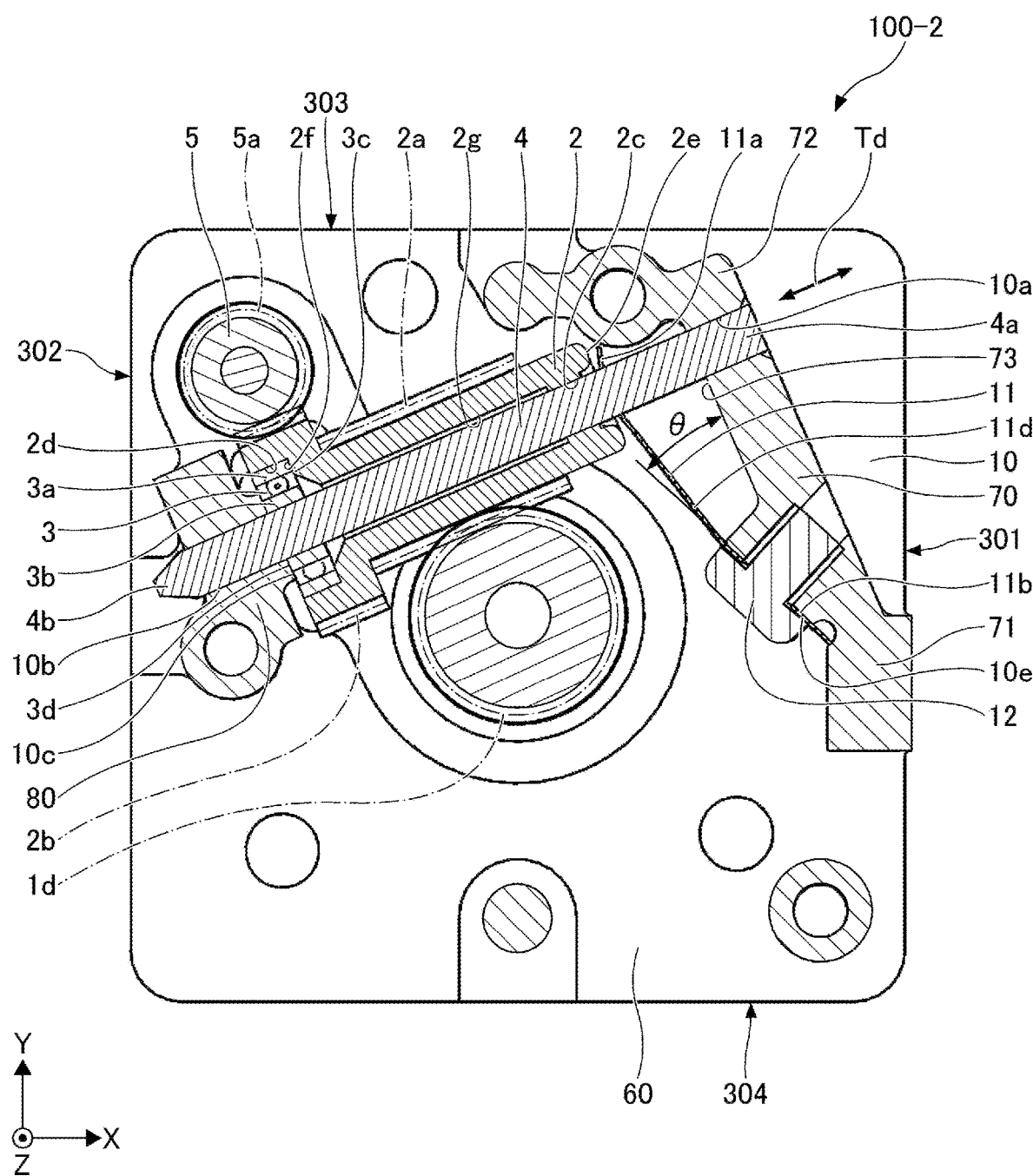
FIG. 15 is a cross sectional view of the absolute encoder 100-2 illustrated in FIG. 14 cut along a plane passing through a center of the intermediate gear 2 and parallel to an X-Y plane.

FIG. 11 is a perspective view illustrating a state in which the case 15 and the attaching screws 16 are removed from the absolute encoder 100-2 illustrated in FIG. 10. In FIG. 11, a plurality of components provided on the bottom surface 20-1 of the substrate 20 are illustrated in a perspective. FIG. 12 is a perspective view illustrating a state in which the substrate 20 and the substrate attaching screws 13 are removed from the absolute encoder 100-2 illustrated in FIG. 11. FIG. 13 is a perspective view illustrating a state in which the motor 200 and the screws 14 are removed from the perspective view of the state in which the motor 200 is attached to the absolute encoder 100-2 illustrated in FIG. 12. FIG. 14 is a diagram illustrating a state in which the main base 10, the intermediate gear 2, or the like illustrated in FIG. 13 are viewed in the plan view. FIG. 15 is a cross sectional view of the absolute encoder 100-2 illustrated in FIG. 14 cut along a plane passing through the center of the intermediate gear 2 and parallel to the X-Y plane.

Figure 16:
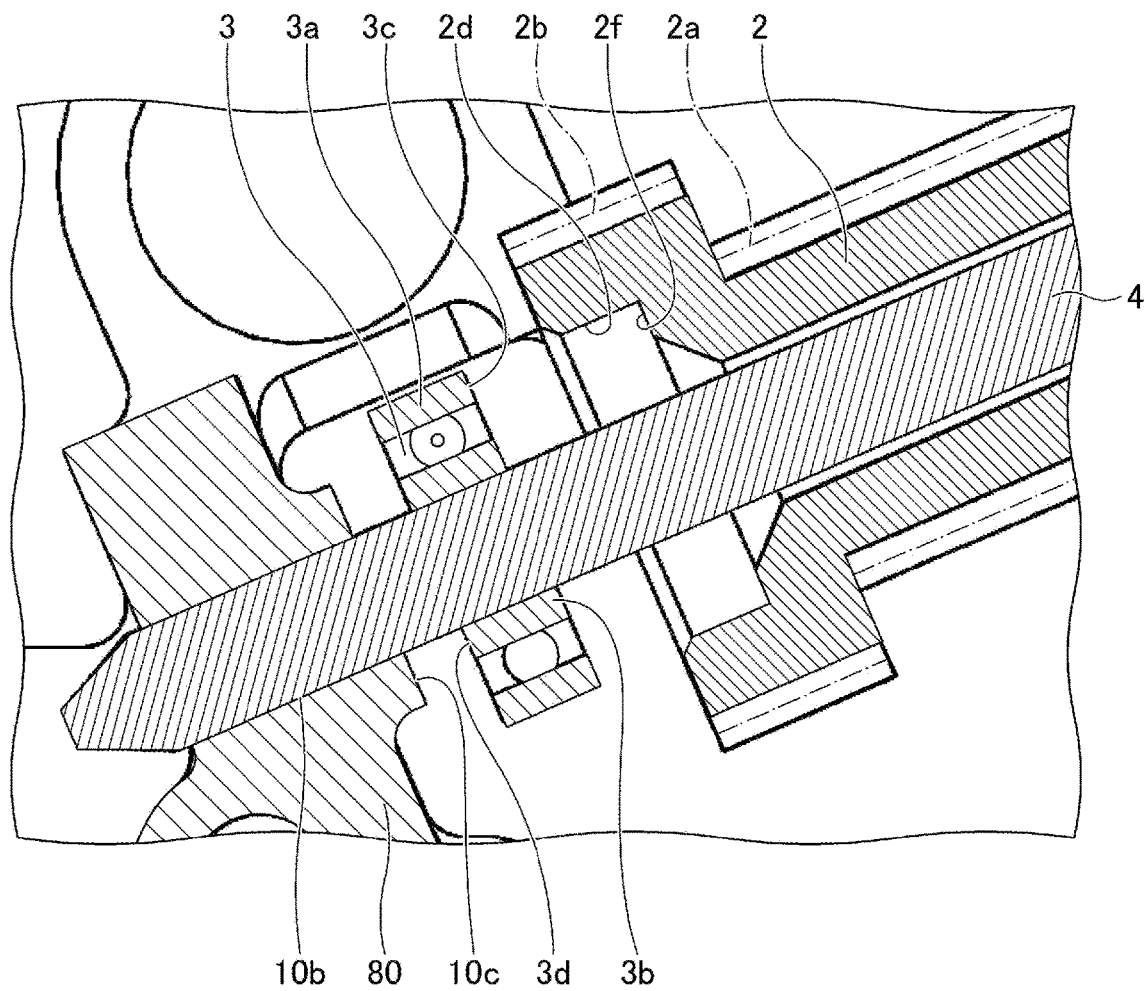
FIG. 16 is a partial cross sectional view on an enlarged scale illustrating a state in which a bearing 3 illustrated in FIG. 15 is removed from the intermediate gear 2.

FIG. 16 is a partial cross sectional view on an enlarged scale illustrating a state in which the bearing 3 illustrated in FIG. 15 is removed from the intermediate gear 2. In FIG. 16, the bearing 3 is separated from a press-fitting portion 2d of the intermediate gear 2 in order to facilitate the understanding of an arrangement relationship between the bearing 3 and the press-fitting portion 2d formed on the intermediate gear 2. In addition, in FIG. 16, the bearing 3 is separated from the wall 80 in order to facilitate the understanding of an arrangement relationship between the bearing 3 and the wall 80 provided on a base portion 60 of the main base 10.

Figure 17:
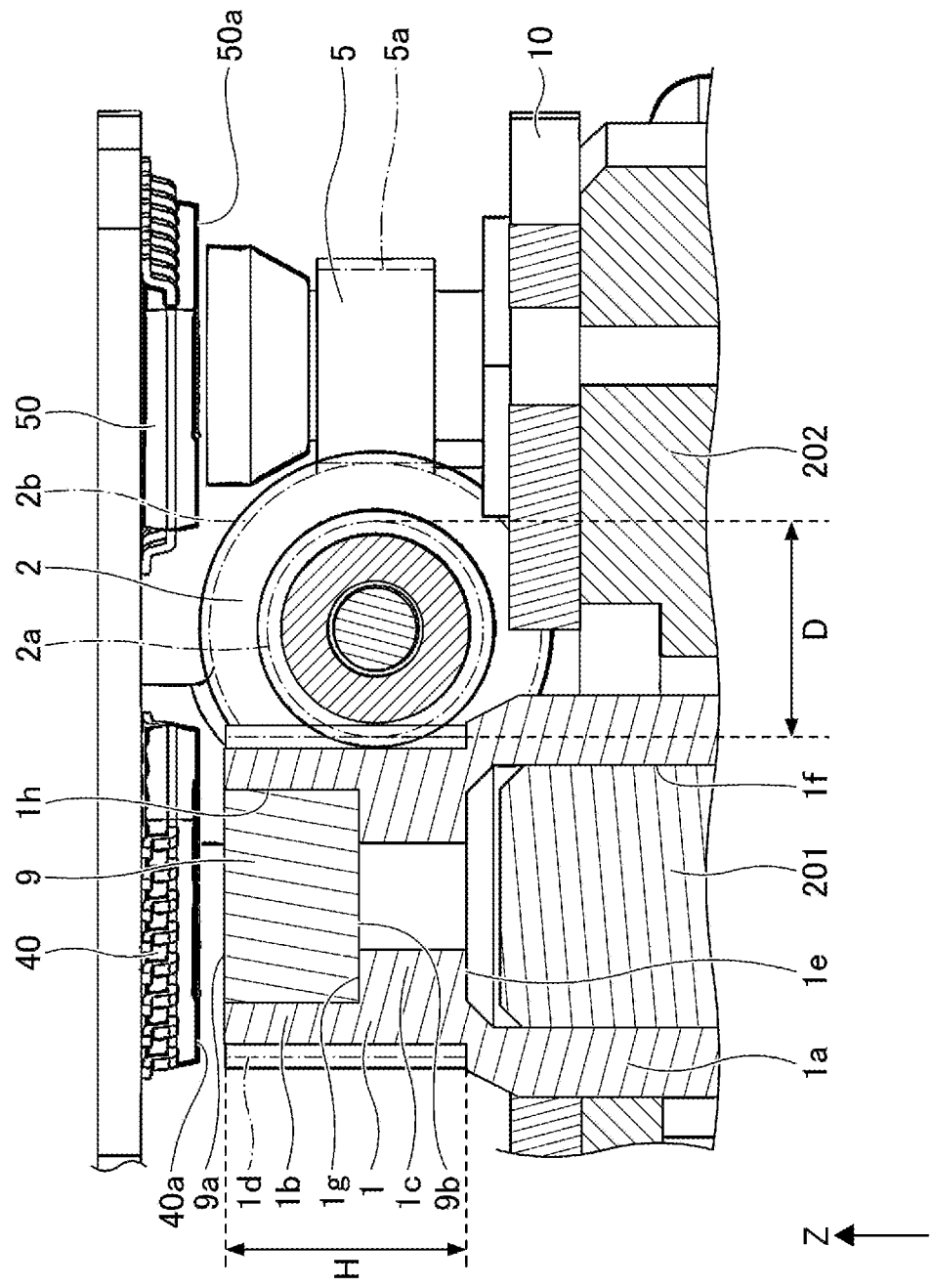
FIG. 17 is a cross sectional view of the absolute encoder 100-2 illustrated in FIG. 11 cut along a plane passing through a center of a spindle gear 1 illustrated in FIG. 14 and perpendicular to a center line of the intermediate gear 2. However, the substrate 20 and a magnetic sensor 40 are not illustrated in cross section.

FIG. 17 is a cross sectional view of the absolute encoder 100-2 illustrated in FIG. 11 cut along a plane passing through the center of the spindle gear 1 illustrated in FIG. 14 and perpendicular to the center line of the intermediate gear 2. However, the substrate 20 and the magnetic sensor 40 are not illustrated in cross section. FIG. 17 illustrates an attached state of the permanent magnet 9 to the spindle gear 1, and an attached state of the spindle gear 1 to the motor shaft 201. In addition, FIG. 17 illustrates a state in which the worm gear portion 1d of the spindle gear 1 engages a worm wheel portion 2a of the intermediate gear 2. According to FIG. 17, it may be seen that a top surface 9a of the permanent magnet 9 provided on the spindle gear 1 is located at a position separated from the magnetic sensor 40 by a predetermined distance along the Z-axis direction.

Figure 18:
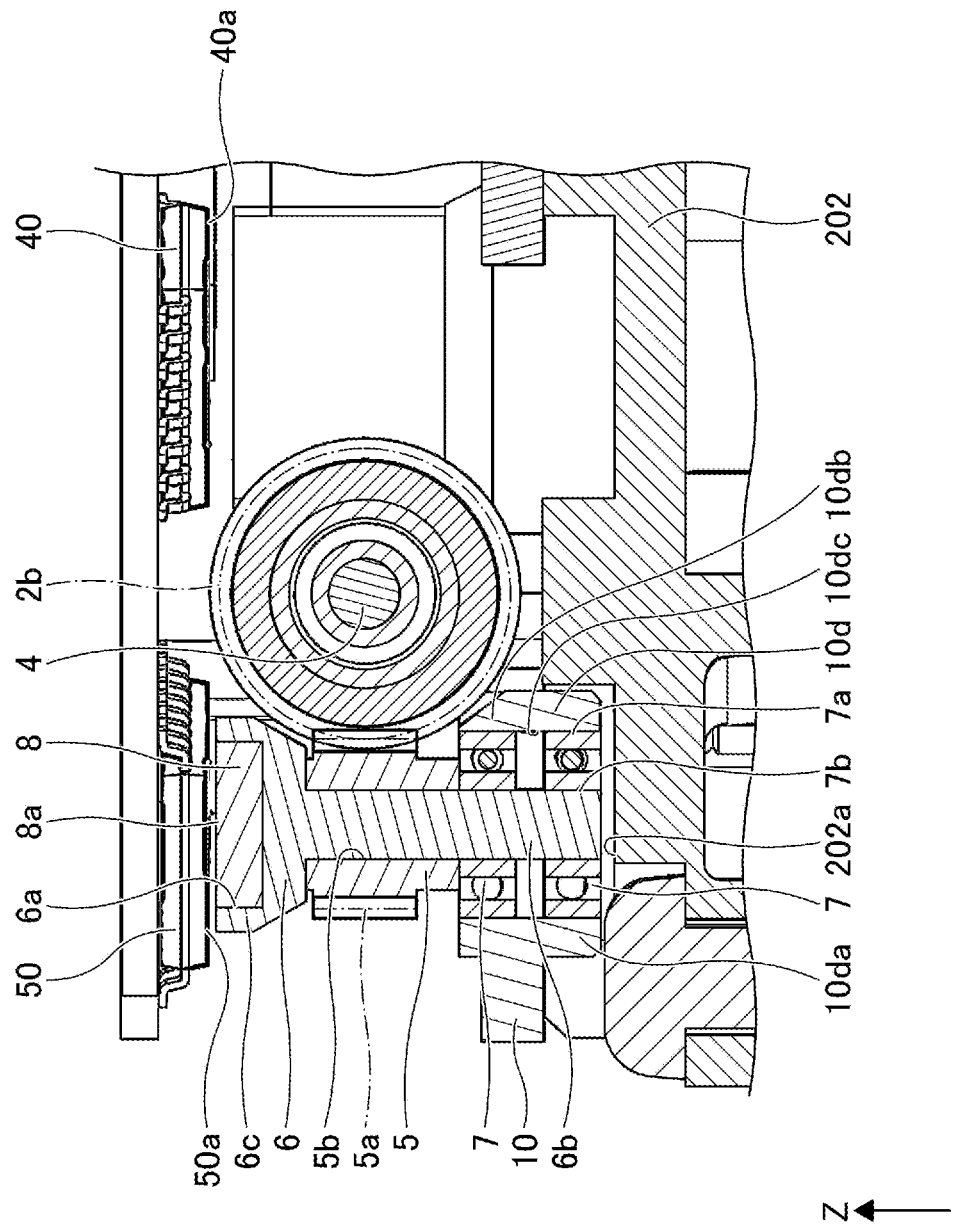
FIG. 18 is a cross sectional view of the absolute encoder 100-2 illustrated in FIG. 11 cut along a plane passing through the center of a layshaft gear 5 illustrated in FIG. 15 and perpendicular to the center line of the intermediate gear 2. However, the substrate 20 and the magnetic sensor 50 are not illustrated in cross section.

FIG. 18 is a cross sectional view of the absolute encoder 100-2 illustrated in FIG. 11 cut along a plane passing through the center of the layshaft gear 5 illustrated in FIG. 15 and perpendicular to the center line of the intermediate gear 2. However, the substrate 20 and the magnetic sensor 50 are not illustrated in cross section. FIG. 18 illustrates a state in which a worm wheel portion 5a engages a worm gear portion 2b. Further, FIG. 18 illustrates a state in which a shaft portion 6b of the magnet holder 6 is held by the two bearings 7, and a state in which the permanent magnet 8 is held by the magnet holder 6. Moreover, FIG. 18 illustrates a state in which a surface of a head 6c provided in the magnet holder 6, on the outer side in the radial direction, is separated from a tip circle of the worm gear portion 2b. Further, according to FIG. 18, it may be seen that a surface 8a of the permanent magnet 8 provided in the magnet holder 6 is located at a position separated from the magnetic sensor 50 by a predetermined distance along the Z-axis direction. FIG. 18 also illustrates the cross sectional shape of a bearing holder portion 10d of the main base 10.

Figure 19:
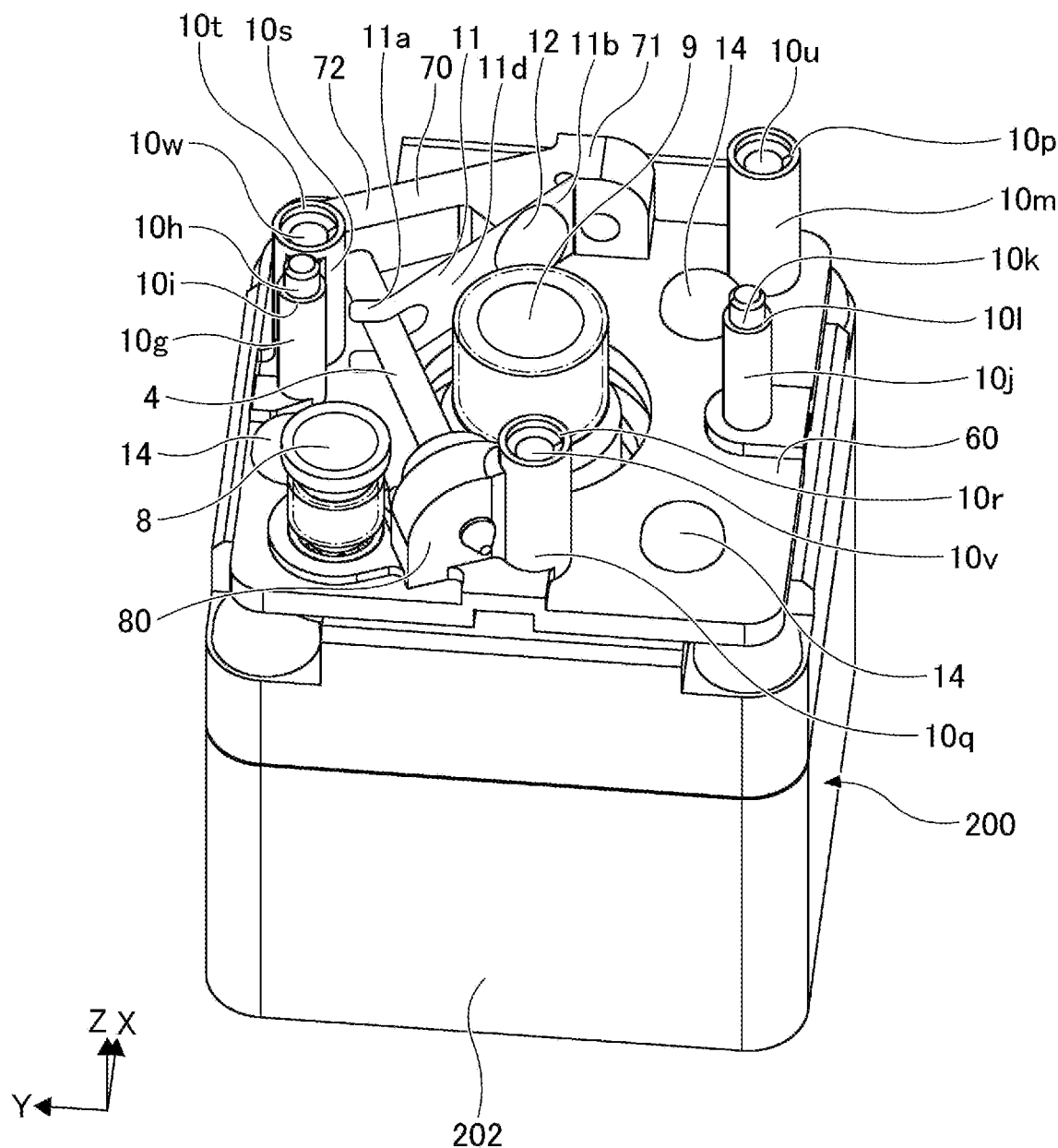
FIG. 19 is a perspective view illustrating a state in which the intermediate gear 2 is removed from a plurality of components illustrated in FIG. 12.
Figure 20:
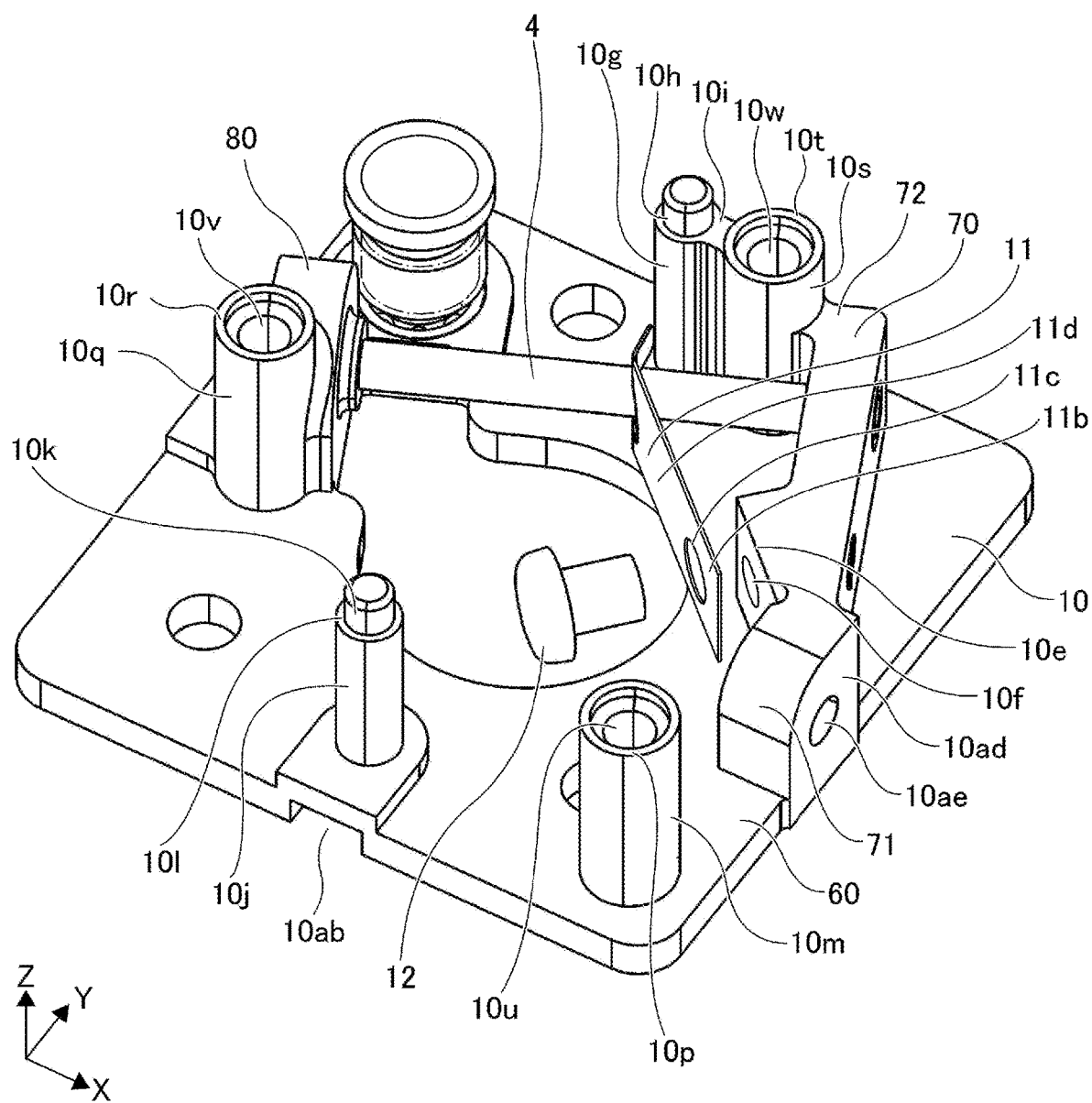
FIG. 20 is a perspective view illustrating a state in which a screw 12 is removed from a wall 70 illustrated in FIG. 19, a state of a leaf spring 11 after the screw 12 is removed, and the wall 70 provided with a leaf spring attaching surface 10e facing the leaf spring 11. However, the motor 200 and the spindle gear 1 are not illustrated.

FIG. 19 is a perspective view illustrating a state in which the intermediate gear 2 is removed from the plurality of components illustrated in FIG. 12. FIG. 20 is a perspective view illustrating a state in which the screw 12 is removed from the wall 70 illustrated in FIG. 19, a state of the leaf spring 11 after the screw 12 is removed, and the wall 70 provided with the leaf spring attaching surface 10e facing the leaf spring 11. However, the motor 200 and the spindle gear 1 are not illustrated.

Figure 21:
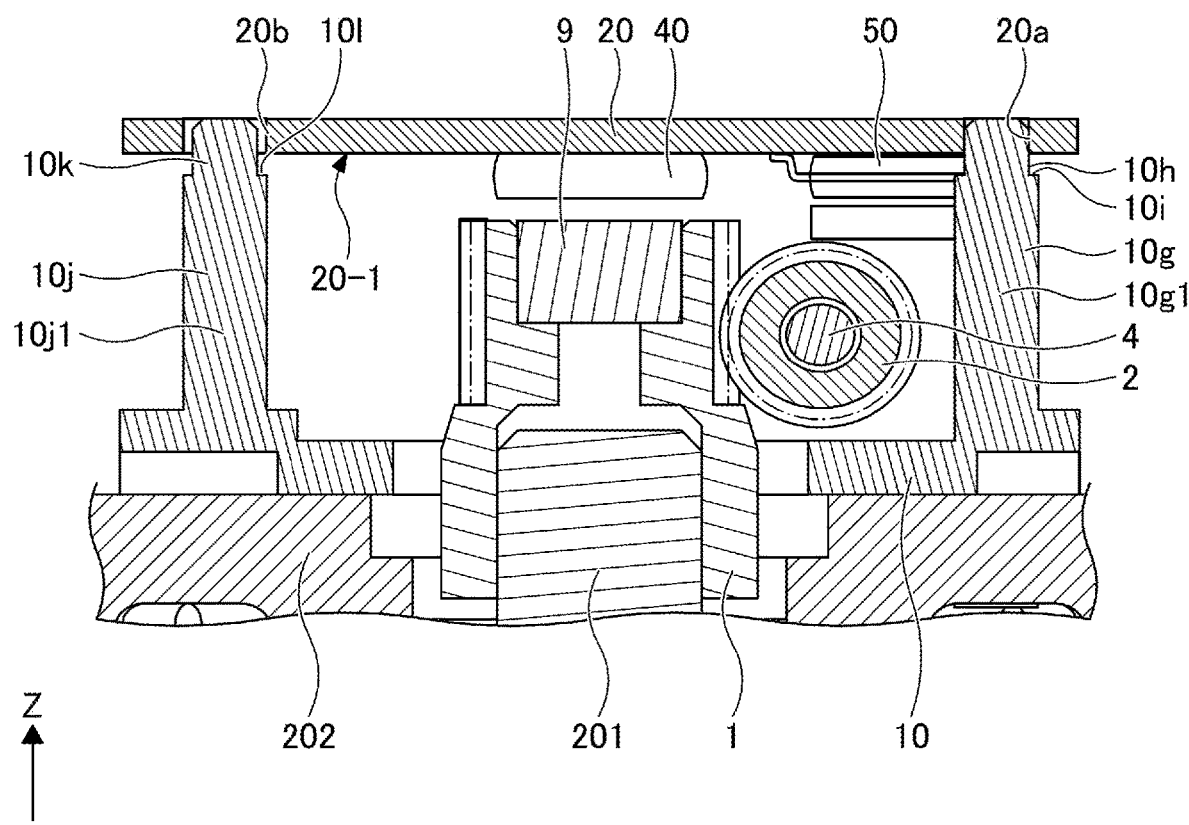
FIG. 21 is a cross sectional view of the absolute encoder 100-2 illustrated in FIG. 11 cut along a plane passing through a center of a substrate positioning pin 10g and a center of a substrate positioning pin 10j illustrated in FIG. 14, and parallel to the Z-axis direction. However, the magnetic sensor 40 is not illustrated in cross section.

FIG. 21 is a cross sectional view of the absolute encoder 100-2 illustrated in FIG. 11 cut along a plane passing through the center of the substrate positioning pin 10g and the center of the substrate positioning pin 10j illustrated in FIG. 14, and parallel to the Z-axis direction. However, the magnetic sensor 40 is not illustrated in cross section.

Figure 22:
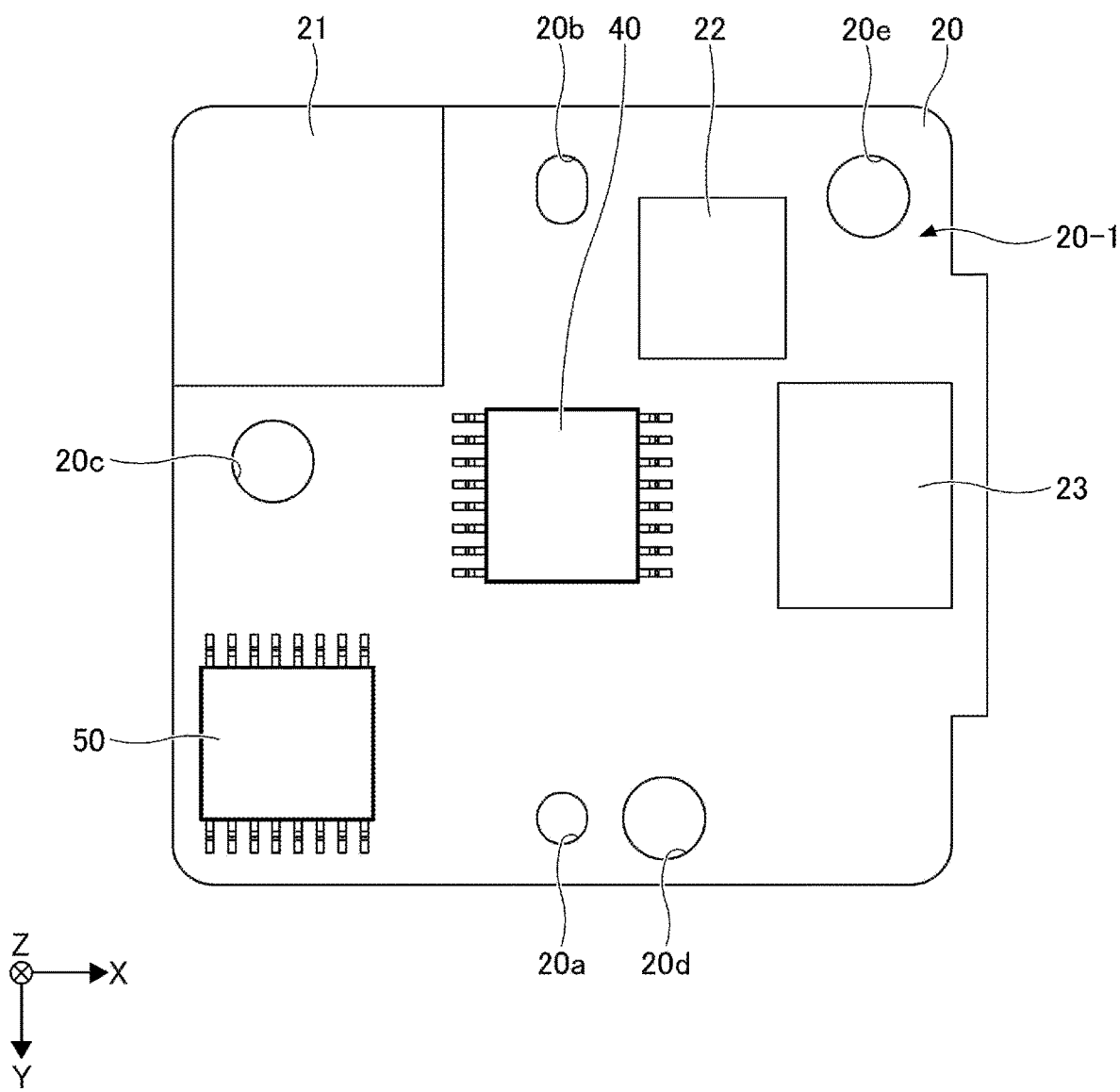
FIG. 22 is a diagram illustrating the substrate 20 illustrated in FIG. 11 viewed from the side of a bottom surface 20-1.
Figure 23:
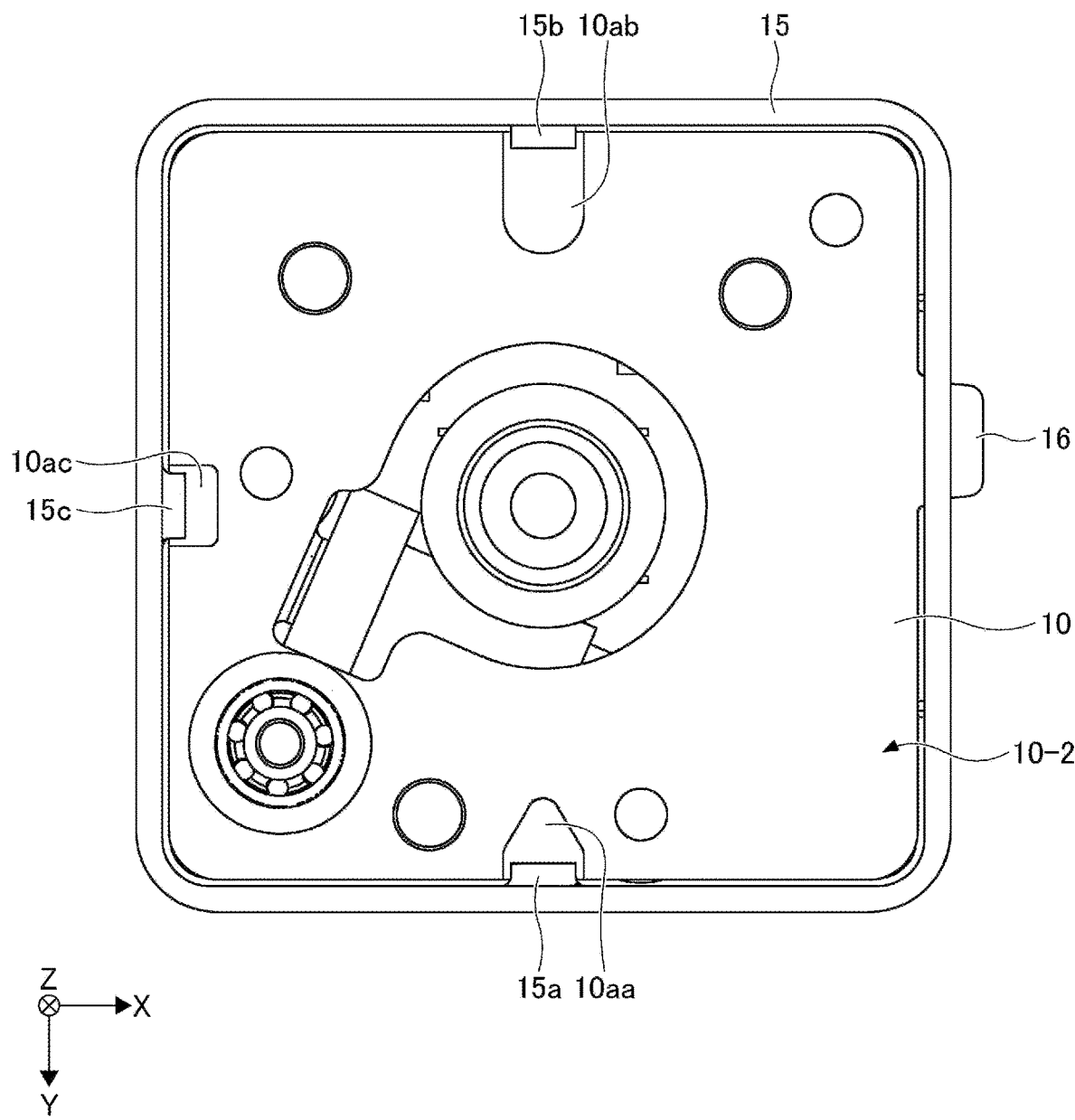
FIG. 23 is a diagram illustrating a state in which the motor 200 is removed from the state of FIG. 10 and viewed from the side of a bottom surface 10-2 of the main base 10.
Figure 24:
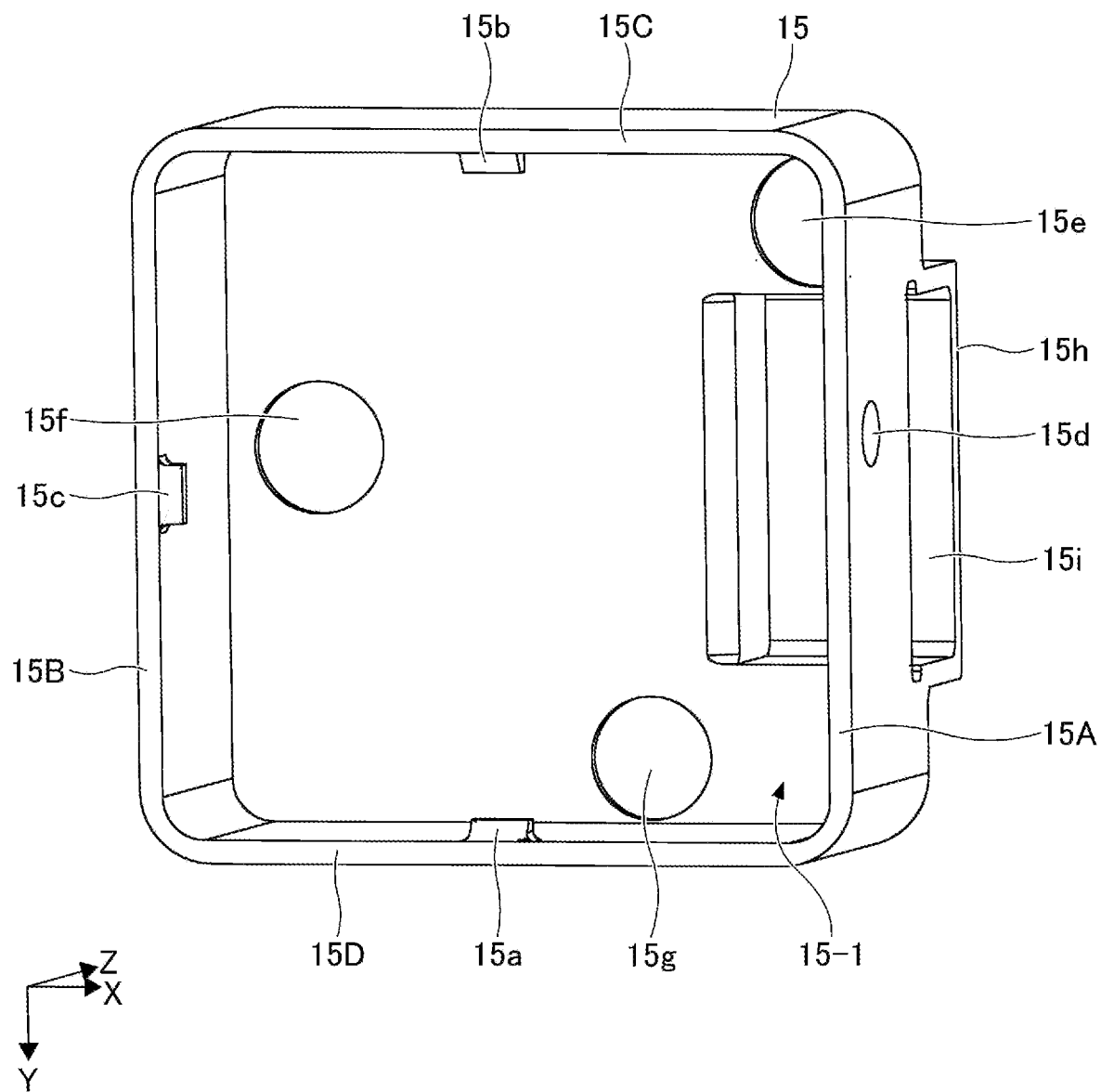
FIG. 24 is a perspective view of the case 15 illustrated in FIG. 10.

FIG. 22 is a diagram illustrating the substrate 20 illustrated in FIG. 11 viewed from the side of a bottom surface 20-1. FIG. 23 is a diagram illustrating a state in which the motor 200 is removed from the state of FIG. 10 and viewed from the side of the bottom surface 10-2 of the main base 10. The bottom surface 10-2 of the main base 10 is a surface on the opposite side of the top surface of the main base 10 illustrated in FIG. 20. The bottom surface 10-2 of the main base 10 is the surface opposing the motor 200. FIG. 24 is a perspective view of the case 15 illustrated in FIG. 10.

Figure 25:
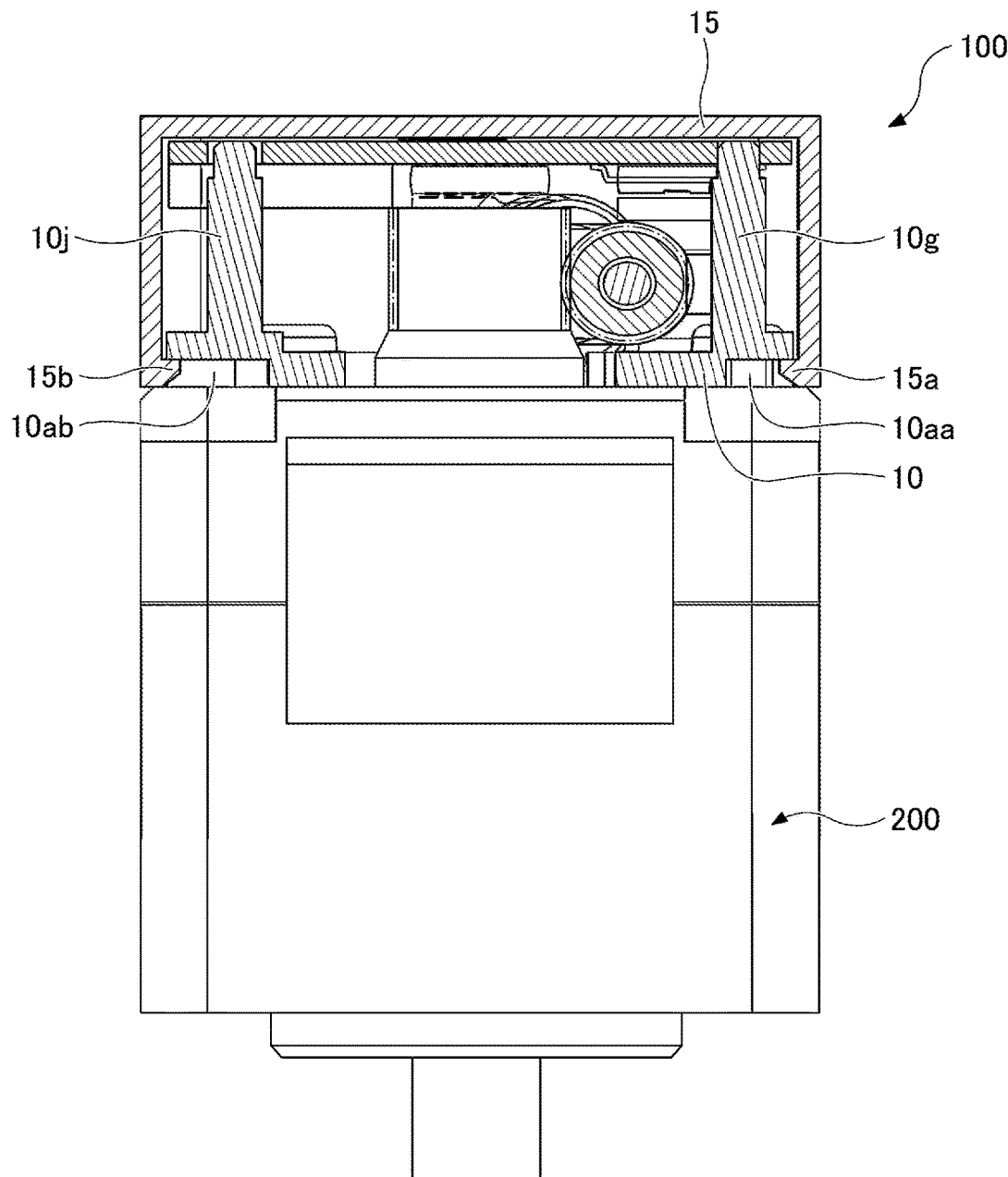
FIG. 25 is a cross sectional view of the absolute encoder 100-2 illustrated in FIG. 10 cut along a plane passing through the center of substrate positioning pin 10g and the center of substrate positioning pin 10j illustrated in FIG. 12, and parallel to the Z-axis direction. However, the motor 200 and the spindle gear 1 are not illustrated in cross section.
Figure 26:
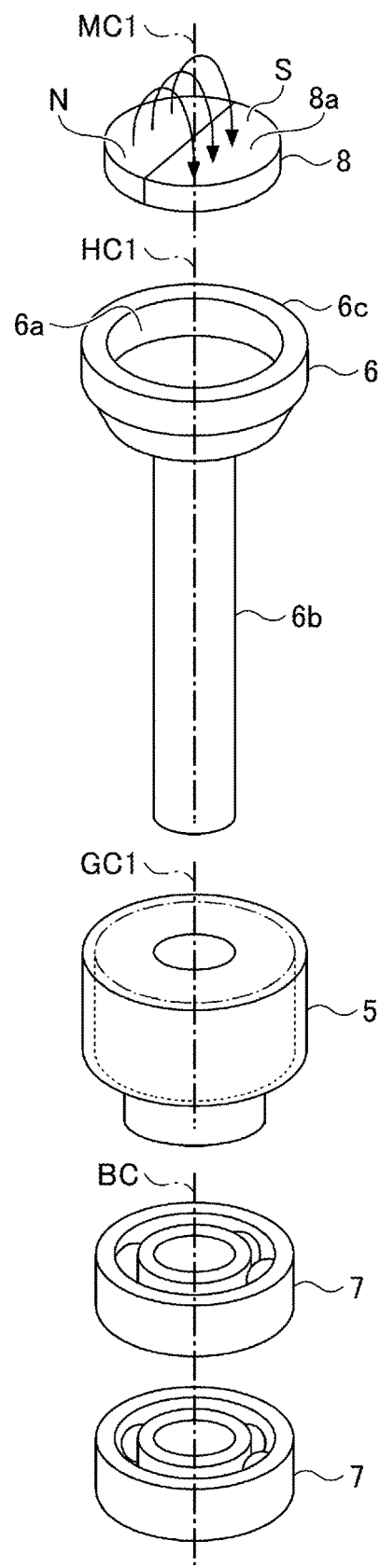
FIG. 26 is an exploded perspective view of a permanent magnet 8, a magnet holder 6, the layshaft gear 5, and the bearing 7 illustrated in FIG. 18.
Figure 27:
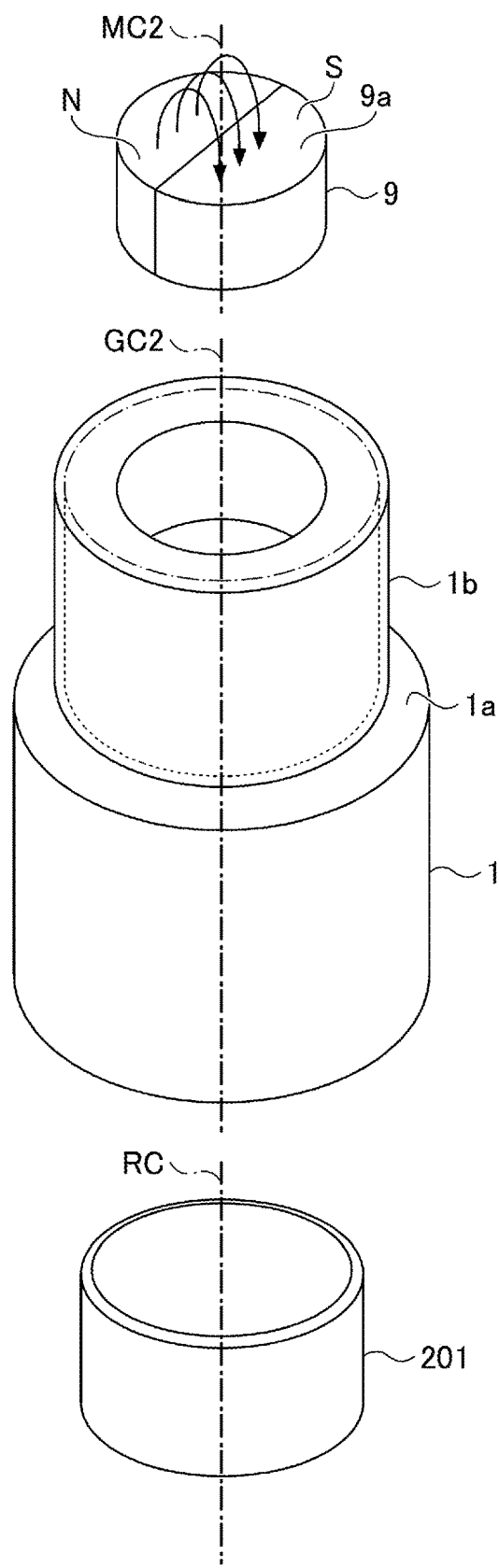
FIG. 27 is an exploded perspective view of a permanent magnet 9, the spindle gear 1, and the motor shaft 201 illustrated in FIG. 17.

FIG. 25 is a cross sectional view of the absolute encoder 100-2 illustrated in FIG. 10 cut along a plane passing through the center of substrate positioning pin 10g and the center of substrate positioning pin 10j illustrated in FIG. 12, and parallel to the Z-axis direction. However, the motor 200 and the spindle gear 1 are not illustrated in cross section. FIG. 25 illustrates a state in which a tab 15a provided on the case 15 engages a recess 10aa provided in the main base 10, and a state in which a tab 15b provided on the case 15 engages a recess 10ab provided in the main base 10. FIG. 26 is an exploded perspective view of the permanent magnet 8, the magnet holder 6, the layshaft gear 5, and the bearing 7 illustrated in FIG. 18. FIG. 27 is an exploded perspective view of the permanent magnet 9, the spindle gear 1, and the motor shaft 201 illustrated in FIG. 17.

Hereinafter, the configuration of the absolute encoder 100-2 will be described in detail. with reference to FIG. 10 through FIG. 27. The absolute encoder 100-2 includes the spindle gear 1, the intermediate gear 2, the bearing 3, the shaft 4, the layshaft gear 5, the magnet holder 6, the bearing 7, the permanent magnet 8, the permanent magnet 9, the main base 10, the leaf spring 11, the screw 12, the substrate attaching screw 13, the screw 14, the case 15, the attaching screw 16, the substrate 20, the microcomputer 21, a bidirectional driver 22, a line driver 23, a connector 24, the magnetic sensor 40, and the magnetic sensor 50.

The motor 200 may be a stepping motor, a DC brushless motor, or the like, for example. As an example, the motor 200 may be applied as the driving source which drives the industrial robot or the like via the deceleration mechanism, such as the harmonic gearing device or the like. The motor 200 includes the motor shaft 201. As illustrated in FIG. 17, one end of the motor shaft 201 protrudes in the Z-axis positive direction from a housing 202 of the motor 200. In addition, as illustrated in FIG. 10, the other end of the motor shaft 201 protrudes in the Z-axis negative direction from the housing 202 of the motor 200. Moreover, the motor shaft 201 is an example of the spindle.

An external shape of the motor 200 in the plan view is a square shape, for example. Each of the 4 sides forming the external shape of the motor 200 is 25 mm, for example. Among the 4 sides forming the external shape of the motor 200, the first side, and the second side parallel to the first side, respectively are parallel to the Y-axis. Among the 4 sides, the third side adjacent to the first side, and the fourth side parallel to the third side, respectively are parallel to the X-axis. Further, the absolute encoder 100-2, provided on the motor 200, has a square shape with each side of 25 mm in the plan view, to match the external shape of the motor 200 having the square shape with each side of 25 mm.

Next, each of the plurality of components provided in the absolute encoder 100-2 will be described.

As illustrated in FIG. 17, the spindle gear 1 is a cylindrical member which is provided coaxially with the motor shaft 201. The spindle gear 1 includes a first cylindrical portion 1a, a the second cylindrical portion 1b which is provided coaxially with the first cylindrical portion 1a on the side of the Z-axis positive direction of the first cylindrical portion 1a. In addition, the spindle gear 1 includes a communicating portion 1c, which is provided on the inner side of the second cylindrical portion 1b along the radial direction and connects the first cylindrical portion 1a and the second cylindrical portion 1b, and a worm gear portion 1d provided on the outer side of the second cylindrical portion 1b along the radial direction. By forming the communicating portion 1c in this manner, the communicating portion 1c functions as an air release passage when the spindle gear 1 is press fit onto the motor shaft 201. An inner diameter of the communicating portion 1c is smaller than an inner diameter of the first cylindrical portion 1a and an inner diameter of the second cylindrical portion 1b. A space surrounded by a bottom surface 1e, which is an end surface of the communicating portion 1c on the Z-axis negative direction, and an inner peripheral surface of the first cylindrical portion 1a, forms a press-fitting portion 1f for fixing the spindle gear 1 to the end of the motor shaft 201. The press-fitting portion 1f is a recess which caves in from an end of the first cylindrical portion 1a on the Z-axis negative direction toward the Z-axis positive direction. The motor shaft 201 is press fit into the press-fitting portion 1f, and the spindle gear 1 rotates unitarily with the motor shaft 201. The worm gear portion 1d is a gear portion of the spindle gear 1.

A space surrounded by a bottom surface 1g, which is an end surface of the communicating portion 1c on the Z-axis positive direction, and an inner peripheral surface of the second cylindrical portion 1b, forms a magnet holding portion 1h which fixes the permanent magnet 9. The magnet holding portion 1h is a recess which caves in from an end of the second cylindrical portion 1b on the Z-axis positive direction toward the Z-axis negative direction. The permanent magnet 9 is press fit into the magnet holding portion 1h. An outer peripheral surface of the permanent magnet 9 which is press fit into the magnet holding portion 1h makes contact with the inner peripheral surface of the second cylindrical portion 1b, and a bottom surface 9b of the permanent magnet 9 makes contact with the bottom surface 1g. Accordingly, the permanent magnet 9 is positioned in the axial direction, and also positioned in the direction perpendicular to the axial direction. The axial direction of the permanent magnet 9 is the same as the center axis direction of the motor shaft 201.

As illustrated in FIG. 13 through FIG. 15, and FIG. 17, the worm gear portion 1d includes helically formed teeth, and engages the worm wheel portion 2a of the intermediate gear 2. The worm wheel portion 2a is a gear portion of the intermediate gear 2. The illustration of the gear profile is omitted in FIG. 17. The worm gear portion 1d is formed of a polyacetal resin, for example. The worm gear portion 1d is an example of the first driving gear.

As illustrated in FIG. 13 through FIG. 16 or the like, the intermediate gear 2 is rotatably supported by the shaft 4 on the top surface of the main base 10. The center axis of the intermediate gear 2 is parallel to the X-Y plane. In addition, the center axis of the intermediate gear 2 is not parallel to each of the X-axis and the Y-axis in the plan view. In other words, the center axis direction of the intermediate gear 2 is inclined with respect to the directions in which the X-axis and the Y-axis respectively extend. The center axis direction of the intermediate gear 2 being inclined with respect to the directions in which the X-axis and the Y-axis respectively extend, means that the center axis of the intermediate gear 2 extends obliquely to the four sides of the main base 10. As illustrated in FIG. 13 and FIG. 14, the four sides of the main base 10 includes a first side 301 parallel to the Y-Z plane, a second side 302 parallel to the first side 301, a third side 303 parallel to the X-Z plane adjacent to the first side 301, and a fourth side 304 parallel to the third side 303. The first side 301 is the side provided on the X-axis positive direction of the main base 10. The second side 302 is the side provided on the X-axis negative direction of the main base 10. The third side 303 is the side provided on the Y-axis positive direction of the main base 10. The fourth side 304 is the side provided on the Y-axis negative direction of the main base 10.

The dimensions of the absolute encoder 100-2, viewed in the plan view, are adjusted to the dimensions of the motor 200 which is a square having the side of 25 mm, for example. For this reason, the dimensions of the absolute encoder 100-2 in the horizontal direction can be made small, by providing the intermediate gear 2, which is arranged parallel to the X-Y plane, to extend obliquely to the four sides of the main base 10. The horizontal direction is the same as the direction perpendicular to the center axis of the motor shaft 201, and is also the same as the direction parallel to the X-Y plane.

As illustrated in FIG. 12 through FIG. 16 or the like, the intermediate gear 2 includes the worm wheel portion 2a, the worm gear portion 2b, a bearing portion 2c, a press-fitting portion 2d, a sliding portion 2e, a bottom surface 2f, and a through hole 2g. The intermediate gear 2 is a cylindrical member having the through hole 2g penetrating the intermediate gear 2 along the center axis, and the shaft 4 is inserted into the through hole 2g. The through hole 2g is a space surrounded by an inner peripheral surface of the intermediate gear 2. The intermediate gear 2 is a member integrally molded from a metal, a resin, or the like, and in this example, the intermediate gear 2 is formed of a polyacetal resin.

The worm wheel portion 2a is a gear to which the worm gear portion 1d of the spindle gear 1 engages. The worm wheel portion 2a is an example of the first driven gear, and is a gear portion of the intermediate gear 2. The worm wheel portion 2a is provided at a position near a center of the axial direction of the intermediate gear 2, along the axial direction of the intermediate gear 2. In addition, the worm wheel portion 2a is formed by a plurality of teeth provided on an outer peripheral portion of the cylindrical portion of the intermediate gear 2.

An outer diameter of the worm wheel portion 2a is smaller than an outer diameter of the worm gear portion 1d. Because a center axis of the worm wheel portion 2a is parallel to the top surface of the main base 10, the outer diameter of the worm wheel portion 2a can be made small, thereby enabling the size of the absolute encoder 100-2 to be reduced in the Z-axis direction (height direction).

The worm gear portion 2b is formed by a helically formed teeth portion, and is provided adjacent to and coaxially with the worm wheel portion 2a. In addition, the worm gear portion 2b is provided on the outer periphery of the cylindrical portion of the intermediate gear 2. When the worm gear portion 2b engages the worm wheel portion 5a provided on the layshaft gear 5, a rotary force of the intermediate gear 2 is transmitted to the layshaft gear 5. The worm gear portion 2b is an example of the second driving gear, and is a gear portion of the intermediate gear 2. The worm wheel portion 5a is a gear portion of the layshaft gear 5. A center line of the worm wheel portion 5a, and a center line of the worm gear portion 2b, are perpendicular are perpendicular to each over when viewed from a direction which is perpendicular to the center line of the worn wheel portion 5a and also perpendicular to the center line of the worm gear portion 2b.

The outer diameter of the worm gear portion 2b is set to a small value within a range possible, so that the size of the absolute encoder 100-2 can be reduced in the Z-axis direction (height direction).

As illustrated in FIG. 15, the bearing portion 2c is provided on an inner peripheral surface of the intermediate gear 2 on the inner side along the radial direction, on the side of the intermediate gear 2 opposite to the press-fitting portion 2d, that is, on the side of the sliding portion 2e of the intermediate gear 2. The shaft 4 is slidably inserted into the bearing portion 2c, and the intermediate gear 2 is rotatably supported on the shaft 4.

The press-fitting portion 2d is a recess which caves in from the end surface of the intermediate gear 2 toward the center of the axial direction Td of the intermediate gear 2, on the inner side of the worm gear portion 2b, and communicates to the through hole 2g. The press-fitting portion 2d may be regarded as an end of the through hole 2g having an opening with the increased diameter. An outer ring 3a of the bearing 3 is press fit and fixed to the press-fitting portion 2d.

As illustrated in FIG. 13 through 15, FIG. 19, and FIG. 20, the sliding portion 2e of the intermediate gear 2 is provided on one end of the intermediate gear 2, that is, on the side of the intermediate gear 2 opposite to the worm gear portion 2b along the axial direction Td. The sliding portion 2e of the intermediate gear 2 makes contact with a sliding portion 11a of the leaf spring 11. The leaf spring 11 is an example of a resilient member, and is made of a metal, for example. The sliding portion 11a of the leaf spring 11 is formed by a forked member having two portions branching from a base portion 1id of the leaf spring 11. Of the entire leaf spring 11, the base portion 11d of the leaf spring 11 is a plate shaped member provided between an attaching portion 11b and the sliding portion 11a.

A gap larger than the diameter of the shaft 4 is formed between the two branching portions foisting the sliding portion 11a of the leaf spring 11. For this reason, the two branching portions straddle the shaft 4, and the attaching portion lib of the leaf spring 11 is fixed by the screw 12 to the leaf spring attaching surface 10e disposed on the wall section 72 of the main base 10, so that the two branching portions do not make contact with the shaft 4.

The sliding portion 11a of the leaf spring 11 is provided at a position opposing the sliding portion 2e of the intermediate gear 2, after assembling the intermediate gear 2. The sliding portion 2e of the intermediate gear 2 makes contact with and is pressed by the sliding portion 11a of the leaf spring 11, thereby being biased in a direction from one end 4a of the shaft 4 to the other end 4b of the shaft 4 along the center axis of the shaft 4. When the intermediate gear 2 rotates in this state, the sliding portion 2e of the intermediate gear 2 slides while making contact with the sliding portion 11a of the leaf spring 11.

The bottom surface 2f of the intermediate gear 2 is positioned adjacent to the press-fitting portion 2d, and makes contact with a side surface 3c of the outer ring 3a of the bearing 3. The outer ring 3a is press fit into the press-fitting portion 2d until the side surface 3c of the outer ring 3a makes contact with the bottom surface 2f.

The through hole 2g of the intermediate gear 2 penetrates the intermediate gear 2 along the center axis of the intermediate gear 2, from the bearing portion 2c toward the press-fitting portion 2d, and is arranged coaxially with the shaft 4. Because the inner diameter of the through hole 2g is larger than the outer diameter of the shaft 4, a space is secured between the through hole 2g and the outer peripheral surface of the shaft 4.

As illustrated in FIG. 15 and FIG. 16, the bearing 3 includes the outer ring 3a, an inner ring 3b, the side surface 3c, and a side surface 3d. The side surface 3c of the bearing 3 is the side surface of the outer ring 3a in the axial direction Td of the shaft 4 indicated by an arrow in FIG. 15, and the side surface 3d of the bearing 3 is the side surface of the inner ring 3b in this axial direction Td. In the embodiment of the present invention, the (center) axial direction of the intermediate gear 2 or the shaft 4 is indicated by Td.

The outer ring 3a of the bearing 3 is press fit and fixed to the press-fitting portion 2d, and the side surface 3c makes contact with and is fixed to the bottom surface 2f. The shaft 4 is inserted on the inner side of the inner ring 3b. As illustrated in FIG. 15, the side surface 3d of the inner ring 3b makes contact with a contact surface 10c of the wall 80 of the main base 10. The contact surface 10c restricts the position of the intermediate gear 2 along the axial direction Td. As described above, because the intermediate gear 2 is biased by the leaf spring 11 in the axial direction Td from the one end 4a of the shaft 4 toward the other end 4b of the shaft 4, the side surface 3c of the outer ring 3a of the bearing 3, which makes contact with the bottom surface 2f of the intermediate gear 2, is also biased in the same direction. Accordingly, the inner ring 3b of the bearing 3 is also biased in the same direction, so that the side surface 3d of the inner ring 3b of the bearing 3 makes contact with the contact surface 10c of the wall 80. As a result, a biasing force is transmitted to the contact surface 10c of the wall 80, and the intermediate gear 2 is stably supported in the axial direction Td of the shaft 4. Details of the biasing force will be described later.

The outer ring 3a of the bearing 3 is rotatably provided with respect to the inner ring 3b. For this reason, the intermediate gear 2 is rotatably supported by the shaft 4 at two positions, namely, the bearing portion 2c of the intermediate gear 2 and the bearing 3 illustrated in FIG. 15. The shaft 4 is formed of stainless steel, for example.

As illustrated in FIG. 15, the wall 70 and the wall 80 are examples of a holder which rotatably holds the intermediate gear 2 through the shaft 4. The wall 80 is integrally provided on the top surface of the base portion 60 to form a pair with the wall 70, and extends in the Z-axis positive direction from the top surface of the base portion 60. Of the entire top surface of the base portion 60, the wall 80 is provided in a region closer to the second side 302 than the center along the X-axis direction, and closer to the third side 303 than the center along the Y-axis direction. Of this region, the wall 80 is provided at a position closer to the second side 302, and closer to the center along the Y-axis direction. The wall 70, the wall 80, and the shaft 4 function as a holder which rotatably holds the intermediate gear 2. The shaft 4 is a cylindrical member having the one end 4a and the other end 4b. The other end 4b of the shaft 4 is press fit into and fixed to the hole 10b formed in the wall 80 of the main base 10. On the other hand, the one end 4a of the shaft 4 need only be inserted into and positioned in the hole 10a formed in the wall 70, and the one end 4a of the shaft 4 does not need to be press fit into the hole 10a. Thus, because the one end 4a of the shaft 4 is inserted into the hole 10a rather than being press fit therein, the assembling of the shaft 4 is facilitated compared to a case where the one end 4a of the shaft 4 is press fit into the hole 10a.

As illustrated in FIG. 14 or the like, in the absolute encoder 100-2, the layshaft gear 5 is provided on the side of the intermediate gear 2 opposite to the spindle gear 1. For example, of the region surrounded by the four sides of the main base 10, the layshaft gear 5 is arranged in a region near a corner portion of the main base 10. The corner portion is where the second side 302 and the third side 303 illustrated in FIG. 14 intersect, for example. As described above, the layshaft gear 5 and the spindle gear 1 are arranged to sandwich the intermediate gear 2, using a limited region on the main base 10. Hence, compared to a case where the layshaft gear 5 and the spindle gear 1 are arranged adjacent to each other without sandwiching the intermediate gear 2 therebetween, it is possible to increase the distance from the layshaft gear 5 to the spindle gear 1.

The magnetic sensor 40 can detect the rotation angle of the corresponding spindle gear 1, by detecting a change in the magnetic flux generated from the permanent magnet 9 due to rotation of the permanent magnet 9 which rotates together with the spindle gear 1. On the other hand, the magnetic sensor 50 can detect the rotation angle of the corresponding layshaft gear 5, by detecting a change in the magnetic flux generated from the permanent magnet 8 due to the rotation of the permanent magnet 8 which rotates together with the layshaft gear 5.

Next, in a case where the spindle gear 1 and the layshaft gear 5 are arranged adjacent to each other, for example, a portion of the magnetic flux generated from each of the permanent magnet 8 and the permanent magnet 9 affects the magnetic sensor which does not correspond to each of the permanent magnet 8 and the permanent magnet 9, to generate the so-called magnetic interference which will be described hereinafter.

FIG. 28 is a diagram conceptually illustrating the waveform (A) detected by the magnetic sensor 40 which detects the magnetic flux of the permanent magnet 9 provided on the spindle gear 1, the waveform (B) detected by the magnetic sensor 50 which detects the magnetic flux of the permanent magnet 8 provided on the layshaft gear 5, and the magnetic interference waveform (C) detected by the magnetic sensor 40 which detects the state in which the portion of the magnetic flux of the permanent magnet 8 is superimposed on the magnetic flux of the permanent magnet 9 as the leakage magnetic flux, when the spindle gear 1 rotates. The ordinate indicates the magnetic flux, and the abscissa indicates the rotation angle of the spindle gear 1. As described above, in the magnetic sensor 40, it is desirable to detect the waveform of (A), but when the magnetic interference is generated, the waveform illustrated in (C) is formed, so that it is impossible to detect the accurate waveform.

Similarly, FIG. 29 is a diagram conceptually illustrating the waveform (A) detected by the magnetic sensor 50 which detects the magnetic flux of the permanent magnet 8 provided on the layshaft gear 5, the waveform (B) detected by the magnetic sensor 40 which detects the magnetic flux of the permanent magnet 9 provided on the spindle gear 1, and the magnetic interference waveform (C) detected by the magnetic sensor 50 which detects the state in which the portion of the magnetic flux of the permanent magnet 9 is superimposed on the magnetic flux of the permanent magnet 8 as the leakage magnetic flux, when the spindle gear 1 rotates. The ordinate indicates the magnetic flux, and the abscissa indicates the rotation angle of the layshaft gear 5. As described above, in the magnetic sensor 50, it is desirable to detect the waveform of (A), but when the magnetic interference is generated, the waveform illustrated in (C) is formed, and it is impossible to detect the accurate waveform.

According to the absolute encoder 100-2 of the embodiment 2, however, because the spindle gear 1 and the permanent magnets 9, and the layshaft gear 5 and the permanent magnets 8, are arranged with a separation to sandwich the intermediate gear 2 therebetween, it is possible to reduce the generation of the magnetic interference in which the portion of the magnetic flux generated from each of the permanent magnet 8 and the permanent magnet 9 affects the magnetic sensor that does not correspond to each of the permanent magnet 8 and the permanent magnet 9. For example, it is possible to reduce the portion of the magnetic flux generated from the permanent magnet 9 provided on the spindle gear 1, from interfering with the magnetic sensor 50 originally provided for the purpose of detecting the change in the magnetic flux generated from the permanent magnet 8 provided on the layshaft gear 5, as the leakage magnetic flux. In addition, it is possible to reduce the portion of the magnetic flux generated from the permanent magnet 8 provided on the layshaft gear 5, from interfering with the magnetic sensor 40 originally provided for the purpose of detecting the change in the magnetic flux generated from the permanent magnet 9, as the leakage magnetic flux.

Thus, according to the absolute encoder 100-2 of the embodiment 2, it is possible to prevent the detection accuracy of the magnetic sensor 50 which detects the rotation angle or the rotation quantity of the layshaft gear 5 from deteriorating, while making the size of the absolute encoder 100-2 relatively small in the plan view. In addition, according to the absolute encoder 100-2, it is possible to prevent the detection accuracy of the magnetic sensor 40 which detects the rotation angle or the rotation quantity of the spindle gear 1 from deteriorating, while making the size of the absolute encoder 100-2 relatively small in the plan view.

As illustrated in FIG. 18, the layshaft gear 5 is a cylindrical member which is press fit and fixed to the shaft portion 6b of the magnet holder 6. The layshaft gear 5 includes a worm wheel portion 5a, and a through hole 5b. The layshaft gear 5 is a member integrally molded from a metal or a resin, and in this example, the layshaft gear 5 is formed of a polyacetal resin, for example.

The worm wheel portion 5a is a gear which engages the worm gear portion 2b. The worm wheel portion 5a is an example of the second driven gear. The worm wheel portion 5a formed by a plurality of teeth provided on the outer periphery of the cylindrical portion of the layshaft gear 5. In FIG. 13, when the intermediate gear 2 rotates, the rotary force of the intermediate gear 2 is transmitted to the layshaft gear 5 via the worm gear portion 2b and the worm wheel portion 5a.

The through hole 5b is a hole which penetrates the cylindrical layshaft gear 5 along the center axis thereof. The shaft portion 6b of the magnet holder 6 is press fit into the through hole 5b, and the layshaft gear 5 rotates unitarily with the magnet holder 6.

As illustrated in FIG. 18 and FIG. 26, the magnet holder 6 includes a magnet holding portion 6a, the shaft portion 6b, and the head 6c. The magnet holder 6 is a member integrally molded from a metal or a resin, and in this example, the magnet holder 6 is formed of non-magnetic stainless steel, for example.

An outer ring 7a of the two bearings 7 are press fit into an inner peripheral surface 10dc of the bearing holder portion 10d formed on the main base 10. Each of the two bearings 7 includes the outer ring 7a, and an inner ring 7b.

The shaft portion 6b of the magnet holder 6 is a cylindrical member, and is press fit into the through hole 5b of the layshaft gear 5, and a lower portion of the shaft portion 6b is inserted into the inner ring 7b of the two bearings 7. Hence, the magnet holder 6 is rotatably supported by the two bearings 7, with respect to the main base 10, and rotates unitarily with the layshaft gear 5.

In addition, the head 6c is provided on an upper end of the magnet holder 6. The head 6c is a cylindrical member with a bottom. The magnet holding portion 6a is formed in the head 6c. The magnet holding portion 6a is a recess which caves in from a top end surface of the head 6c toward a downward direction. The outer peripheral surface of the permanent magnet 8 arranged in the magnet holding portion 6a makes contact with the inner peripheral surface of the head 6c. Thus, the permanent magnet 8 is fixed to the magnet holding portion 6a of the head 6c.

Because the shaft portion 6b of the magnet holder 6 is rotatably supported by the two bearings 7 disposed in the bearing holder portion 10d formed on the main base 10, it is possible to prevent the magnet holder 6 from tilting. Therefore, if the two bearings 7 are arranged as far apart as possible in the axial direction of the shaft portion 6b, the effect of more positively preventing the tilting of the magnet holder 6 may be expected.

As illustrated in FIG. 18, an upper portion 10db of the bearing holder portion 10d is an upper region of the bearing holder portion 10d in the Z-axis direction, of the entire bearing holder portion 10d. One bearing 7 is provided on the inner side of the upper portion 10db of the bearing holder portion 10d. In addition, a lower portion 10da of the bearing holder portion 10d is a lower region of the bearing holder portion 10d in the Z-axis direction, of the entire bearing holder portion 10d. One bearing 7 is provided on the inner side the lower portion 10da of the bearing holder portion 10d.

As illustrated in FIG. 18, a cutout portion 202a is provided in a portion of the housing 202 of the motor 200. The cutout portion 202a is a recess which caves in toward the Z-axis negative direction. Because the protruding lower portion 10da of the bearing holder portion 10d is provided on the main base 10, the cutout portion 202a is provided in the housing 202 of the motor 200 to prevent interference between each other. The lower portion 10da of the bearing holder portion 10d is a lower region of the bearing holder portion 10d in the Z-axis direction, of the entire bearing holder portion 10d. One bearing 7 is provided on the inner side the lower portion 10da of the bearing holder portion 10d. As described above, by providing the cutout portion 202a in the housing 202 of the motor 200, it is possible to provide the two bearings 7 apart from each other in the Z-axis direction, when compared to a case where the cutout portion 202a is not provided. Moreover, the upper portion 10db of the bearing holder portion 10d is an upper region of the bearing holder portion 10d in the Z-axis direction, of the entire bearing holder portion 10d.

When the bearing 7 are arranged at a position near the magnet holding portion 6a and the permanent magnet 8 in the axial direction of the shaft portion 6b of the magnet holder 6, it is possible to reduce axial runout during rotation of the magnet holder 6 and the permanent magnet 8. On the other hand, because the outer diameter of the upper portion 10db of the bearing holder portion 10d is near the intermediate gear 2, it is possible to provide the bearing 7 at a position closer to the magnet holding portion 6a and the permanent magnet 8, while preventing interference with the tip circle of the intermediate gear 2, by forming a slope on the upper portion 10db of the bearing holder portion 10d.

The magnetic sensor 40 can detect the rotation angle of the corresponding spindle gear 1, by detecting the change in the magnetic flux generated from the permanent magnet 9 due to rotation of the permanent magnet 9 which rotates together with the spindle gear 1. On the other hand, the magnetic sensor 50 can detect the rotation angle of the corresponding layshaft gear 5, by detecting the change in the magnetic flux generated from the permanent magnet 8 due to the rotation of the permanent magnet 8 which rotates together with the layshaft gear 5.

As illustrated in FIG. 18 and FIG. 26, the permanent magnet 8 has a surface 8a. The permanent magnet 8 has an approximately cylindrical shape, and a center axis MC1 of the permanent magnet 8 (an axis indicating the center of the permanent magnet 8, or an axis passing through the center of a boundary of the magnetic poles) coincides with a center axis HC1 of the magnet holder 6, a center axis GC1 of the layshaft gear 5, and a center axis BC of the bearing 7. The surface 8a of the permanent magnet 8 opposes a surface 50a of the magnetic sensor 50, with a predetermined separation therebetween. By making each of these center axes coincide with each other in this manner, it is possible to detect the rotation angle or rotation quantity with a higher accuracy.

In this embodiment, as illustrated in FIG. 26, the two magnetic poles (N/S) of the permanent magnet 8 are formed adjacent to each other on a plane (X-Y plane) perpendicular to the center axis MC1 of the permanent magnet 8. In other words, on the center axis MC1, the center of rotation of the permanent magnet 8 and the center of the boundary of the magnetic poles desirably coincide. In this case, it is possible to further improve the detection accuracy of the rotation angle or rotation quantity.

As illustrated in FIG. 17 and FIG. 27, the permanent magnet 9 is a permanent magnet having an approximately cylindrical shape which is press fit into the magnet holding portion 1h of the spindle gear 1, and includes the top surface 9a and the bottom surface 9b. The top surface 9a opposes the surface 40a of the magnetic sensor 40, with a predetermined separation therebetween. The bottom surface 9b makes contact with the bottom surface 1g of the magnet holding portion 1h of the spindle gear 1, and restricts the position (position in the Z-axis direction) of the spindle gear 1 in a direction of a center axis GC2. A center axis MC2 of the permanent magnet 9 (an axis indicating the center of the permanent magnet 9, or an axis passing through the center of the boundary of the magnetic poles) coincides with the center axis GC2 of the spindle gear 1, and a center axis RC of the motor shaft 201. By making each of these center axes coincide with each other in this manner, it is possible to detect the rotation angle or rotation quantity with an even higher accuracy.

In this embodiment, as illustrated in FIG. 27, the two magnetic poles (N/S) of the permanent magnet 9 are desirably formed adjacent to each other on a plane (X-Y plane) perpendicular to the center axis MC2 of the permanent magnet 9. In this case, it is possible to further improve the detection accuracy of the rotation angle or rotation quantity.

Each of the permanent magnet 8 and the permanent magnet 9 is formed of a magnetic material, such as a ferrite-based material, a Nd(neodymium)-Fe(iron)-B(boron)-based material, or the like, for example. Each of the permanent magnet 8 and the permanent magnet 9 may be a bonded magnet or a rubber magnet including a resin binder, for example.

FIG. 22 illustrates a positioning holes 20a, a positioning hole 20b, a hole 20c, a hole 20d, and a hole 20e, which are through holes formed in the substrate 20. The shape of the wall forming the positioning hole 20a is a circle, for example. The shape of the wall forming the positioning hole 20b is an ellipse, for example. Each of the holes 20c, 20d, and 20e is a through hole used to fix the substrate 20 to the main base 10 by substrate attaching screws 13 illustrated in FIG. 11. The shape of the wall forming each of the holes 20c, 20d, and 20e is a circle, for example. A diameter of the wall forming each of the holes 20c, 20d, and 20e is larger than a diameter of a male thread portion of the substrate attaching screw 13, and smaller than a diameter of a head of the substrate attaching screw 13.

As illustrated in FIG. 12 through FIG. 15, FIG. 19 through FIG. 21, or the like, the main base 10 includes the hole 10a, the hole 10b, the contact surface 10c, the bearing holder portion 10d, the leaf spring attaching surface 10e, the base portion 60, the wall 70, the wall 80, an opening 10-1, and a threaded hole 10f. The main base 10 includes the substrate positioning pin 10g, the substrate positioning pin 10j, a tip end 10h, a tip end 10k, a post 10m, a post 10q, a post 10s, a threaded hole 10u, a threaded hole 10v, and a threaded hole 10w. The substrate positioning pin 10g, the substrate positioning pin 10j, the post 10m, the post 10q, and the post 10s are examples of columnar member. A stepped portion 10i is foiled between the tip end 10h of the substrate positioning pin 10g extending in the Z-axis direction from the main base 10, and a base portion 10g1 of the substrate positioning pin 10g. When the tip end 10h of the substrate positioning pin 10g is inserted into the positioning hole 20a formed in the substrate 20, a gap is formed between the bottom surface 20-1 of the substrate 20 and the stepped portion 10i. Similarly, a stepped portion 101 is formed between the tip end 10k of the substrate positioning pin 10j extending in the Z-axis direction from the main base 10, and a base portion 10j1 of the substrate positioning pin 10j. When the tip end 10k of the substrate positioning pin 10j is inserted into the positioning hole 20b formed in the substrate 20, a gap is formed between the bottom surface 20-1 of the substrate 20 and the stepped portion 101. Thus, when the two substrate positioning pins 10g and 10j are used, the position of the substrate 20 is restricted in the direction perpendicular to the Z-axis direction. However, because the gap is formed between the substrate 20 and each of the stepped portion 10i and the stepped portion 101, the position of the substrate 20 in the Z-axis direction is not restricted by the two substrate positioning pins 10g and 10j.

The base portion 60 of the main base 10 is a member integrally formed by aluminum die casting, for example, and has an approximately square shape in the plan view. The base portion 60 is an example of a plate portion. The base portion 60 is attached to the top surface of the motor 200.

The opening 10-1 illustrated in FIG. 12 penetrates the base portion 60 in a thickness direction (Z-axis direction). The spindle gear 1 is inserted into the opening 10-1. The opening 10-1 is an example of a first through hole.

As illustrated in FIG. 13, FIG. 14, FIG. 19, FIG. 20, or the like, the wall 70 includes a wall section 71, and a wall section 72. The wall 70 functions to support the shaft 4 and fix the leaf spring 11. The wall section 71 is integrally provided on the top surface of the base portion 60, and extends in the Z-axis positive direction from the base portion 60. In the plan view, of the entire top surface of the base portion 60, the wall 70 is provided in a region closer to the first side 301 than the center along the X-axis direction, and closer to the fourth side 304 than the center along the Y-axis direction. The wall section 71 includes an attaching surface 10ad positioned on the side of the X-axis positive direction, and a threaded hole 10ae penetrating the wall section 81 in the X-axis positive direction. As illustrated in FIG. 10, FIG. 23, and FIG. 24, the attaching screw 16 is inserted through a hole 15d in the case 15 and screwed into the threaded hole 10ae, so that the inner surface of the case 15 makes contact with and is fixed to the attaching surface 10ad of the wall section 71.

As illustrated in FIG. 14, in the plan view, of the entire top surface of the base portion 60, the wall section 72 is provided in a region closer to the first side 301 than the center along the X-axis direction, and closer to the third side 303 than the center along the Y-axis direction. The wall section 72 is connected to the wall section 71, and extends from the wall section 71 toward a vicinity of the center of the third side 303. An end of the wall section 72 near the third side 303 is connected to the post 10s. The post 10s, connected to the wall section 72, is provided at a position near the center along the X-axis direction of the main base 10, and near the third side 303 of the main base 10. Thus, the wall section 72 extends from the wall section 71 toward the post 10s. In other words, in the plan view, the wall section 72 extends in an oblique direction with respect to each of the X-axis and the Y-axis.

As illustrated in FIG. 20, the screw 12 is inserted through the hole 11c formed in the attaching portion 11b of the leaf spring 11, and is screwed into the threaded hole 10f formed in the wall section 72 of the main base 10. Accordingly, the attaching portion lib of the leaf spring 11 makes contact with the leaf spring attaching surface 10e formed on the wall section 72, and the leaf spring 11 is fixed to the wall section 72. The wall section 72 functions as a fixing portion to which the leaf spring 11 is fixed. In this state, as illustrated in FIG. 14 and FIG. 15, the sliding portion 11a of the leaf spring 11 makes contact with the sliding portion 2e of the intermediate gear 2 which is inserted with the shaft 4.

An attaching angle θ illustrated in FIG. 15 will be described. Because the worm gear portion 1d of the spindle gear 1 engages the worm wheel portion 2a, a first thrust force is generated at the intermediate gear 2 in the direction from the other end 4b of the shaft 4 toward the one end 4a of the shaft 4, or in the direction from the one end 4a of the shaft 4 toward the other end 4b of the shaft 4, as the worm gear portion 1d of the spindle gear 1 rotates. Further, because the worm gear portion 2b engages the worm wheel portion 5a of the layshaft gear 5, a second thrust force is generated at the intermediate gear 2 in the direction from the other end 4b of the shaft 4 toward the one end 4a of the shaft 4, or in the direction from the one end 4a of the shaft 4 toward the other end 4b of the shaft 4. Even when the first thrust force and the second thrust force are generated in this manner, it is necessary to reduce the movement of the intermediate gear 2 in the axial direction Td of the shaft 4, in order to accurately transmit the rotation quantity of the worm gear portion 1d of the spindle gear 1 to the worm wheel portion 5a of the layshaft gear 5. The leaf spring 11 applies a biasing force to the intermediate gear 2, in the direction from the one end 4a of the shaft 4 toward the other end 4b of the shaft 4. The biasing force generated by the leaf spring 11 is set to a value higher than a sum of the first thrust force and the second thrust force in the direction from the other end 4b of the shaft 4 toward one end 4a of the shaft 4.

In FIG. 15, the attaching angle θ is equal to an angle formed by the base portion lid of the leaf spring 11 which is fixed to the wall section 72 of the main base 10, and a side surface 73 on the side of the intermediate gear 2 of the surface forming the hole 10a of the wall section 72 in which the one end 4a of the shaft 4 is inserted is formed, in which the intermediate gear 2 is not inserted into the shaft 4. The side surface 73 and the shaft 4 in this embodiment are at right angles, but the angle is not particularly limited. The attaching angle θ is set to such an angle that, when the intermediate gear 2 is assembled onto the shaft 4, the sliding portion 11a of the leaf spring 11 makes contact with the sliding portion 2e of the intermediate gear 2 to bend the leaf spring 11 by a predetermined amount, the biasing force in the axial direction Td of the shaft 4 is appropriately applied with respect to the intermediate gear 2. Hence, the intermediate gear 2 is biased in the direction from the one end 4a of the shaft 4 toward the other end 4b of the shaft 4 by the leaf spring 11, to thereby reduce the movement of the intermediate gear 2 caused by the combined force of the first thrust force and the second thrust force in the direction from the other end 4b of the shaft 4 toward the one end 4a of the shaft 4. As a result, it is possible to prevent the rotation accuracy of the layshaft gear 5 from deteriorating. The larger the biasing force becomes, the larger the sliding resistance becomes when the intermediate gear 2 illustrated in FIG. 15 rotates. For this reason, it is desirable to set the attaching angle θ to an appropriate value so that a sufficient biasing force can be generated to reduce the movement of the intermediate gear 2 caused by the thrust force, while making the sliding resistance when the intermediate gear 2 rotates to a requisite minimum. In order to set the attaching angle θ to such an appropriate value, it is necessary to improve a profile irregularity of the leaf spring attaching surface 10e to which the leaf spring 11 is attached, and to reduce an error in the attaching angle of the wall 70 with respect to the base portion 60.

In the absolute encoder 100-2 according to the embodiment 2, because the main base 10 is famed by the aluminum die casting, the error in the attaching angle of the wall 70 with respect to the base portion 60 can be made small, and the profile irregularity of the leaf spring attaching surface 10e can be improved, when compared to a case where the base portion 60 and the wall 70 made separately by the sheet metal work are combined, for example. As a result, the error in the attaching angle θ of the leaf spring 11 with respect to the wall section 72 becomes small, and management of the biasing force is facilitated.

As illustrated in FIG. 19, the main base 10 is fixed by 3 screws 14 inserted through holes formed at 3 locations of the main base 10, and screwed into threaded holes formed in the motor 200. The threaded hole 10v, the threaded hole 10u, and the threaded hole 10w are formed at tip ends on the Z-axis positive direction side of the post 10q, the post 10m, and the post 10s extending in the Z-axis positive direction from the main base 10. The substrate attaching screws 13 inserted through the hole 20c, the hole 20e, and the hole 20d formed in the substrate 20 illustrated in FIG. 11 are screwed into the threaded hole 10v, the threaded hole 10u, and the threaded hole 10w, respectively. Accordingly, a top end surface 10r, a top end surface 10p, and a top end surface 10t of the post 10q, the post 10m, and the post 10s make contact with the bottom surface 20-1 of the substrate 20 illustrated in FIG. 21. The bottom surface 20-1 of the substrate 20 is the surface opposing the main base 10, of the two substrate surfaces in the Z-axis direction of the substrate 20. As a result, the position of the substrate 20 in the Z-axis direction is restricted.

As illustrated in FIG. 10, FIG. 23, FIG. 25, or the like, the case 15 is a box-shaped member having one surface that is open, and includes the top surface 15-1, a first side surface 15A, a second side surface 15B, a third side surface 15C, and a fourth side surface 15D. The case 15 is an integrally molded member made of a resin, for example. The top surface 15-1 corresponds to the bottom of the box-shaped member. The top surface 15-1 is the surface opposing the top surface 20-2 of the substrate 20 illustrated in FIG. 11. The top surface 20-2 of the substrate 20 is the substrate surface opposite to the bottom surface 20-1 of the substrate 20. The first side surface 15A is a plate shaped member extending in the Z-axis negative direction from an edge of the top surface 15-1 on the side of the X-axis positive direction. The second side surface 15B is a plate shaped member extending in the Z-axis negative direction from an edge of the top surface 15-1 on the side of the X-axis negative direction. The third side surface 15C is a plate shaped member extending in the Z-axis negative direction from an edge of the top surface 15-1 on the side of the Y-axis negative direction. The fourth side surface 15D is a plate shaped member extending in the Z-axis negative direction from an edge of the top surface 15-1 on the side of the Y-axis positive direction. The shape of the case 15 in the plan view is a rectangular shape corresponding to the shape of the motor 200 in the plan view. A plurality of components of the absolute encoder 100-2 is accommodated in an interior space of the case 15.

As illustrated in FIG. 24, the case 15 includes the tab 15a, the tab 15b, a tab 15c, the hole 15d, a recess 15e, a recess 15f, a recess 15g, a connector case 15h, and an opening 15i. The tab 15a is provided near the end of the fourth side surface 15D in the Z-axis negative direction. The tab 15a extends in the Y-axis negative direction from the fourth side surface 15D so as to oppose the third side surface 15C. The tab 15a engages the recess 10aa provided in the main base 10 illustrated in FIG. 23. The tab 15b is provided near the end of the third side surface 15C in the Z-axis negative direction. The tab 15b extends in the Y-axis positive direction from the third side surface 15C so as to oppose the fourth side surface 15D. The tab 15b engages the recess 10ab provided in the main base 10 illustrated in FIG. 23. The tab 15c is provided near the end of the second side surface 15B in the Z-axis negative direction. The tab 15c extends in the X-axis negative direction from the second side surface 15B so as to oppose the first side surface 15A. The tab 15c engages the recess 10ac provided in the main base 10 illustrated in FIG. 23.

The recess 15e, the recess 15f, and the recess 15g illustrated in FIG. 24 are famed so that portions of the top surface 5-1 of the case 15 cave in toward the Z-axis positive direction, to avoid interference with the respective heads of the 3 substrate attaching screws 13 illustrated in FIG. 11.

The connector case 15h is formed so that a portion of the top surface 5-1 of the case 15 caves in toward the Z-axis positive direction, to cover the connector 24 illustrated in FIG. 11. A bottom surface of the connector case 15h has a rectangular shape in the plan view. The connector case 15h is provided in a region of the top surface 5-1, near the first side surface 15A than the center along the X-axis direction, and near the center along the Y-axis direction. In addition, the connector case 15h is provided in the region of the top surface 5-1, near the first side surface 15A.

The opening 15i is formed between the bottom surface of the connector case 15h and the first side surface 15A. The connector 24 illustrated in FIG. 11 is arranged so as to oppose the bottom surface of the connector case 15h. The connector 24 is a female connector, for example, and a male connector provided on one end of an external wiring is inserted into the connector 24. The male connector is inserted through the opening 15i illustrated in FIG. 24, into the connector 24 arranged on the connector case 15h. Accordingly, conductive terminals provided on the connector 24 are electrically connected to conductive terminals of the male connector provided on the one end of the external wiring. As a result, an external device connected to the other end of the external wiring, and the connector 24, are electrically connected, so that signals can be transmitted between the absolute encoder 100-2 and the external device.

Further, because the connector case 15h is provided at a position near the first side surface 15A, the position of the connector 24 in the plan view becomes the same as the position of the connector 400 in the plan view of the motor 200, as illustrated in FIG. 11. By configuring the absolute encoder 100-2 in this manner, the position where the external wiring, which is to be electrically connected to the conductive terminals provided on the connector 24, is drawn out, can be brought closer to the position where an external wiring, which is to be electrically connected to conductive pins provided on the connector 400, is drawn out. Accordingly, these external wires can be bundled into one near the absolute encoder 100-2 and the motor 200, to facilitate such a group of bundled wires to be routed to the external device.

As illustrated in FIG. 22, the magnetic sensor 40, the magnetic sensor 50, the microcomputer 21, the bidirectional driver 22, and the line driver 23 are provided on the bottom surface 20-1 of the substrate 20. The bottom surface 20-1 of the substrate 20 is the attaching surface on which the magnetic sensor 40 and the magnetic sensor 50 are attached. As described above, the top end surface 10r of the post 10q, the top end surface 10p of the post 10m, and the top end surface 10t of the post 10s make contact with the bottom surface 20-1 of the substrate 20. In addition, as illustrated in FIG. 13, the post 10q, the post 10m, and the post 10s are provided on the main base 10 so as to reduce the difference in the separation distances of one another in the plan view of the main base 10. For example, the post 10q is provided near the second side 302 in the vicinity of the center along the Y-axis direction of the main base 10. The post 10q is integral with the wall 80. The post 10m is provided near the corner where the first side 301 and the fourth side 304 intersect. The post 10s is provided near the third side 303 in the vicinity of the center along the X-axis direction of the main base 10. The post 10s is integral with the wall 70 and the substrate positioning pin 10g. By providing the post 10q, the post 10m, and the post 10s in this manner, it is possible to accurately restrict the positions of the magnetic sensor 40 and the magnetic sensor 50 provided on the substrate 20, respectively, along the Z-axis direction. When the post 10q, the post 10m, and the post 10s are formed at locations on the main base 10 as far as possible from one another in the X-Y plane direction, it is possible to more stably hold the position of the substrates 20.

In the absolute encoder 100-2 according to the embodiment 2, the main base 10 is formed by die casting. For this reason, it is possible to improve the positioning accuracy of each of the components, when compared to a case where the base portion 60 of the main base 10 is made by sheet metal work, for example, and the post 10q, the post 10m, the post 10s, the substrate positioning pin 10g, the substrate positioning pin 10j, the wall 70, the wall 80, or the like are made separately and then assembled. Further, because the number of parts at the time of manufacturing becomes small, the configuration of the absolute encoder 100-2 can be simplified, and the assembling can be facilitated to shorten the manufacturing time, thereby increasing the reliability of the absolute encoder 100-2.

The magnetic sensor 40 is an example of a spindle angle sensor. The magnetic sensor 40 is positioned directly above the permanent magnet 9 with a predetermined separation. The magnetic sensor 40 detects and determines the rotation angle of the corresponding spindle gear 1, by detecting the change in the magnetic flux generated from the permanent magnet 9 due to the rotation of the permanent magnet 9 which rotates together with the spindle gear 1, and outputs the angle information indicating the determined rotation angle, as the digital signal.

The magnetic sensor 50 is an example of an angle sensor. In addition, the layshaft gear 5 is a rotating body which rotates according to the rotation of the worm wheel portion 5a which is the second driven gear. The magnetic sensor 50 is positioned directly above the permanent magnet 8 with a predetermined separation. The magnetic sensor 50 detects and determines the rotation angle of the corresponding layshaft gear 5, by detecting the change in the magnetic flux generated from the permanent magnet 8 due to the rotation of the permanent magnet 8 which rotates together with the layshaft gear 5, and outputs the angle information indicating the determined rotation angle, as the digital signal.

Each of the magnetic sensor 40 and the magnetic sensor 50 includes a sensing element which senses the change in the magnetic flux, and a computing circuit which outputs the digital signal indicating the rotation angle based on the output of the sensing element. The sensing element may be a combination of a plurality of magnetic field sensing elements, such as Hall elements, GMR (Giant Magneto Resistive) elements, or the like, for example. The number of magnetic field sensing elements is 4, for example.

When the number of teeth of the worm gear portion 1d of the spindle gear 1 is 4, and the number of teeth of the worm wheel portion 2a of the intermediate gear 2 is 20, the reduction gear ratio is 5. In other words, when the spindle gear 1 makes 5 revolutions, the intermediate gear 2 makes 1 revolution. Moreover, when the number of teeth of the worm gear portion 2b of the intermediate gear 2 is 1, and the number of teeth of the worm wheel portion 5a of the layshaft gear 5 is 18, the reduction gear ratio is 18. In other words, when the intermediate gear 2 makes 18 revolutions, the layshaft gear 5 makes 1 revolution. Accordingly, when the spindle gear 1 makes 90 revolutions, the intermediate gear 2 makes 90÷5=18 revolutions, and the layshaft gear 5 makes 18÷18=1 revolution.

The spindle gear 1 and the layshaft gear 5 are provided with the permanent magnet 9 and the permanent magnet 8 which rotate unitarily therewith, respectively. For this reason, the rotation quantity of the motor shaft 201 can be determined when the corresponding magnetic sensor 40 and the magnetic sensor 50 detect the rotation angles of the spindle gear 1 and the layshaft gear 5, respectively. When the spindle gear 1 makes 1 revolution, the layshaft gear 5 makes 1/90 revolution, that is, rotates by 4°. Hence, when the rotation angle of the layshaft gear 5 is less than 4°, the rotation quantity of the spindle gear 1 is less than 1 revolution, and when the rotation angle of the layshaft gear 5 is more than 4° or more and less than 8° degrees, the rotation quantity of the spindle gear 1 is 1 revolution or more and less than 2 revolutions. As described above, in the absolute encoder 100-2, the rotation speed of the spindle gear 1 can be determined according to the rotation angle of the layshaft gear 5. In particular, the absolute encoder 100-2 can utilize the reduction gear ratio of the worm gear portion 1d and the worm wheel portion 2a, and the reduction gear ratio of the worm gear portion 2b and the worm wheel portion 5a, to determine the rotation speed of the spindle gear 1 even if the rotation speed of the spindle gear 1 amounts to a plurality of revolutions.

The microcomputer 21, the bidirectional driver 22, the line driver 23, and the connector 24 are attached to the substrate 20. The microcomputer 21, the bidirectional driver 22, the line driver 23, and the connector 24 are electrically connected by interconnect patterns on the substrate 20.

The microcomputer 21 is configured by a Central Processing Unit (CPU), acquires the digital signals indicating the rotation angles output from the magnetic sensor 40 and the magnetic sensor 50, respectively, and computes the rotation quantity of the spindle gear 1.

The bidirectional driver 22 performs bidirectional communication with the external device which is connected to the connector 24. The bidirectional driver 22 converts data, such as an operation signal, into a differential signal, and communicates with the external device. The line driver 23 converts the data indicating the rotation quantity into a differential signal, and outputs the differential signal in real time to the external device which is connected to the connector 24. The connector 24 is connected to the connector of the external device.

Figure 30:
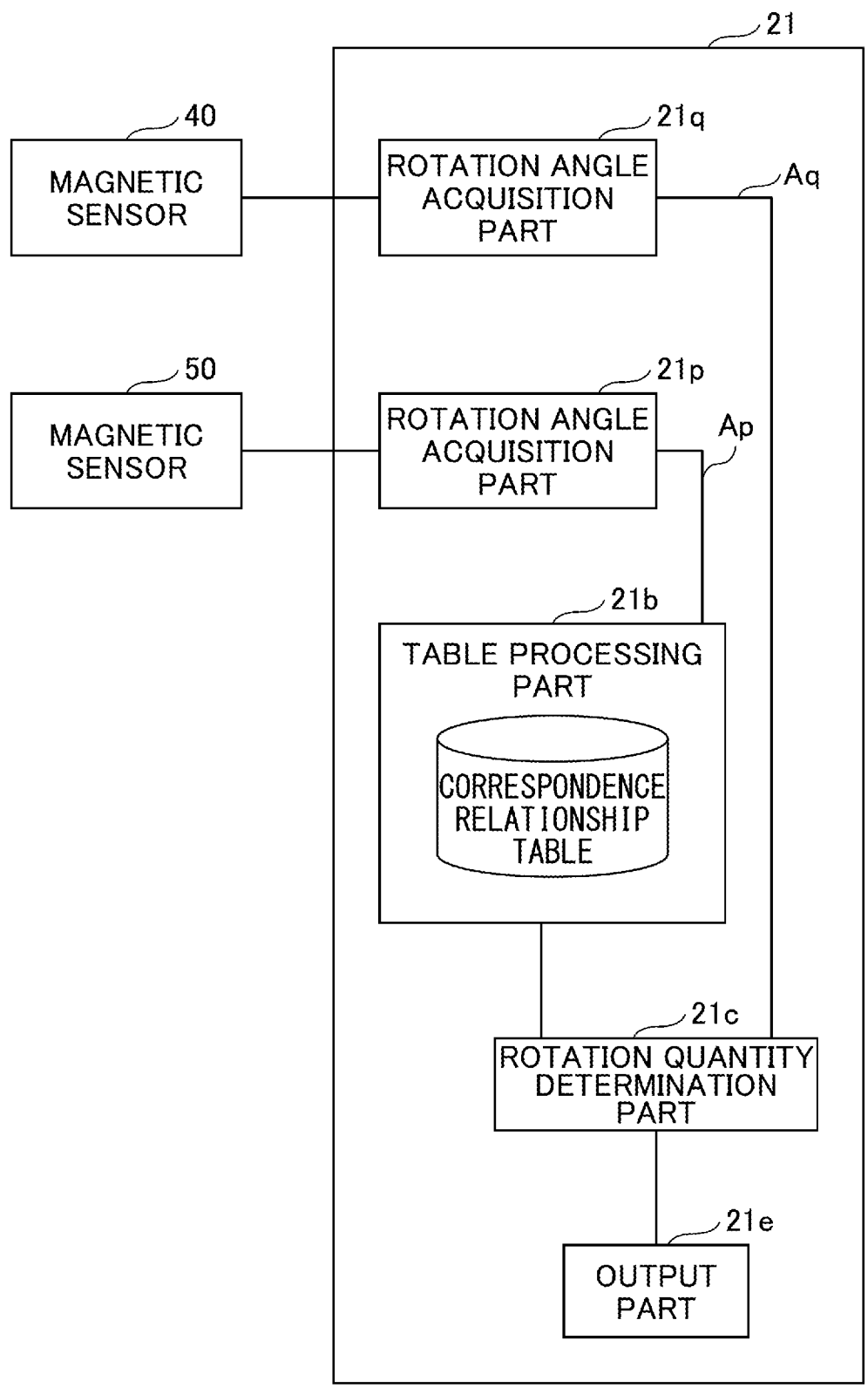
FIG. 30 is a diagram illustrating a functional configuration of a microcomputer 21 provided in the absolute encoder 100-2 according to the embodiment 2 of the present invention.

FIG. 30 is a diagram illustrating a functional configuration of the microcomputer 21 provided by the absolute encoder 100-2 according to the embodiment 2 of the present invention. Each block of the microcomputer 21 illustrated in FIG. 30 represents a function (facility) which is achieved when the CPU forming the microcomputer 21 executes a program.

The microcomputer 21 includes a rotation angle acquisition part 21p, a rotation angle acquisition part 21q, a table processing part 21b, a rotation quantity determination part 21c, and an output part 21e. The rotation angle acquisition part 21q acquires the rotation angle Aq of the spindle gear 1, based on the signal output from the magnetic sensor 40. The rotation angle Aq is the angle information indicating the rotation angle of the spindle gear 1. The rotation angle acquisition part 21p acquires the rotation angle Ap of the layshaft gear 5, based on the signal output from the magnetic sensor 50. The rotation angle Ap is the angle information indicating the rotation angle of the layshaft gear 5. The table processing part 21b determines the rotation speed of the spindle gear 1 corresponding to the acquired rotation angle Ap, by referring to a correspondence relationship table which stores the rotation angle Ap and the rotation speed of the spindle gear 1 corresponding to the rotation angle Ap. The rotation quantity determination part 21c determines a rotation quantity over multiple revolutions of the spindle gear 1, according to the rotation speed of the spindle gear 1 determined by the table processing part 21b, and the acquired rotation angle Aq. The output part 21e converts the rotation quantity over the multiple revolutions of the spindle gear 1 determined by the rotation quantity determination part 21c into information indicating the rotation quantity, and outputs the converted information.

As described above, in the absolute encoder 100-2 according to the embodiment 2, because the layshaft gear 5 is provided on the side of the intermediate gear 2 opposite to the spindle gear 1, as illustrated in FIG. 14 or the like, the generation of magnetic interference which affects the magnetic sensor not corresponding to each of the permanent magnet 8 and the permanent magnet 9 can be reduced. Thus, the size of the absolute encoder 100-2 in the plan view can be made relatively small, by employing the configuration which can reduce the generation of the magnetic interference. Accordingly, it is possible to prevent the detection accuracy of the magnetic flux by the magnetic sensor 40 and the magnetic sensor 50 from deteriorating, while reducing the size of the absolute encoder 100-2.

Moreover, in the absolute encoder 100-2 according to the embodiment 2, the intermediate gear 2 arranged parallel to the top surface of the main base 10 extends obliquely with respect to the four sides of the main base 10, and further, the spindle gear 1 and the layshaft gear 5 are respectively provided on the opposite side with respect to the intermediate gear 2. Thus, of the entire region of the top surface of the main base 10, the spindle gear 1, the intermediate gear 2, and the layshaft gear 5 can be arranged in a small portion, thereby reducing the size of the absolute encoder 100-2 with respect to the horizontal direction.

In addition, in the absolute encoder 100-2 according to the embodiment 2, the outer diameter of the worm wheel portion 2a and the outer diameter of the worm gear portion 2b are set to a small value within a range possible. Hence, the size of the absolute encoder 100-2 in the Z-axis direction (height direction) can be made small.

As described above, according to the absolute encoder 100-2 of the embodiment 2, it is possible to obtain an effect in that the size in the Z-axis direction and the size in the direction perpendicular to the Z-axis direction can be reduced, while preventing the detection accuracy of the rotation quantity of the spindle gear 1 from deteriorating.

Further, in the absolute encoder 100-2 according to the embodiment 2, although the intermediate gear 2 is supported, that is, rotatably supported, by the shaft 4 which is fixed or inserted to the wall 80 and the wall section 72, the supporting method of the intermediate gear 2 is not limited thereto as long as the intermediate gear 2 can be rotatably supported.

For example, the absolute encoder 100-2 is configured so that the one end 4a of the shaft 4 is inserted into the hole 10a formed in the wall section 72, and the other end 4b of the shaft 4 is press fit into the hole 10b formed in the wall 80. The absolute encoder 100-2 may be configured so that the outer ring 3a of the bearing 3 is press fit to the press-fitting portion 2d formed on the intermediate gear 2, and the shaft 4 is press fit to the inner ring 3b of the bearing 3. In this case, it is possible to restrict the movement of the intermediate gear 2, which is fixed to the shaft 4, in the axial direction Td. Even when the absolute encoder 100-2 is configured as described above, the intermediate gear 2 is rotatably supported on the shaft 4. Furthermore, the wall section 72 and wall 80 restrict the movement of the shaft 4 in the axial direction Td, and the inner ring 3b of the bearing 3 which is fixed to the shaft 4 restricts the movement of the intermediate gear 2 in the axial direction. Accordingly, the leaf spring 11 may be omitted.

Alternatively, the absolute encoder 100-2 may be configured so that the shaft 4 is rotatably supported by a bearing, which is not illustrated and is provided on at least one of the wall section 72 and the wall 80, for example, in a state in which the intermediate gear 2 is fixed to the shaft 4, without using the bearing 3 illustrated in FIG. 15.

When an outer ring of the bearing, which is not illustrated, is fixed to the wall section 72 or the wall 80, and the one end 4a or the other end 4b of the shaft 4 is inserted into an inner ring, the shaft 4 can rotate unitarily with the intermediate gear 2, because the intermediate gear 2 is fixed to the shaft 4 and the shaft 4 is rotatably supported on the bearing which is not illustrated. In this case, the shaft 4 is not fixed to the inner ring of the bearing, and merely inserted into the inner ring, so that the shaft 4 can move in the axial direction Td together with the intermediate gear 2. For this reason, the leaf spring 11, which restricts the position of the intermediate gear 2 by urging the intermediate gear 2 in the axial direction Td, is required.

Alternatively, the outer ring of the bearing, which is not illustrated, may be fixed to the wall section 72 or the wall 80, and the one end 4a or the other end 4b of the shaft 4 may be press fit into the inner ring, which is not illustrated. In this state, the movement of the intermediate gear 2 fixed to the shaft 4 in the axial direction Td is restricted. For this reason, not only is the intermediate gear 2 fixed to the shaft 4 rotatably supported by the bearing, which is not illustrated, but the movement of the shaft 4 in the axial direction Td is also restricted, thereby restricting the movement of the intermediate gear 2 in the axial direction Td. Accordingly, the leaf spring 11 may be omitted.

As illustrated in FIG. 17, the magnetic sensor 40 originally detects the change in the magnetic flux from the permanent magnet 9 which rotates together with the spindle gear 1, and to detect and determine the rotation angle of the spindle gear 1. In addition, as illustrated in FIG. 18, the magnetic sensor 50 detects the change in the magnetic flux from the permanent magnet 8 which rotates together with the layshaft gear 5, to detect and determine the rotation angle of the layshaft gear 5. The absolute encoder 100-2 according to the embodiment 2 can reduce the effects of the magnetic flux from the permanent magnet 8 on the magnetic sensor 40, by employing the configuration which can reduce the generation of the magnetic interference as described above. Moreover, the effects of the magnetic flux from the permanent magnet 9 on the magnetic sensor 50 can be reduced. In other words, it is possible to prevent the deterioration of the rotation accuracy caused by the mutual magnetic interference between the spindle gear 1 and the layshaft gear 5.

FIG. 10 illustrates the absolute encoder 100-2 in the state attached to the motor 200, but the motor 200 includes a permanent magnet and a driving coil therein. Accordingly, the motor 200 generates the magnetic flux even when the motor shaft 201 is not rotating. Further, when an external driving signal is applied to the motor 200 to rotate the motor shaft 201, the generated magnetic flux increases further. The magnetic flux generated from the motor 200 may adversely affect the magnetic sensor 40 and the magnetic sensor 50 provided inside the absolute encoder 100-2, thereby deteriorating the detection accuracy. When affected by such an unwanted magnetic flux from the motor 200, the main base 10 may be configured using a ferromagnetic material, such as iron or the like, so as to reduce the effects of the magnetic flux from the motor 200.

The spindle gear 1 illustrated in FIG. 17 is a cylindrical member including the first cylindrical portion 1a to which the motor shaft 201 is press fit, and the second cylindrical portion 1b to which the permanent magnet 9 is press fit, which are integrally molded. However, the spindle gear 1 may be configured as follows. An axial misalignment occurs when, in the plan view of the permanent magnet 9, the center along the radial direction of the permanent magnet 9 is separated from a predetermined position (for example, a center of a magnetic flux detection region) of the magnetic sensor 40 corresponding to the permanent magnet 9, in a direction perpendicular to the Z-axis direction.

Figure 31:
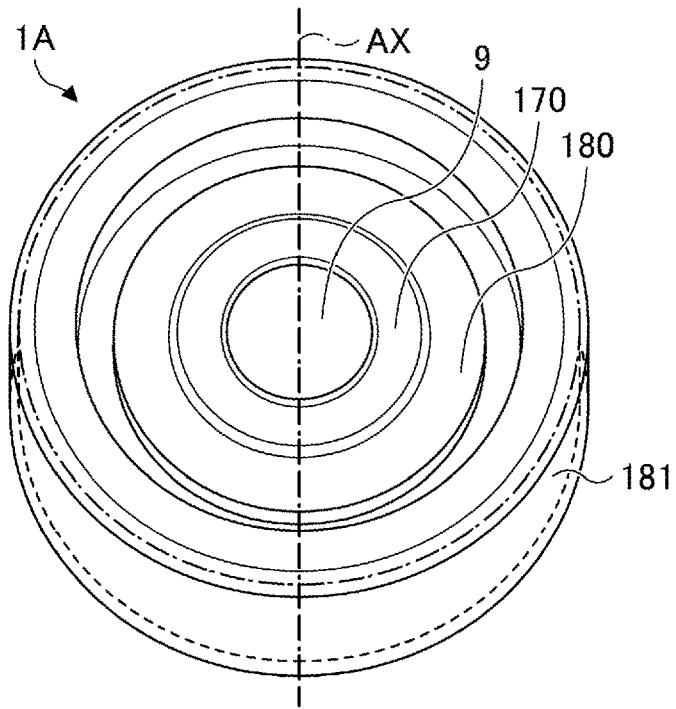
FIG. 31 is a perspective view of a spindle gear 1A provided in the absolute encoder 100-2 according to a first modification of the embodiment 2.
Figure 32:
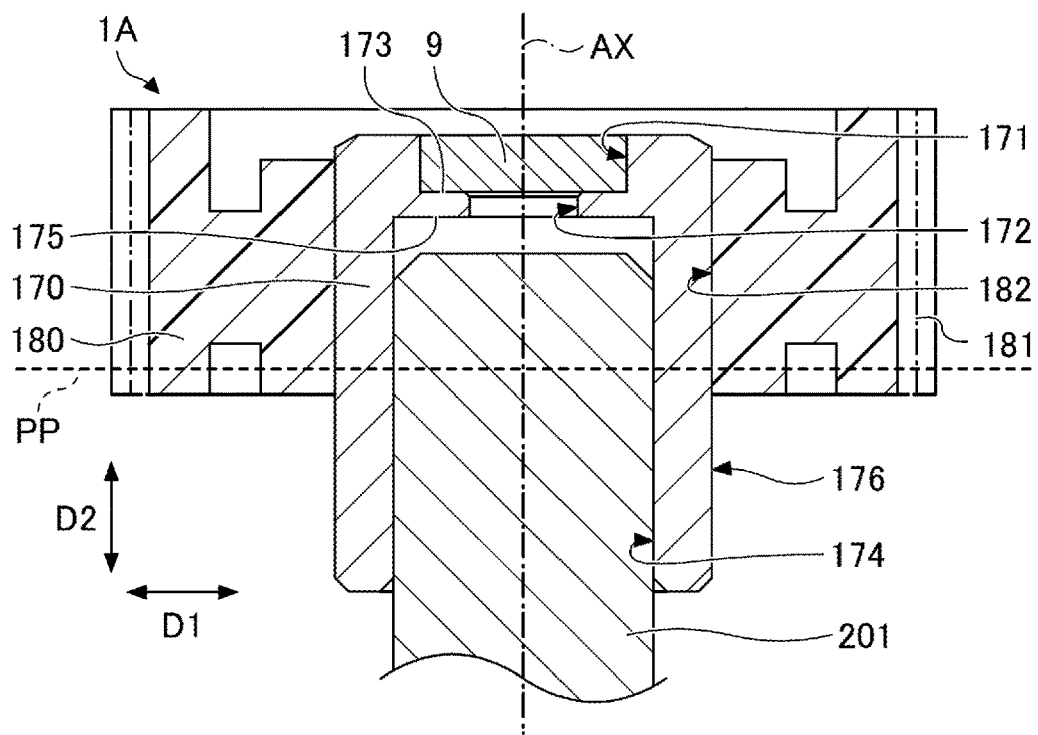
FIG. 32 is a cross sectional view of the spindle gear 1A illustrated in FIG. 31.

FIG. 31 is a perspective view of the spindle gear 1A provided in the absolute encoder 100-2 according to a first modification of the embodiment 2. FIG. 32 is a cross sectional view of the spindle gear 1A illustrated in FIG. 31. The spindle gear 1A is a gear, which is provided coaxially with the motor shaft 201, and fixed to the motor shaft 201. The spindle gear 1A includes a magnet holder 170, and a resin gear portion 180.

The magnet holder 170 is a cylindrical member formed of a non-magnetic metallic material, such as copper, aluminum, brass, or the like. The magnet holder 170 is a cylindrical portion, which is provided coaxially with the motor shaft 201, and is press fit onto the tip end of the motor shaft 201. The magnet holder 170 includes a first inner peripheral surface 171 having a first inner diameter, opposing the outer peripheral surface of the permanent magnet 9, a second inner peripheral surface 172 having a second inner diameter smaller than the first inner diameter, and a first stepped portion 173.

The first inner diameter of the first inner peripheral surface 171 is slightly larger than the outer diameter of the permanent magnet 9. The term "slight" means that when the permanent magnet 9 is attached in the space surrounded by the first inner peripheral surface 171, it is unnecessary to force the permanent magnet 9 into the space, and an angle error of the magnetic sensor 40 with respect to a change in the axial misalignment becomes less than or equal to a prescribed value. The angle error is equal to an angular difference between the actual rotation angle of the spindle gear LA, and the rotation angle detected by the magnetic sensor 40. Because it is unnecessary to force the permanent magnet 9 into the space, the work to attach the permanent magnet 9 to the spindle gear LA is facilitated, and cracking caused by press fitting of the permanent magnet 9 into the spindle gear 1A can be reduced.

Even when the configuration described above is employed, an adhesive can easily adhere to the metallic magnet holder 170. Hence, by providing the adhesive between the permanent magnet 9 and the first inner peripheral surface 171 of the magnet holder 170, an adhesive strength of the permanent magnet 9 with respect to the magnet holder 170 can be secured. Accordingly, because the adhesive functions as a holding member for the permanent magnet 9, it is possible to prevent the permanent magnet 9 from falling off the spindle gear 1A during the operation of the absolute encoder 100-2.

The second inner peripheral surface 172 defines an opening between the permanent magnet 9 and the motor shaft 201. An end surface of the permanent magnet 9 in the axial direction makes contact with the first stepped portion 173 provided at a boundary between the second inner peripheral surface 172 and the first inner peripheral surface 171. The axial direction is indicated by an arrow D2 in FIG. 32, which is the same as the axial direction of the motor shaft 201.

The magnet holder 170 further includes a third inner peripheral surface 174, opposing the outer peripheral surface of the motor shaft 201 and having a third inner diameter larger than the second inner diameter, and a second stepped portion 175 provided at a boundary between the second inner peripheral surface 172 and the third inner peripheral surface 174. The third inner diameter of the third inner peripheral surface 174 is smaller than the outer diameter of the motor shaft 201, because the motor shaft 201 is press fit into a space surrounded by the third inner peripheral surface 174.

The resin gear portion 180 is a member formed into an annular shape from a polyacetal resin, for example. The resin gear portion 180 is provided coaxially with the motor 200 and adjacent to the magnet holder 170. The resin gear portion 180 is an annular portion having an the inner peripheral surface opposing the outer peripheral surface 176 of the magnet holder 170, and a worm gear portion 181 provided on an outer side in the radial direction. The resin gear portion 180 includes an inner peripheral surface 182 opposing the outer peripheral surface 176 of the magnet holder 170, and the worm gear portion 181 provided on the outer side of the resin gear portion 180 in the radial direction. The worm gear portion 181 corresponds to the worm gear portion 1d illustrated in FIG. 17 or the like. An inner diameter of the inner peripheral surface 182 of the resin gear portion 180 is slightly smaller than an outer diameter of the outer peripheral surface 176 of the magnet holder 170. The term "slight" refers to a value which enables the magnet holder 170 to be press fit into a space surrounded by the inner peripheral surface 182 of the resin gear portion 180.

When the spindle gear 1A is attached to the motor shaft 201, the motor shaft 201 is first press fit into the space surrounded by the third inner peripheral surface 174 of the magnet holder 170. As a result, the magnet holder 170 is fixed to the motor shaft 201 in a state in which no gap is formed between the magnet holder 170 and the motor shaft 201.

Next, the resin gear portion 180 is press fit onto the outer peripheral surface 176 of the magnet holder 170. In this state, when the resin gear portion 180 is forced in the axial direction until the entire inner peripheral surface 182 of the resin gear portion 180 makes contact with the outer peripheral surface 176 of the magnet holder 170, the resin gear portion 180 is more firmly fixed with respect to the magnet holder 170.

In the spindle gear 1A having the configuration described above, the resin gear portion 180, which is manufactured separately from the magnet holder 170, is press fit onto the outer peripheral surface 176 of the magnet holder 170. When a contact portion of the magnet holder 170 with respect to the motor shaft 201, the resin gear portion 180, and the worms gear portion 181 are arranged so as to overlap one another in the radial direction of the spindle gear 1A, as illustrated by a symbol "PP" in FIG. 32, resin gear portion 180 is more firmly fixed with respect to the magnet holder 170. The radial direction is indicate by an arrow D1 in FIG. 32.

Accordingly, the permanent magnet 9 and the spindle gear 1A can be positively fixed to the motor shaft 201, a rotation angle irregularity from the spindle gear 1A to the intermediate gear 2 can be reduced, and clogging of the gear teeth between the spindle gear 1A and the intermediate gear 2 can be reduced. Further, by forming the magnet holder 170 of a non-magnetic metallic material, the holder of the permanent magnet 9 can be formed with a higher accuracy compared to a resin molded product, and it is possible to secure the positioning accuracy of the center axes of the motor shaft 201, the worm gear portion 181, and the permanent magnet 9.

Figure 33:
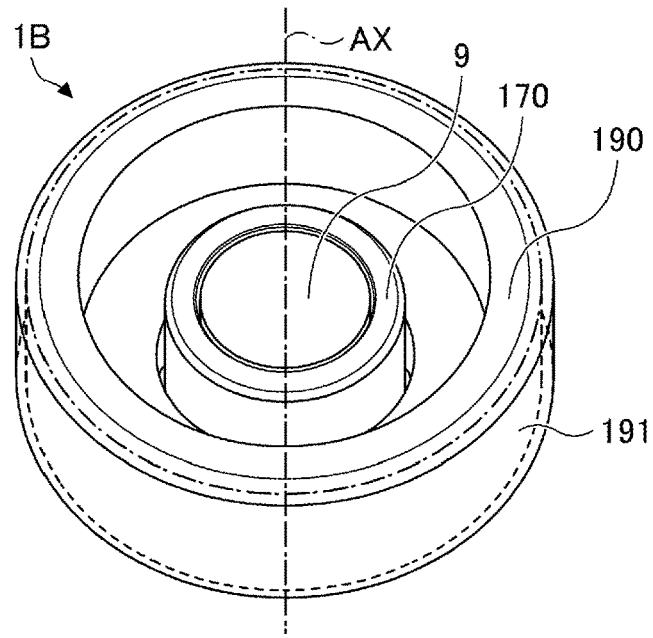
FIG. 33 is a perspective view of a spindle gear 1B provided in the absolute encoder 100-2 according to a second modification of the embodiment 2.
Figure 34:
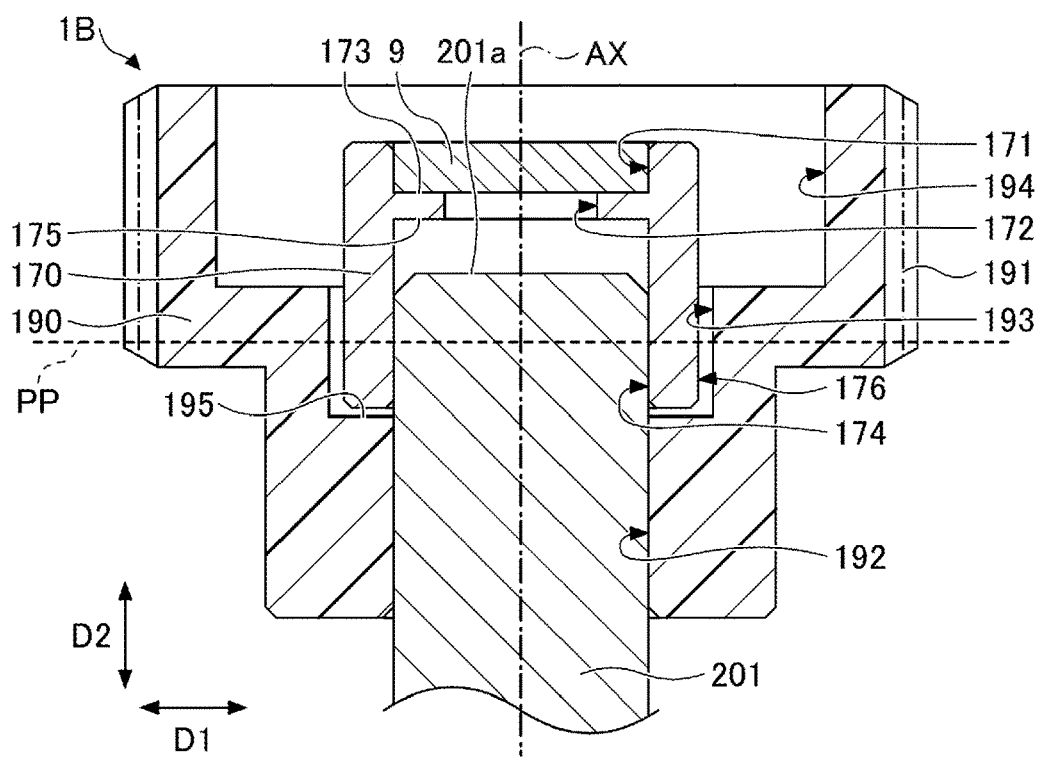
FIG. 34 is a cross sectional view of the spindle gear 1B illustrated in FIG. 33.

FIG. 33 is a perspective view of a spindle gear 1B provided in the absolute encoder 100-2 according to a second modification of the embodiment 2. FIG. 34 is a cross sectional view of the spindle gear 1B illustrated in FIG. 33. The spindle gear 1B is a first driving gear, which is provided coaxially with the motor shaft 201, and fixed to the motor shaft 201. The spindle gear 1B includes the magnet holder 170, and a resin gear portion 190. The difference between the spindle gear 1B and the spindle gear 1A illustrated in FIG. 32 is that the size of the magnet holder 170 in the axial direction is short in the spindle gear 1B, and the motor shaft 201 is press fit not only into the magnet holder 170 but also into the resin gear portion 190.

The resin gear portion 190 is provided coaxially with the motor shaft 201, and adjacent to the magnet holder 170. The resin gear portion 190 is an annular portion having an inner peripheral surface opposing the outer peripheral surface 176 of the magnet holder 170, and a worm gear portion 191 provided on an outer side in the radial direction. The resin gear portion 190 includes a first inner peripheral surface 192, having a first inner diameter and making contact with the outer peripheral surface of the motor shaft 201, and a second inner peripheral surface 193, having a second inner diameter larger than the first inner diameter and opposing the outer peripheral surface 176 of the magnet holder 170.

The resin gear portion 190 further includes a third inner peripheral surface 194, having a third inner diameter larger than the second inner diameter and opposing the outer peripheral surface 176 of the magnet holder 170, and the worm gear portion 191 provided on an outer side of the resin gear portion 190 in the radial direction. The worm gear portion 191 corresponds to the worm gear portion 1d illustrated in FIG. 17 or the like.

The first inner peripheral surface 192, the second inner peripheral surface 193, and the third inner peripheral surface 194 are arranged in the order of the first inner peripheral surface 192, the second inner peripheral surface 193, and the third inner peripheral surface 194 in a direction from the motor shaft 201 toward the permanent magnet 9.

The first inner diameter of the first inner peripheral surface 192 of the resin gear portion 190 is smaller than the outer diameter of the outer peripheral surface of the motor shaft 201, because resin gear portion 190 is press fit onto the motor shaft 201. In addition, the second inner diameter of the second inner peripheral surface 193 of the resin gear portion 190 is smaller than the outer diameter of the outer peripheral surface 176, so as not to make contact with the outer peripheral surface 176, because the assembling would become difficult if the second inner peripheral surface 193 were to make contact with the outer peripheral surface 176 of the magnet holder 170.

When the spindle gear 1B is attached to the motor shaft 201, the motor shaft 201 is first press fit into a space surrounded by the first inner peripheral surface 192 of the resin gear portion 190. In this state, the motor shaft 201 forced in so that a tip end 201a thereof is arranged above a stepped portion 195 which is provided at a boundary portion between the first inner peripheral surface 192 and the second inner peripheral surface 193. Hence, the resin gear portion 190 is firmly fixed with respect to the motor shaft 201.

Further, the magnet holder 170 can be attached to the outer peripheral surface of the motor shaft 201 near the tip end 201a.

Next, the magnet holder 170 is press fit onto the outer peripheral surface of the motor shaft 201 near the tip end 201a. Hence, the resin gear portion 190 is firmly fixed with respect to the motor shaft 201.

Accordingly, in the spindle gear 1B illustrated in FIG. 34, each of the separately manufactured magnet holder 170 and the resin gear portion 190 is press fit onto the outer peripheral surface of the motor shaft 201. For this reason, the positioning accuracy of the spindle gear 1B is unaffected by the dimensional accuracy of the magnet holder 170, and the effects of the dimensional accuracy of the spindle gear 1B will not be superimposed on this positioning accuracy. Thus, the amount of axial misalignment of the magnet holder 170 is not superimposed on the amount of axial misalignment of the worm gear portion 191, and the generation of the rotation angle irregularity caused by accumulation of the misalignments, that is, accumulated error, is reduced, thereby reducing the generation of the clogging of the gear teeth between the spindle gear 1B and the intermediate gear 2 caused by the accumulated error.

Further, in the spindle gear 1B illustrated in FIG. 34, the metallic magnet holder 170 is used, similar to the spindle gear 1A, and the adhesive easily adheres to the magnet holder 170. Because this adhesive functions as the holding member for the permanent magnet 9, it is possible to prevent the permanent magnet 9 from falling off the spindle gear 1B during operation of the absolute encoder 100-2.

When the magnet holder 170 is a resin molded product, the profile irregularity of the first inner peripheral surface 171 tends to deteriorate compared to the metallic magnet holder 170. Because the metallic magnet holder 170 is used in the spindle gear 1A according to the first modification and the spindle gear 1B according to the second modification, the deterioration of the profile irregularity of each first inner peripheral surface 171 can be reduced, and it is possible to reduce an increase in the amount of axial misalignment of the center axis of the permanent magnet 9 attached to the first inner peripheral surface 171 with respect to the center axis of the motor shaft 201.

Accordingly, a degree of deviation with respect to the center axis of the worm gear portion 191 becomes smaller than a degree of deviation h with respect to the center axis of the worm gear portion 1d illustrated in FIG. 17. As a result, the rotation angle irregularity from the spindle gear 1B to the intermediate gear 2 is reduced, and further, the clogging of the gear teeth between the spindle gear 1B and the intermediate gear 2 is reduced. In addition, by forming the magnet holder 170 from the non-magnetic metallic material, the holding portion of the permanent magnet 9 can be formed with a higher accuracy compared to the resin molded product, thereby securing the positioning accuracy of the center axes of the motor shaft 201, the worm gear portion 191, and the permanent magnet 9.

In the spindle gear 1B illustrated in FIG. 34, a contact portion of the magnet holder 170 to the motor shaft 201, the resin gear portion 190, and the worm gear portion 191 are arranged so that as to overlap one another in the radial direction of the spindle gear 1B, as indicated by a symbol "PP" in FIG. 34. However, the spindle gear 1B may be a disk shaped member. Specifically, this disk shaped member is not provided with the second inner peripheral surface 193 and the third inner peripheral surface 194 illustrated in FIG. 34, and may be arranged so that the first inner peripheral surface 192 and the worm gear portion 191 are included in a plane parallel to the radial direction of the spindle gear 1B, for example. The disk shaped member may be provided below the tip end of the magnet holder 170 in the axial direction. In other words, even when the magnet holder 170 is not arranged inside the resin gear portion 190 as illustrated in FIG. 34, and the resin gear portion 190 and the magnet holder 170 are arranged side by side in the axial direction, each of the separately manufactured magnet holder 170 and the resin gear portion 190 is press fit onto the outer peripheral surface of the motor shaft 201, and thus, the accumulation of the error described above is not generated. Accordingly, the generation of the rotation angle irregularity caused by the accumulation of error is reduced, and further, the generation of the clogging of the gear teeth between the spindle gear 1B and the intermediate gear 2, caused by the accumulation of error, is reduced. Moreover, by utilizing the spindle gear 1B having the configuration described above, the configuration of the resin gear portion 190 can be simplified, and the manufacturing time of the resin gear portion 190 can be reduced.

The spindle gear 1 of the absolute encoder 100-1 according to the embodiment 1 may be configured in the same manner as the spindle gear 1A of the first modification or the spindle gear 1B of the second modification of the embodiment 2. By configuring the absolute encoder 100-1 in this manner, the same effects as the first modification or the second modification can be obtained.

FIG. 35 is a diagram illustrating the permanent magnet 9A applicable to the absolute encoders 100-1 and 100-2 of the respective embodiments 1 and 2. FIG. 36 is a diagram illustrating a permanent magnet 9B applicable to the absolute encoders 100-1 and 100-2 of the respective embodiments 1 and 2. FIG. 35 illustrates the permanent magnet 9A according to a first configuration example. In the permanent magnet 9A, a first pole N having a first polarity, and a second pole S having a second polarity different from the first polarity, are arranged in the radial direction D1 of the permanent magnet 9A. FIG. 36 illustrates the permanent magnet 9B according to a second configuration example. In the permanent magnet 9B, the first pole N and the second pole S are arranged in the axial direction D2 on a left half of FIG. 36 bounded by the center of the permanent magnet 9B, while the first pole N and the second pole S are arranged in the axial direction D2 on a right half of FIG. 36 on the side opposite to the left half. An arrow "DM" illustrated in FIG. 35 and FIG. 36 indicates a magnetization direction.

Both the permanent magnet 9A and the permanent magnet 9B may be used as the permanent magnet 9 of the absolute encoders 100-1 and 100-2 of the respective embodiments 1 and 2. However, in the permanent magnet 9B, the magnetic field formed by the plurality of magnetic field lines has a distribution spread in the axial direction D2 compared to the magnetic field generated by the permanent magnet 9A. In contrast, in the permanent magnet 9A, the magnetic field formed by the plurality of magnetic field lines has a distribution spread in the radial direction D1 compared to the magnetic field generated by the permanent magnet 9B. For this reason, when the permanent magnet 9A is used in the absolute encoders 100-1 and 100-2 of the respective embodiments 1 and 2, the generated magnetic field which spreads to the outer side in the radial direction of the permanent magnet 9A more easily generates the magnetic interference in which the magnetic flux affects the other magnetic sensors described above.

In the absolute encoders 100-1 and 100-2 according to each of the modifications of the embodiments 1 and 2, when the permanent magnet 9B is used as the permanent magnet 9, the leakage magnetic flux generated from the permanent magnet 9 is less likely to flow toward the magnetic sensor 50 compared to when the permanent magnet 9A is used. In addition, when the permanent magnet 9B is used as the permanent magnet 8, the leakage magnetic flux from the permanent magnet 8 is less likely to flow toward the magnetic sensor 40 compared to when the permanent magnet 9A is used. As a result, it is possible to reduce the deterioration of the detection accuracy of the rotation angle or the rotation quantity of the layshaft gear 5 or the spindle gear 1. Further, the size of the absolute encoders 100-1 and 100-2 can further be reduced, because it is possible to reduce the deterioration of the detection accuracy of the rotation angle or the rotation quantity.

The absolute encoder 100-1 according to the embodiment 1 is configured so that the center axes of the permanent magnet 8 and the magnet holder 6 coincide with each other, similar to the permanent magnet 8 and the magnet holder 6 illustrated in FIG. 26. The absolute encoder 100-1 according to the embodiment 1 is also configured so that the center axes of the permanent magnet 17 and the second layshaft gears 138 coincide with each other, similar to the permanent magnet 8 and the magnet holder 6 illustrated in FIG. 26. Further, the absolute encoder 100-1 according to the embodiment 1 is configured so that the center axes of the permanent magnet 9 and the spindle gear 1 coincide with each other, similar to the permanent magnet 9 and the spindle gear 1 illustrated in FIG. 27. With this configuration, the absolute encoder 100-1 according to the embodiment 1 can detect the rotation angle or the rotation quantity with higher accuracy.

The configurations illustrated in the above described embodiments are examples of the contents of the present invention, and combinations with other known art, or parts of the configuration may be omitted or modified without departing from the scope of the present invention.

This application is based upon and claims priority to Japanese Patent Application No. 2019-064970, filed Mar. 28, 2019, and the entire contents of which are incorporated herein by reference.

DESCRIPTION OF THE REFERENCE NUMERALS 1 spindle gear, 1A spindle gear, 1B spindle gear, 1a first cylindrical portion, 1b second cylindrical portion, 1c communicating portion, 1d worm gear portion, 1e bottom surface, if press-fitting portion, 1g bottom surface, 1h magnet holding portion, 2 intermediate gear, 2a worm wheel portion, 2b worm gear portion, 2c bearing portion, 2d press-fitting portion, 2e sliding portion, 2f bottom surface, 2g through hole, 3 bearing, 3a outer ring, 3b inner ring, 3c side surface, 3d side surface, 4 shaft, 4a one end, 4b other end, 5 layshaft gear, 5-1 top surface, 5a worm wheel portion, 5b through hole, 6 magnet holder, 6a magnet holding portion, 6b shaft, 6c head, 7 bearing, 7a outer ring, 7b inner ring 8 permanent magnet, 8a surface, 9 permanent magnet, 9A permanent magnet, 9a top surface, 9b bottom surface, 10-1 opening, 10-2 bottom surface, 10a hole, 10aa recess, 10ab recess, 10ac recess, 10ad attaching surface, 10ae threaded hole, 10b hole, 10c contact surface, 10d bearing holder portion, 10da lower portion, 10db upper portion, 10dc inner peripheral surface, 10e leaf spring attaching surface, 10f threaded hole, 10g substrate positioning pin, 10g1 base portion, 10h tip end, 10i stepped portion, 10j substrate positioning pin, 10j1 base portion, 10k tip end, 101 stepped portion, 10m post, 10p top end surface, 10q post, 10s top end surface, 10s post, 10t top end surface, 10u threaded hole, 10v threaded hole, 10w threaded hole, 11 leaf spring, 11a sliding portion, 11b attaching portion, 11c hole, lid base portion, 12 screw, 13 screw, 14 screw, 15-1 top surface, 15A first side surface, 15B second side surface, 15C third side surface, 15D fourth side surface, 15a tab, 15b tab, 15c tab, 15d hole, 15e recess, 15f recess, 15g recess, 15h connector case, 15i opening, 16 attaching screw, 17 permanent magnet, 20 substrate, 20-1 bottom surface, 20-2 top surface, 20a positioning hole, 20b positioning hole, 20c hole, 20e hole, 21 microcomputer, 21b table processing part, 21c rotation quantity determination part, 21e output part, 21p rotation angle acquisition part, 21q rotation angle acquisition part, 22 bidirectional driver, 23 line driver, 24 connector, 24 connector, 40 magnetic sensor, 40a surface, 50 magnetic sensor, 50a surface, 60 base portion, 70 wall, 71 wall section, 72 wall section, 73 side surface, 80 wall, 90 magnetic sensor, 100-1 absolute encoder, 100-2 absolute encoder, 101 spindle gear, 101a first cylindrical portion, 101b disk portion, 101c worm gear, 101d magnet holding portion, 102 first intermediate gear, 102a worm wheel, 102b first worm gear, 102c base, 102d first cylinder, 102e second cylinder, 102f third cylinder, 102g hemispherical projection, 102h second worm gear, 102i sliding portion, 104 shaft, 105 first layshaft gear, 105a worm wheel portion, 105b bearing portion, 105c disk portion, 105d holder, 106 shaft, 107 retaining ring, 108 snap ring, 110 main base, 110a base portion, 110b support portion, 110c support portion, 110c leaf spring, 111a sliding part, 111b attaching part, 115 case, 115a outer wall section, 115b outer wall section, 115c outer wall section, 115d outer wall section, 116 lid, 120 substrate, 121 microcomputer, 121b table processing part, 121c rotational quantity determination part, 121e output part, 121p rotation angle acquiring part, 121q rotation angle acquisition part 121r rotation angle acquisition part, 122 substrate attaching screws, 133 intermediate gear, 133a worm wheel portion, 133b bearing portion, 133c flange portion, 133d fourth driving gear portion, 134 shaft, 138 second layshaft gear, 138a fourth driven gear portion, 138b bearing portion, 138c flange portion, 138d magnet holder, 139 shaft, 141 support, 164 screws, 170 magnet holder, 171 first inner peripheral surface, 172 second inner peripheral surface, 173 first stepped portion, 174 third inner peripheral surface, 175 second tier difference, 176 outer peripheral surface, 180 resin gear portion, 181 worm gear portion, 182 inner peripheral surface, 190 resin gear portion, 191 worm gear portion, 192 first inner peripheral surface, 193 second inner peripheral surface, 194 third inner peripheral surface, 195 tier difference, 200 motor, 201 motor shaft, 201a tip end, 202 housing, 202a cutout portion, 301 first side, 302 second side, 303 third side, 304 fourth side, 400 connector.

The invention claimed is:
1. An absolute encoder comprising:
a first driving gear, fixed to a spindle, coaxially with the spindle, and configured to rotate according to a rotation of the spindle;
a first magnet provided on the first driving gear;
a first driven gear, having a center axis perpendicular to a center axis of the first driving gear, and configured to engage the first driving gear;
a second driving gear, provided coaxially with the first driven gear, and configured to rotate according to a rotation of the first driven gear; and
a second driven gear, having a center axis perpendicular to the center axis of the first driven gear, and configured to engage the second driving gear;

wherein the first driving gear includes:
a cylindrical portion fit onto a tip end of the spindle, coaxially with the spindle, and
an annular portion having a teeth portion, configured to engage the first driven gear, and provided on an outer side thereof in a radial direction, and
wherein the annular portion is provided coaxially with the spindle and adjacent to the cylindrical portion,
the cylindrical portion is a separate element from the annular portion,
an inner peripheral surface of the annular portion is fit onto an outer peripheral surface of the spindle,
the cylindrical portion and the spindle contact each other at a first contact portion,
the annular portion and the spindle contact each other at a second contact portion,
the first contact portion and the second contact portion are arranged along a plane parallel to a radial direction of the first driving gear, perpendicular to an axial direction of the spindle, and
the inner peripheral surface of the annular portion includes a surface portion opposing the outer peripheral surface of the cylindrical portion with a gap formed therebetween.

2. The absolute encoder as claimed in claim 1, wherein the first magnet is fixed to the cylindrical portion formed of a non-magnetic metallic material, via an adhesive.

3. The absolute encoder as claimed in claim 1, wherein the first driven gear has an outer diameter smaller than an outer diameter of the first driving gear.

4. The absolute encoder as claimed in claim 1, further comprising:
a second magnet provided on the second driven gear,
wherein the second driven gear is decelerated and rotates unitarily with the second magnet, according to the rotation of the spindle.

* * * * *